(12) United States Patent
Myers

(10) Patent No.: US 7,308,419 B1
(45) Date of Patent: Dec. 11, 2007

(54) METHOD AND SYSTEM FOR TRACKING CONSUMER AWARENESS OF BRAND-NAMES

(75) Inventor: Connie D. Myers, Austin, TX (US)

(73) Assignee: NoClips.com Inc., Austin, TX (US)

( * ) Notice: Subject to any disclaimer, the term of this patent is extended or adjusted under 35 U.S.C. 154(b) by 0 days.

(21) Appl. No.: 09/575,845

(22) Filed: May 19, 2000

(51) Int. Cl.
*G06Q 30/00* (2006.01)

(52) U.S. Cl. .............................. 705/14; 705/26; 705/27; 235/375; 235/380; 235/382; 358/1.15; 358/1.16; 358/442; 345/619

(58) Field of Classification Search ................... 705/14
See application file for complete search history.

(56) References Cited

U.S. PATENT DOCUMENTS

| | | | | |
|---|---|---|---|---|
| 4,674,041 A | * | 6/1987 | Lemon et al. ................ | 705/14 |
| 4,723,212 A | | 2/1988 | Mindrum et al. ........... | 364/401 |
| 4,750,119 A | | 6/1988 | Cohen et al. ................ | 364/401 |
| 5,353,218 A | * | 10/1994 | De Lapa et al. ............. | 705/14 |
| 5,459,306 A | | 10/1995 | Stein et al. .................. | 235/383 |
| 5,502,636 A | | 3/1996 | Clarke ........................ | 364/401 |
| 5,504,675 A | | 4/1996 | Cragun et al. .............. | 364/401 |
| 5,557,721 A | | 9/1996 | Fite et al. ................... | 395/148 |
| 5,634,101 A | | 5/1997 | Blau ........................... | 395/210 |
| 5,710,886 A | | 1/1998 | Christensen et al. ........ | 395/214 |
| 5,761,648 A | | 6/1998 | Golden et al. .............. | 705/14 |
| 5,774,870 A | | 6/1998 | Storey ........................ | 705/14 |
| 5,806,045 A | | 9/1998 | Biorge et al. ............... | 705/14 |
| 5,832,457 A | | 11/1998 | O'Brien et al. ............. | 705/14 |
| 5,859,414 A | | 1/1999 | Grimes et al. .............. | 235/383 |
| 5,905,246 A | | 5/1999 | Fajkowski ................... | 235/375 |
| 5,907,830 A | | 5/1999 | Engel et al. ................. | 705/14 |
| 5,909,673 A | * | 6/1999 | Gregory ...................... | 705/45 |
| 5,995,942 A | | 11/1999 | Smith et al. ................. | 705/14 |
| 6,002,771 A | | 12/1999 | Nielsen ....................... | 380/49 |
| 6,009,407 A | | 12/1999 | Garg ........................... | 705/10 |
| 6,029,195 A | * | 2/2000 | Herz ........................... | 725/116 |
| 6,035,280 A | | 3/2000 | Christensen ................ | 705/14 |
| 6,076,069 A | | 6/2000 | Laor ........................... | 705/14 |

(Continued)

FOREIGN PATENT DOCUMENTS

| | | | |
|---|---|---|---|
| CA | 2098329 A | * | 3/1994 |
| WO | WO97/23838 | * | 7/1997 |

OTHER PUBLICATIONS

"Priceline.com", http://www.priceline.com; printed May 18, 2000 (partial copy of Web site attached).

(Continued)

*Primary Examiner*—Jean D. Janvier
(74) *Attorney, Agent, or Firm*—Seed IP Law Group PLLC

(57) ABSTRACT

A method and system allowing the assessment of the strength of at least one mark relative to at least one other mark. In one embodiment, a method includes but is not limited to displaying at least two marks as activation mechanisms for a print-shopping-list command, and determining relative consumer awareness of the at least two marks by maintaining an accounting of the number of times each of the at least two marks is activated. In one embodiment, a system includes but is not limited to hardware and/or software effecting the method.

55 Claims, 33 Drawing Sheets

U.S. PATENT DOCUMENTS

| | | | | |
|---|---|---|---|---|
| 6,237,145 | B1 | 5/2001 | Narasimhan et al. | 725/23 |
| 6,314,406 | B1 | 11/2001 | O'Hagan et al. | 705/14 |
| 6,321,208 | B1 * | 11/2001 | Barnett et al. | 705/14 |
| 6,362,840 | B1 * | 3/2002 | Burg et al. | 345/835 |
| 6,493,110 | B1 | 12/2002 | Roberts | 358/1.2 |
| 6,519,571 | B1 * | 2/2003 | Guheen et al. | 705/14 |

OTHER PUBLICATIONS

"Coolsavings.com", http://www111.coolsavings.com; printed May 18, 2000 (partial copy of Web site attached).

"Smartsource.com", http://www.smartsource.net; printed May 18, 2000 (partial copy of Web site attached).

"ISMS, In Store Media Systems, Inc.", http://www.ismsi.net; printed Dec. 27, 2000 (partial copy of Web site attached).

"hpshopping.com", http://www.stockconference.com/stockconfl/instore.html; printed Sep. 1, 2000 (partial copy of Web site attached).

"Randalls.com", http://www.randalls.com; printed May 18, 2000 (partial copy of Web site attached).

"Valuepage.com", http://www.myshortcut.com/valuepage/new/couponyesmail.html; printed May 18, 2000 (partial copy of Web site attached).

Anonymous, ShoppingList.com Partners with ValuePage to Offer Grocery Coupons to Online Visitors, Sep. 1999, PR Newswire.

* cited by examiner

Only those signed up to do business with web server owner/operator such as MGM, Warner, Paramount, etc.

Exit Here
Back
Next

FIG. 27
PRODUCE
5) APPLE
1) CABBAGE
10) LIME
1) LETTUCE
10) POTATO LBS.
5) TOMATO
PACKAGED GOODS
2) GREEN BEANS
2) ASPARIGAS
1) COOKING OIL
5) SOUP
1) SALT
1) PEPPER
4) PORK AND BEAN
2) PASTA
(1) PEANUT BUTTER
PAPER GOODS
(4) PAPER TOWLS
    TISSUE
1) FAICIAL
2) TOILET
DAIRY PRODUCTS
1) MILK
2) EGGS
2) BUTTER
   CHEESE
1) CHEDDER
1) AMERICAN
MEAT
8) STEAK
2) BACON
2) CHICKAN
DRINKS
2) SODA
1) WINE
1) BEER
HOUSEHOLD GOODS
(1) WRAP (FOIL)
(1) BLEACH
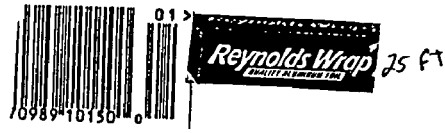 25 FT
 16 OZ
 24 OZ
 4 PK
 1 lbs.
 16 OZ
 10 OZ HEB   Randalls   Kroger   SAFEWAY   WAL-MART List Alpha those who
do business with us By CATAGORY, New Products ☐ Betty Crocker
☐ Cambells
☐ Del monte
☐ Duncan Hines
☐ General mills
☐ Hunts
☐ International Home Foods
☐ Kellogs
☐ Nabisco
☐ Post
☐ Proctor and Gamble ☐ Cereal
☐ Canned Vegetables
☐ Paper Good
☐ Soft Drinks
☐ Baking Goods
☐ Personal Care New Products!  — 3202

New Products!  — 3204

Next | Alpha | Catag | Back

FIG. 32

METHOD AND SYSTEM FOR TRACKING CONSUMER AWARENESS OF BRAND-NAMES

COPYRIGHT NOTICE

A portion of the disclosure (particularly the drawings) of this patent document contains material which is subject to copyright protection. With respect to those aspects of this patent document of which the present applicant is the copyright owner, the copyright owner has no objection to the facsimile reproduction by anyone of the patent document or the patent disclosure, as it appears in the Patent and Trademark Office patent file or records, but otherwise reserves all copyright or rights whatsoever.

CROSS-REFERENCE

The present invention is related to subject matter disclosed in the following co-pending applications, which are hereby incorporated by reference in their entireties:

1. United States patent application entitled, "User-Sensitive Rebating", U.S. application Ser. No. 09/575,002, naming Connie D. Myers as inventor and filed substantially contemporaneously with the present application; and
2. United States patent application entitled, "Near Real-Time Rebate Control", U.S. application Ser. No. 09/575,105, naming Connie D. Myers as inventor and filed substantially contemporaneously with the present application.
3. United States patent application entity, "Multi-Vendor Transactions Based On Near-Immediate Rebate Detection", U.S. application Ser. No. 09/575,249, naming Connie D. Myers as inventor and filed substantially contemporaneously with the present application.

BACKGROUND

1. Technical Field

This patent application relates, in general, to vendor rebates.

2. Description of the Related Art

Vendors are purveyors of goods and services. Examples of vendors are retailers, wholesalers, and manufacturers. Rebates are deductions or discounts—offered by retailers, wholesalers, and manufacturers—on sums of money due.

Two common vehicles by which rebates are offered by retailers, wholesalers, and manufacturers are coupons and in-store specials. A coupon is typically a voucher entitling the holder to a discount off a particular product. The value of the voucher is typically printed upon its face. In general, upon purchase of an item subject to a coupon rebate, the purchaser presents the vendor with the coupon, and the face value of the coupon is then rebated from the purchase price.

An in-store special is typically an advertised discounted price on a particular item offered by a vendor. In general, upon purchase of an item subject to an in-store special, the purchaser presents the item for purchase at the point of sale, and the advertised discount is rebated from the purchase price, typically by data entry of a human user operating a point of sale terminal.

Traditional vehicles for rebating (e.g., coupons and in-store specials) suffer from several disadvantages. One set of such disadvantages arises from the fact that traditional rebate vehicles are often offered to the public in the form of Free Standing Inserts (FSIs) in various print media (e.g., newspapers and/or magazines).

FSIs are generally additional printed documents—consisting of either coupons or advertised in-store specials—that accompany traditional print media. One disadvantage associated with rebate vehicles offered via FSIs is that consumers find the use of rebate vehicles (e.g., coupons and/or in-store specials) offered via FSIs labor intensive and time consuming. Insofar as FSIs are "free standing," they are not organized from the standpoint of the consumer. Thus, if the consumer wishes to utilize rebate vehicles offered through such FSIs, the consumer must (a) determine, from a highly disorganized (at least from the standpoint of the consumer) offering of rebate vehicles, exactly what rebates are being offered, (b) subsequent to determining exactly what rebates are being offered, determine if any rebates being offered match goods the consumer intends to purchase, and (c) either cut out or flag those coupons or in-store specials which the user wishes to apply to the goods the consumer intends to purchase. It is therefore apparent that a need exists in the art for a method and system which will allow users to easily coordinate rebate vehicles (e.g., coupons and/or in-store coupons) with items which the user desires to purchase in a fashion that is generally less labor intensive and time consuming that the process used in the related art.

Other disadvantages associated with traditional rebate vehicles offered via FSIs have to do with counting and redemption. These disadvantages can be most easily illustrated by describing the traditional process of coupon counting and redemption. In the traditional process of coupon counting and redemption, after a retailer has accepted coupons from consumers, the retailer must determine the total value of each manufacturer's coupons the retailer has redeemed in order for the retailer to be reimbursed by the coupon issuer. The method of doing this varies widely among retailers, but in general retailers periodically, such as on a weekly basis, collect all redeemed paper coupons and deliver the coupons to a third-party clearinghouse. At the clearinghouse, coupons are generally sorted either by hand, or perhaps by scanning, in order to determine what coupons belong to which manufacturer and the amount the manufacturer owes the retailer for redeeming the coupons. After the coupons are returned to the manufacturer, the manufacturer may again sort the coupons (using its own employees or another clearinghouse) to insure all the coupons are the manufacturer's. The manufacturer then recalculates the total value of the coupons in order to verify the amount the retailer claims is owed on the redeemed coupons. This process is completed for every one of the billions of coupons redeemed annually. By the time the coupons have been collected by the retailer, passed through one and possibly two clearinghouses, and the manufacturer reimburses the retailer, several weeks or months may have passed. This results in a considerable disadvantage to the retailer since the time between when the retailer gives the consumer the coupon discount and when the manufacturer reimburses the retailer is, in effect, an interest-free loan to the manufacturer. The manufacturer also suffers from the slow redemption process since the manufacturer cannot determine the effect of the coupon promotion until the manufacturer receives information on the number of coupons redeemed. It is therefore apparent that need exists in the art for a method and system which provide near-immediate coupon counting and reimbursement.

In addition to the foregoing, realize that the foregoing described process of traditional coupon counting and redemption, and disadvantages associated therewith, must be duplicated for every interaction between different retailers and manufacturers. That is, if a retailer deals with more than one manufacturer, the retailer must duplicate the counting and reimbursement request for the rebates offered for each unique manufacturer. Likewise, if a manufacturer deals with more than one retailer, the manufacturer must duplicate the counting and reimbursement recalculation for each unique retailer. Thus, in addition to the disadvantages associated with interactions between just one retailer and just one manufacturer, from a retailer and/or wholesaler standpoint, the related art processes of coupon counting and reimbursement are extremely inefficient due to the described reduplication of effort for each unique retailer and/or manufacturer. It is therefore apparent that need exists in the art for a method and system which provide near-immediate coupon counting and reimbursement in such a way that retailers and/or manufacturers may be relieved from the described reduplication of effort.

Another set of disadvantages associated with traditional rebate vehicles (e.g., coupons and/or in-store specials) arises from the fact that traditional rebate vehicles are not generally subject to either near-real-time control or monitoring. Such inability to control and/or monitor in near-real time can give rise to substantial detriments to rebate issuers, especially when market conditions vary from the projected conditions upon which rebates issued.

A rebate on an item is generally offered based on predictions of the market price for the item, and an anticipated rate of redemption of the rebate. In the event that either of the foregoing predictions is grossly off, the rebate issuer can be left with substantial outstanding liability. For example, assume that a tomato-paste manufacturer—on the basis of a forecast that the coming season's tomato harvest will be average and an anticipation that sales of tomato paste will follow previous industry trends—issues a coupon offering a 25 cent rebate on each 16 ounce can of tomato paste. Next assume that, contrary to expectations, the season's tomato harvest far exceeds expectations, resulting in a depression of tomato prices such that consumer redemption of the 25 cent rebate per can of tomato paste results in a loss to the tomato-paste manufacturer. Alternatively, or in addition to the foregoing, assume that the rates of redemption of the 25 cent rebate per 16-ounce can far exceed the expectations of the rebate issuer, which further exacerbate the problems associated with the rebating.

If either or both the projected market price of an item or projected rates of redemption for the item's rebate are grossly off (e.g., as in the tomato paste example), it is desirable that the rebate issuer be able to adjust either or both the monetary amounts or numbers of rebates issued. In addition, since market conditions and redemption rates can vary in near real time (e.g., a price decrease due to a discovered disease, such as mad cow disease), it is desirable that the monetary value and/or number of offered rebates be able to be adjusted in near-real time. Unfortunately, traditional rebate vehicles cannot respond to the foregoing scenario in that they are essentially fixed and time-invariant. Accordingly, rebate issuers, being attuned to the possibilities of the foregoing described vagaries of the market economy, hedge their bets by offering less attractive rebates than they would if the rebate issuers could respond to such market conditions in near-real time. This is inefficient and adds cost which consumers would otherwise not be forced to pay. It is therefore apparent that a need exists in the art for a method and system providing near-immediate user-sensitive rebating (which can be useful in comparing expected rates of redemption against actual rates of redemption) and near-real time rebate control (which can be useful in adjusting the rebate values to account for market vagaries).

Those skilled in the art will recognize that rebating, and particularly rebating offered via the vehicles of coupons and/or in-store specials, is a form of advertising. When vendors advertise, they typically strive to associate their "mark(s)" (e.g., a trade or service mark(s)) with various goods or services. The inventor has discerned that, in the related art, there is often no inexpensive way by which the vendor can assess the strength of his mark(s), relative to the strengths of other mark(s). It is therefore apparent that a need exists in the art for a method and system which will allow a vendor to assess the strength of the vendor's mark(s) relative to other mark(s).

SUMMARY

The inventor named herein has devised a method and system, which, among other things, allows the assessment of the strength of at least one mark relative to at least one other mark.

In one embodiment, a method includes but is not limited to displaying at least two marks as activation mechanisms for a print-shopping-list command, and determining relative consumer awareness of the at least two marks by maintaining an accounting of the number of times each of the at least two marks is activated. In another embodiment, a system includes but is not limited to hardware and/or software effecting the method.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of this patent application will become apparent in the non-limiting detailed description set forth below.

BRIEF DESCRIPTION OF THE DRAWINGS

The use of the same reference symbols in different drawings indicates similar or identical items.

FIG. 17 depicts a Web page clearly associated with a particular manufacturer.

FIG. 20 depicts a Web page that allows a user to "virtually" shop a produce section as he would in a physical store.

Figure 25:
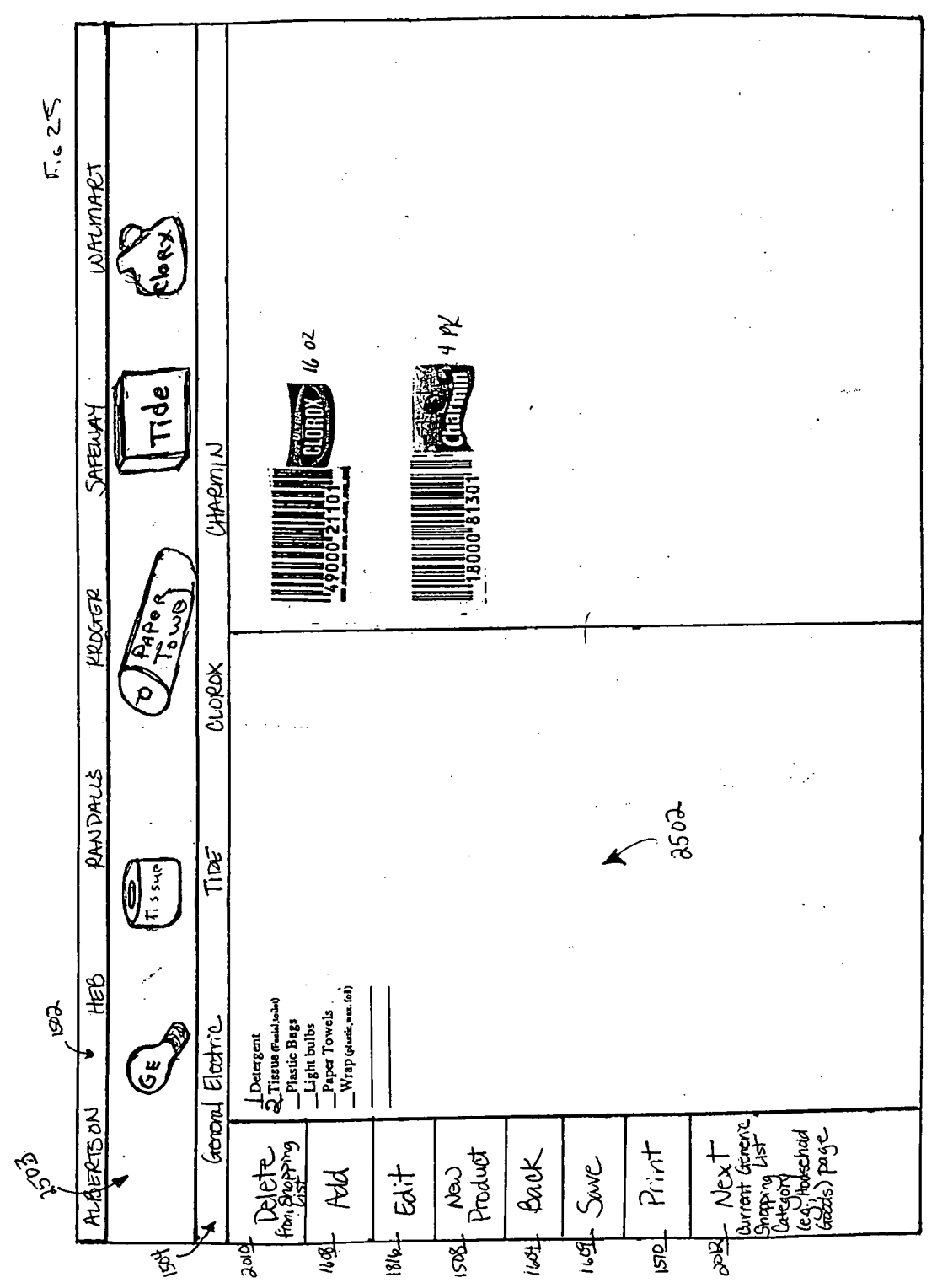

FIG. 25 illustrates a household-section-specific Web page 25.

Figure 26:
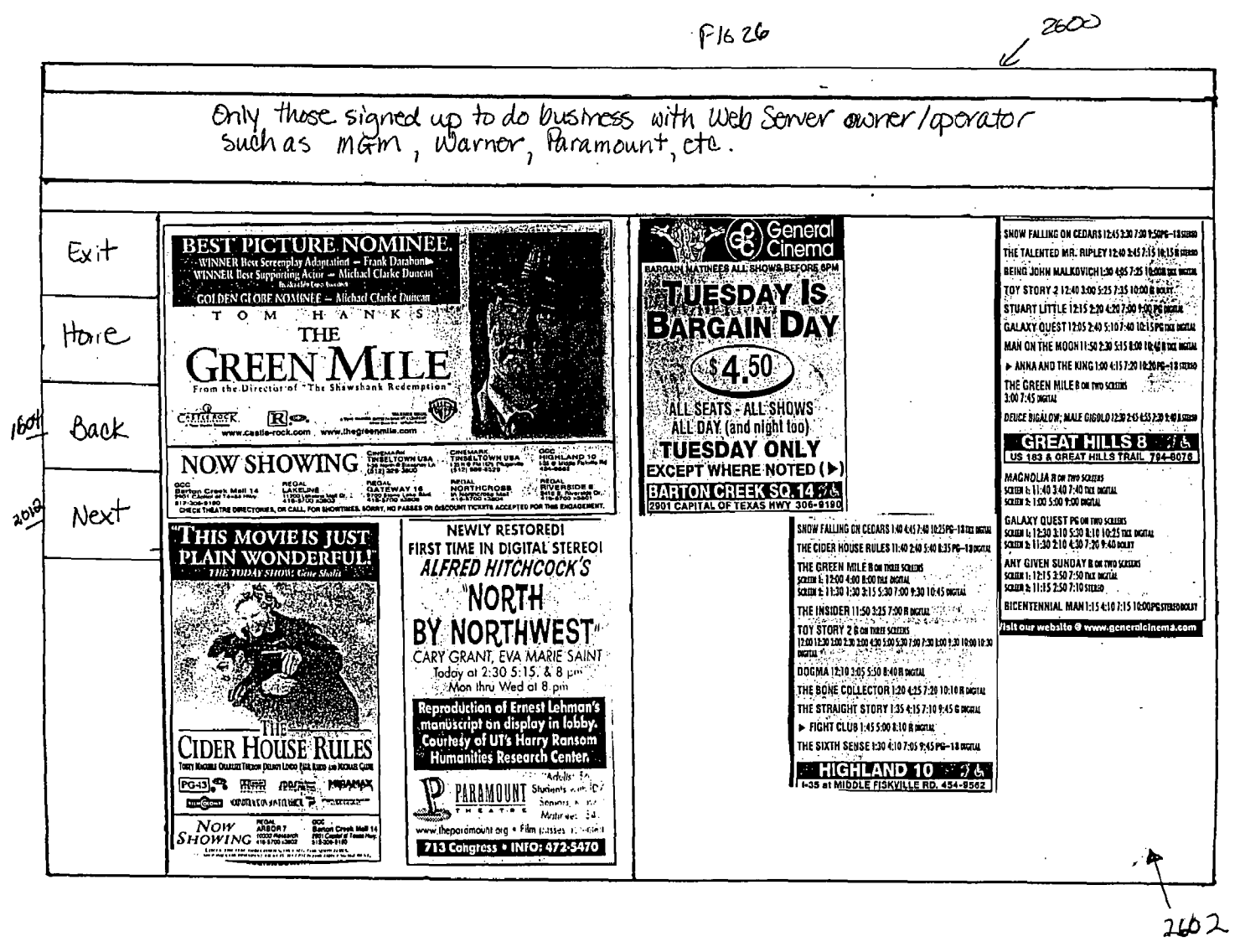

FIG. 26 illustrates a movies in proximity to a user's specified preferred shopping venue Web page.

FIG. 27 illustrates shopping list 2700 which, in one embodiment results from activate print-master-shopping-list bit-mapped hyperlink 1510, which is typically activated upon completion of shopping list.

FIG. 29 is a high-level logic flowchart of a process which maintains the giveaway scheme, but in such a way that non-participants can be identified and dealt with.

FIG. 32 depicts one embodiment of a Web page wherein is shown, on the left-hand portion of the page, manufacturer-specific-new-product rebate hyperlinks 3202 and wherein is further shown, on the right-hand portion of the page, goods-categorized-new-product rebate bit-mapped hyperlinks 3204.

DETAILED DESCRIPTION

The present detailed description is broken into sections for sake of clarity. The use of such sections is for clarity only, and thus is not intended and should not be construed to be limiting.

1. Environment

Figure 1:
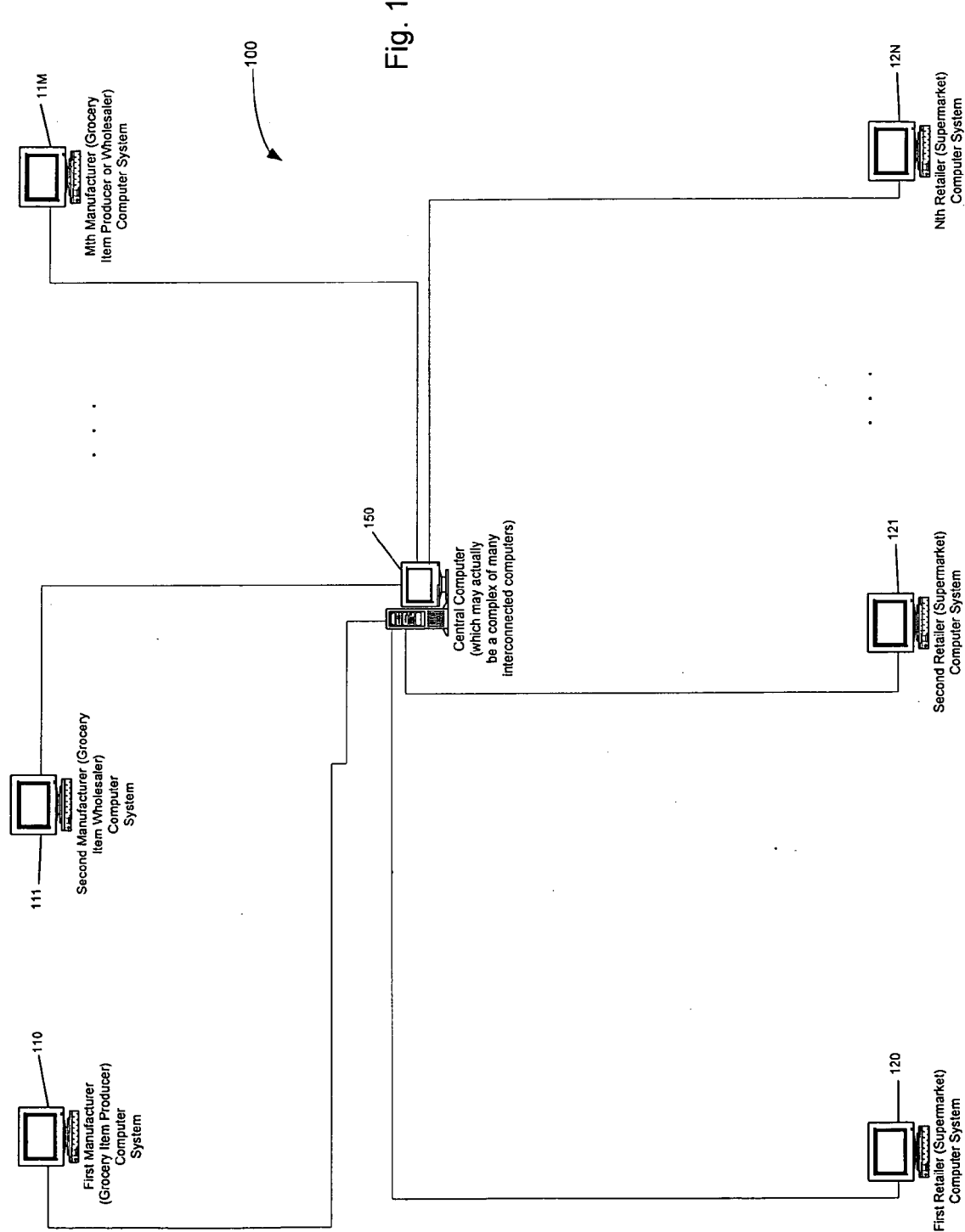
FIG. 1 depicts an environment in which embodiments of the present invention may be practiced.

With reference to the figures, and in particular with reference now to FIG. 1, shown is an environment in which embodiments of the present invention may be practiced. Depicted is network 100 (e.g., the Internet) wherein are shown several computers. Depicted are first manufacture computer system 110, second manufacturer computer system 111, . . . , and Mth manufacture computer system 11M (which is meant to illustrate that from 1 to M manufacturer computer systems can be present, where M is any integer greater than 1); the term "manufacturer," as used herein, generally refers either to a producer of items typically sold in a retail outlet such as a supermarket or grocery store or to a wholesaler of items typically sold in a retail outlet such as a supermarket or grocery store. Illustrated are first retailer computer system 120, second retailer computer system 121, . . . , and Nth retailer computer system 12N (which is meant to illustrate that from 1 to N retailer computer systems can be present, where N is any integer greater than 1); the term "retailer," as used herein, generally refers to a retail outlet such as a supermarket or grocery store which typically retails manufacturers' or wholesaler's goods, although retailers can also sell their own goods (e.g., "store brands"). It should be noted that although the term "goods," or "products," are used substantially interchangeably herein to refer to manufacturer items and retailer items, the present embodiments may also be utilized in the context of manufacturers' and retailers' services; that is, although goods and products are referred to herein for sake of conceptual clarity, as used herein such terms are also meant to be illustrative of services. It should also be noted that although the terms "manufacturers" and "retailers" are utilized herein, such terms are meant to be merely exemplary of purveyors of goods and/or services (i.e., vendors).

Shown is that first manufacturer computer system 110, second manufacturer computer system 111, and Mth manufacturer computer system 11M interconnect with central computer system 150. Depicted is that first retailer computer system 120, second retailer computer system 121, and Nth computer system 12N interconnect with central computer system 150. Although the foregoing noted interconnections are illustrated as direct interconnections, those skilled in the art recognize that such interconnections can be through various intermediary connections. Also shown in FIG. 1 is that central computer system 150 may actually be a complex of interconnected computers, which those skilled in the art will appreciate can also be true of any computer system shown and/or described in relation to FIG. 1. In addition to the foregoing, while implementations of embodiments of the present invention are described herein in the context of entities (e.g., Web browsers) communicating with web server software located on central computer system 150 for sake of simplicity of illustration, it is to be understood that in other embodiments central computer system 150 may also be "distributed" where one or more vendors (e.g., retailers and/or manufacturers) will have local to them localized web server software entities which are periodically updated by web server software resident on central computer system 150, where such localized web server software entities will "act like" central computer system 150 and the web server software resident thereon, as described herein. One reason for such alternate implementations is to provide for an increase in the speed of response of the system by having periodically updated web server software local to the vendors rather than having vendors contacting Web server software resident on central computer system 150 and waiting for a response, if such is desirable. In addition, in another embodiment both the centralized and distributed versions of central computer system 150 may be used in tandem to increase system reliability.

The computer systems shown in FIG. 1 may be any type of computer system. However, in general, due to the extremely high volume of transactions and large amounts of data which typically must be handled by manufacturers and retailers, such computer systems will generally be mainframe computer systems which typically have one or more visual display devices, keyboard input devices, audio input and output devices, mice, communications devices (e.g. network switches and/or modems), as well as attendant software necessary to support the interaction of all such devices.

2. Multi-Vendor Rebate List(s)

Figure 2:
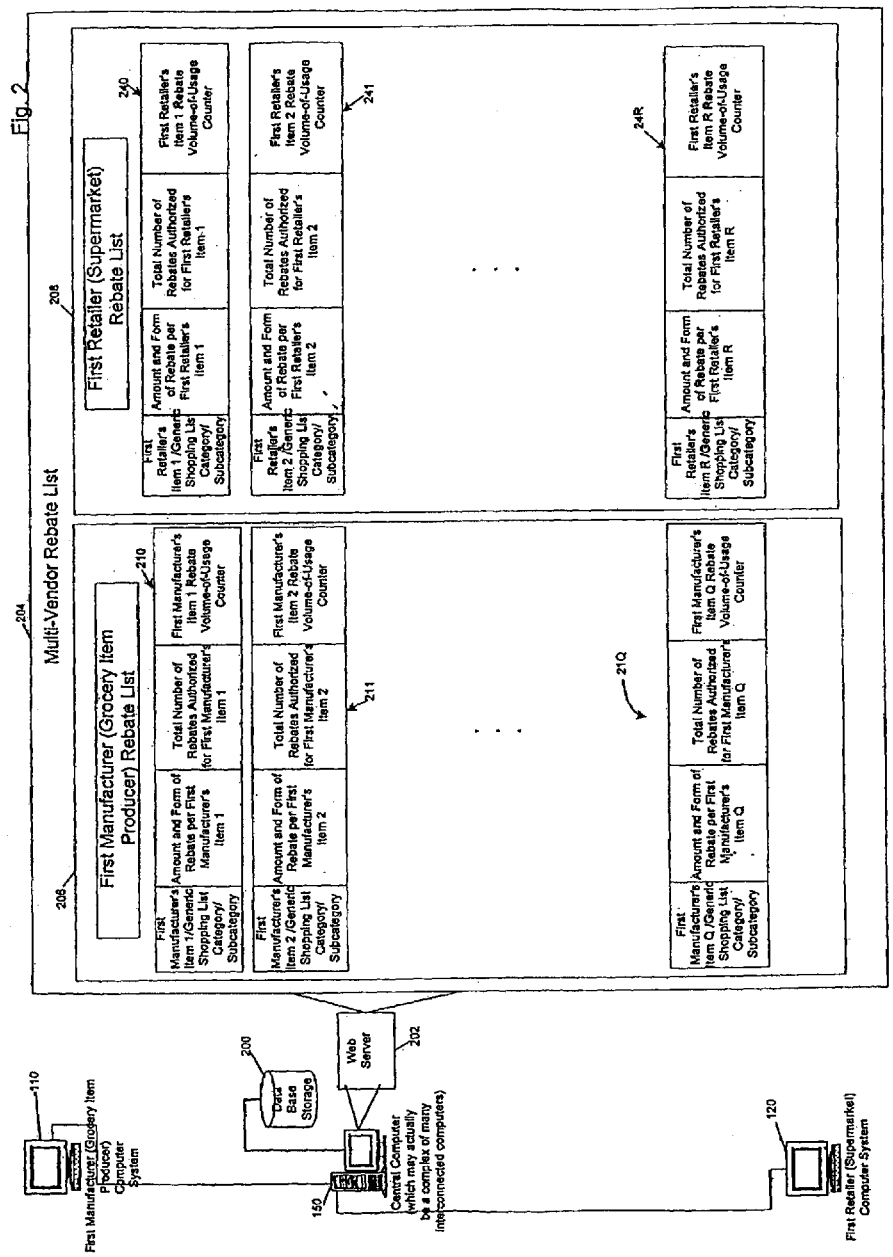
FIG. 2 depicts first manufacturer computer system 110, central computer system 150, and first retailer computer system 120 of FIG. 1.

Referring now to FIG. 2, depicted are first manufacturer computer system 110, central computer system 150, and first retailer computer system 120 of FIG. 1. Illustrated is that central computer system 150 has database storage 200. Shown is that Web server software 202 is resident within and running on central computer system 150. Depicted is that Web server software 202 supports and maintains multi-vendor rebate list 204. Illustrated contained within multi-vendor rebate list 204 are first manufacturer rebate list 206 and first retailer rebate list 208. Although only first manufacturer rebate list 206 is shown, it is to be understood that multi-vendor rebate list 204 typically supports and maintains a unique manufacturer rebate list for each unique manufacturer computer system 110-11M shown and described in relation to FIG. 1. In addition, although only first retailer rebate list 208 is shown, it is to be understood that multi-vendor rebate list 204 typically supports and maintains a unique retailer rebate list for each unique retailer computer system 120-12N shown and described in relation to FIG. 1.

Depicted is that first manufacturer rebate list 206 contains a list of rebates offered by the first manufacturer, where each rebate is keyed to a specific "generic shopping list category-subcategory." The "generic shopping list category-subcategory" to which each individual rebate is keyed is one of a set of generic shopping list categories and subcategories defined by Web server software 202 (e.g., see FIG. 27, wherein are illustrated the generic shopping list categories of Produce, Canned Goods, Dairy Products, and Drinks, with which are respectively associated the generic shopping list subcategories of Apples, Tomatoes, Green Beans, Milk, Eggs, Wine, Beer, etc.), which in one embodiment the Web server software owner/operator can define, add to, and change substantially at will. As will be described below, vendors (e.g., manufacturers, retailers, wholesalers, etc.) will have secure access (e.g., via security techniques such as user IDs, encryption, passwords, etc.) to their respective rebate lists where such secure access will allow the vendors to change such vendors' respective rebate lists, and it will typically be the vendors (e.g., manufacturers) who determine into which generic shopping list category or categories their respective rebates will fall and who will input their own (the vendors') rebates into the system. This scheme relieves the owner/operator of Web server software 202 of much labor and constitutes one of the benefits of various embodiments of the present invention described herein, in that it essentially relieves the Web server owner/operator of any concerns related to the internal inventories of various manufacturers. While the foregoing is the preferred method for the vendors' rebates to be matched with the generic shopping list categories and subcategories, in another embodiment the owner/operator of web server software 202 will do the matching for vendors for an agreed upon fee.

Illustrated is that first manufacturer rebate list 206 can contain any number of rebates ranging from 1 to Q (where Q is any integer greater than 1) which is shown graphically as first manufacturer rebate list 206 containing first manufacturer's item 1 rebate 210, first manufacturer's item 2 rebate 211, . . . , and first manufacturer's item Q rebate 21Q. For sake of illustration, each rebate is shown as having an amount (monetary) and form (e.g., coupon, or per-sale-discount) of rebate per manufacturer's item field, a total number of rebates authorized for manufacturer's item field, and a manufacturer's item rebate volume-of-usage counter field; however, it is to be understood that such fields are merely exemplary and that other rebate-oriented fields may be included in the spirit of the present invention. In addition, it is to be understood that each rebated item typically has some identifying description associated with it, such as a 28 oz. bottle of mouthwash, or a 16 oz. bottle of vitamins, or a 12 pack of 8 oz. bars of soap, etc. own is that first retailer rebate list 208 contains a Shown is that first retailer rebate list 208 contains a list of rebates (e.g., in-store-specials or store coupons as described and/or illustrated below) offered by the first retailer, where each rebate is keyed to a specific "generic shopping list category-subcategory." The "generic shopping list category-subcategory" to which each individual rebate is keyed is one of a set of generic shopping list categories and subcategories defined by Web server software 202 (e.g., see FIG. 27, wherein are illustrated the generic shopping list categories of Produce, Canned Goods, Dairy Products, and Drinks, with which are respectively associated the generic shopping list subcategories of Apples, Tomatoes, Green Beans, Milk, Eggs, Wine, Beer, etc.) As will be described below, vendors (e.g., retailers) will have access to their respective rebate lists, and it will typically be the vendors (e.g., retailers) who determine into which generic shopping list category or categories their respective rebates will fall. This scheme relieves the owner/operator of Web server software 202 of much labor and constitutes one of the benefits of various embodiments of the present invention described herein, in that it essentially relieves the Web server owner/operator of any concerns related to the internal inventories of various retailers.

Depicted is that first retailer rebate list 208 can contain any number of rebates ranging from 1 to R (where R is any integer greater than 1) which is illustrated graphically as first retailer rebate list 208 containing first retailer's item 1 rebate 240, first retailer's item 2 rebate 241, . . . , and first retailer's item R rebate 24R. For sake of illustration, each rebate is shown as having an amount (monetary) and form (e.g., coupon, or per-sale-discount) of rebate per retailer's item field, a total number of rebates authorized for retailer's item field, and a retailer's item rebate volume-of-usage counter field; however, it is to be understood that such fields are merely exemplary and that other rebate-oriented fields may be included in the spirit of the present invention.

Figure 3:
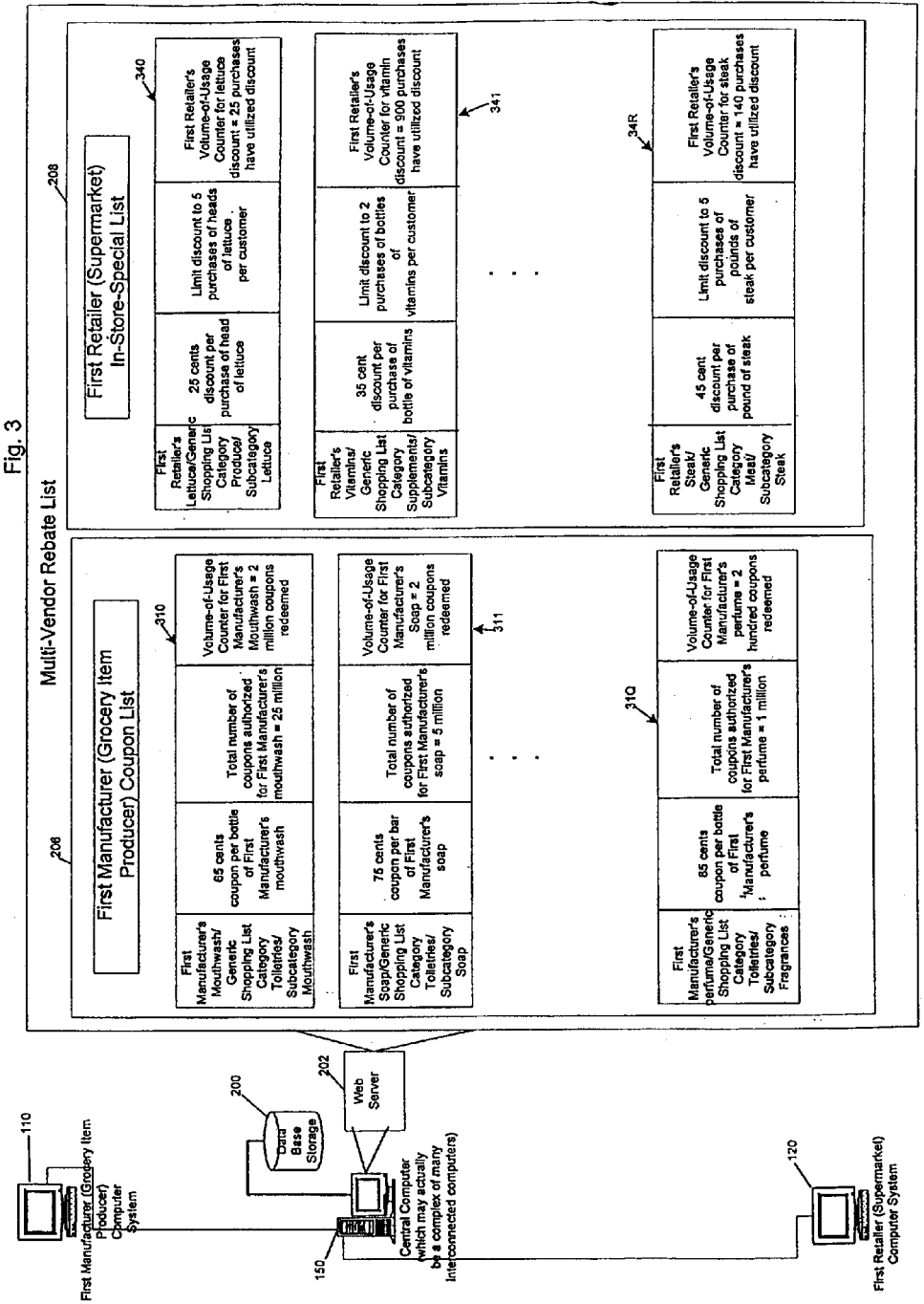
FIG. 3 illustrates specific examples of the generic rebates on manufacturers' and retailers' items which were described while referring to FIG. 2.
Figure 23:
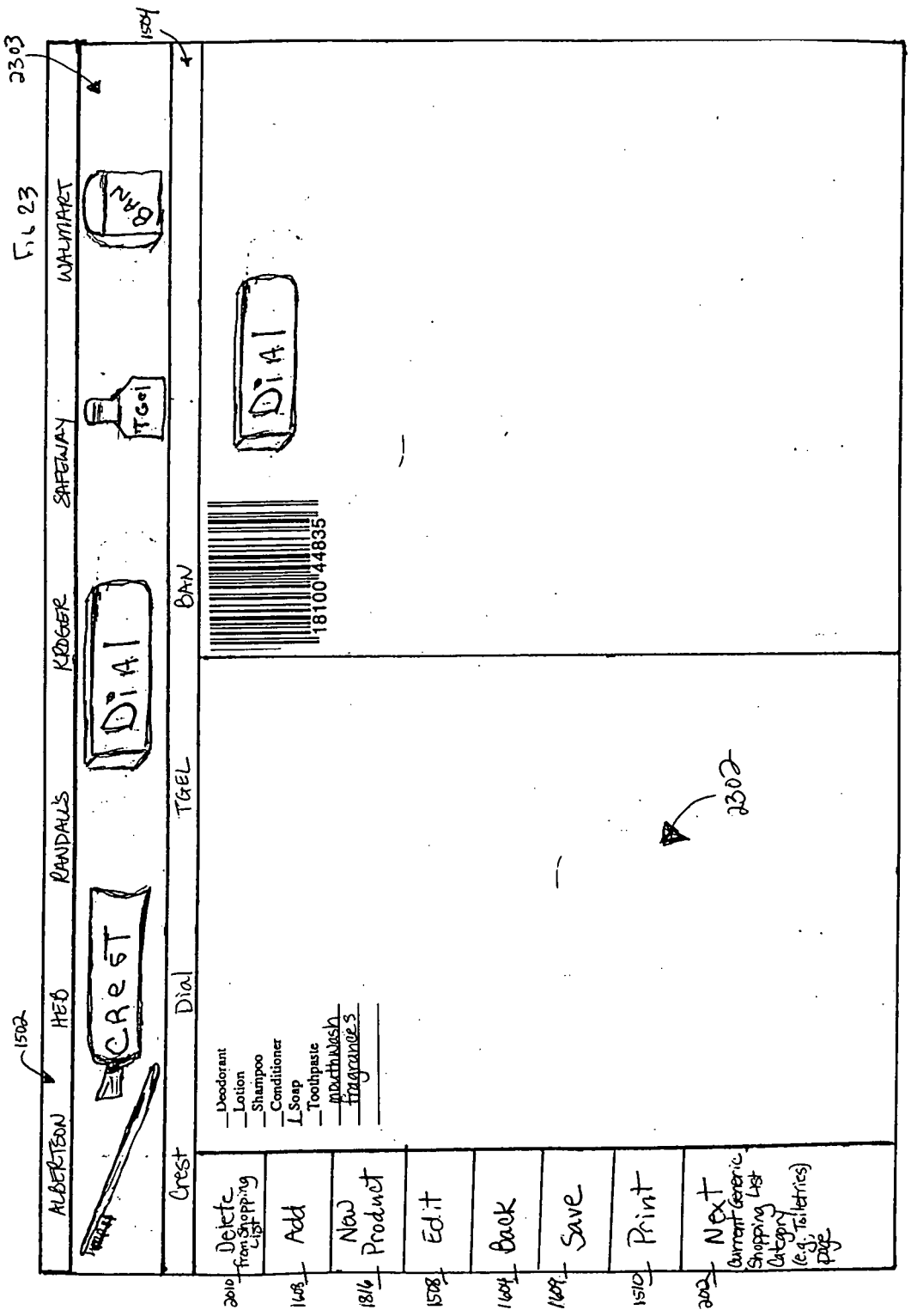
FIG. 23 depicts a toiletries-section-specific Web page.

With reference now to FIG. 3, illustrated are specific examples of the generic rebates on manufacturers' and retailers' items which were described while referring to FIG. 2. Illustrated is that first manufacturer rebate list 206 can be embodied as a first manufacturer coupon list which can contain any number of coupons ranging from 1 to Q (where Q is any integer greater than 1) which is shown graphically as first manufacturer coupon list 206 containing first manufacturer's mouthwash rebate 310 shown as having been designated by the manufacturer as falling within generic shopping list category "toiletries" and generic shopping list subcategory "mouthwash" (e.g., the generic shopping list category and subcategories of FIG. 23), first manufacturer's soap rebate 311 shown as having been designated by the manufacturer as falling within generic shopping list category "toiletries" and generic shopping list subcategory "soap" (e.g., the generic shopping list category and subcategories of FIG. 23), . . . , and first manufacturer's perfume rebate 31Q shown as having been designated by the manufacturer as falling within generic shopping list category "toiletries" and generic shopping list subcategory "fragrances" (e.g., the generic shopping list category and subcategories of FIG. 23). For sake of illustration, each rebate is shown as having an amount (e.g., 65 cents, 75 cents, 85 cents, etc.) and form (e.g., coupon) of rebate per manufacturer's item (e.g., mouthwash, soap, perfume, etc.) field, a total number of rebates authorized for manufacturer's item field (e.g., 25 million, 5 million, 1 million, etc.), and a manufacturer's item rebate volume-of-usage counter field; however, it is to be understood that such fields are merely exemplary and that other rebate-oriented fields may be included in spirit of the present invention.

Figure 20:
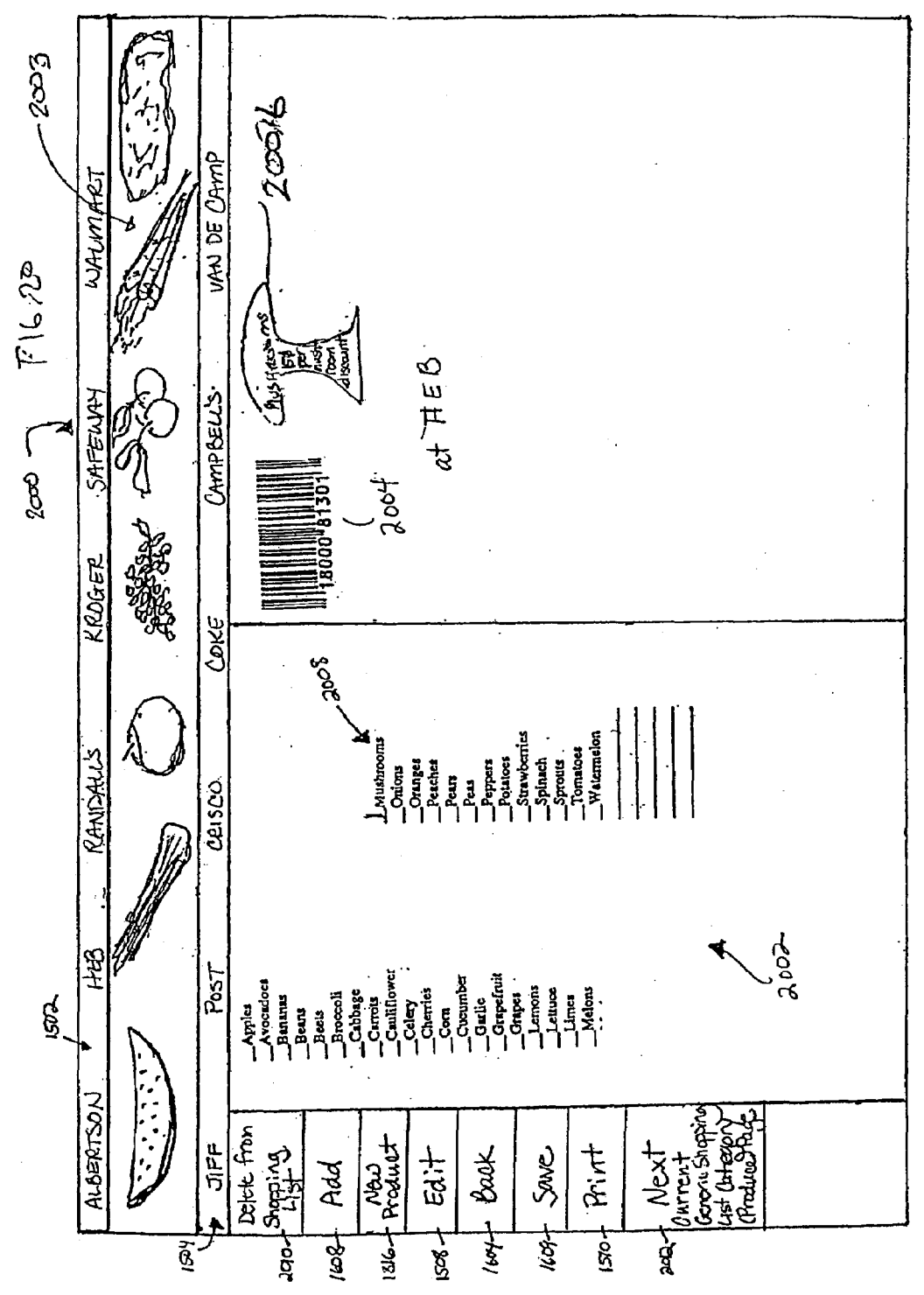
Figure 24:
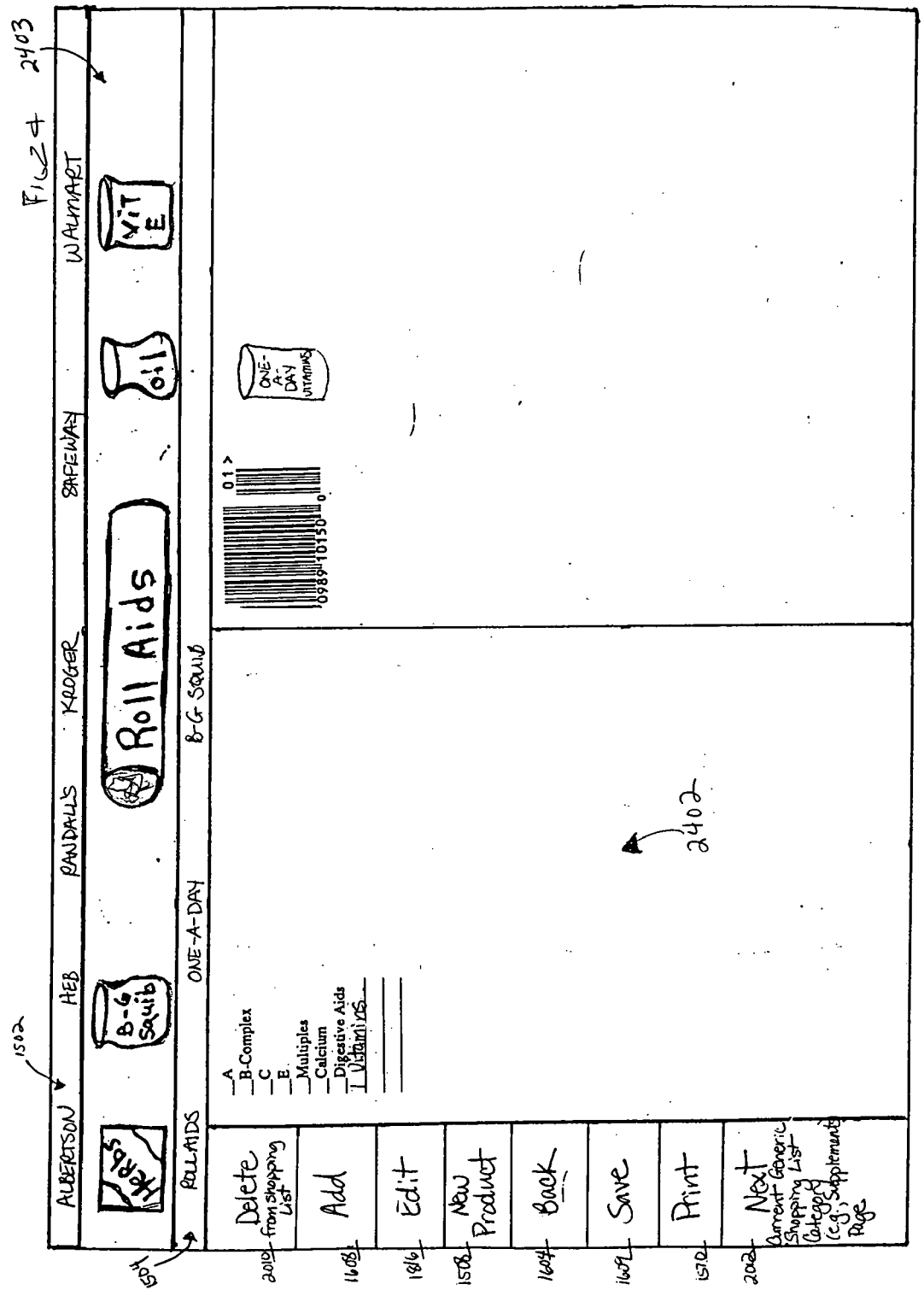
FIG. 24 depicts a supplements-section-specific Web page.

Further shown is that first retailer rebate list 208 of FIG. 2 can be embodied as a first retailer in-store-special list which can contain any number of in-store-specials ranging from 1 to R (where R is any integer greater than 1) which is shown graphically as first retailer in-store-special list 208 containing first retailer's lettuce rebate 340 shown as having been designated by the manufacturer as falling within generic shopping list category "produce" and generic shopping list subcategory "lettuce" (e.g., the generic shopping list category and subcategories of FIGS. 20 and 27), first retailer's vitamin rebate 341 shown as having been designated by the manufacturer as falling within generic shopping list category "supplements" and generic shopping list subcategory "vitamins" (e.g., the generic shopping list category and subcategories of FIG. 24), . . . , and first retailer's steak rebate 34R shown as having been designated by the manufacturer as falling within generic shopping list category "meat" and generic shopping list subcategory "steak" (e.g., the generic shopping list category and subcategories of FIG. 27). For sake of illustration, each rebate is shown as having an amount (e.g., 25 cents, 35 cents, 45 cents, etc.) and form (e.g., in-store special or discount per purchase) of rebate per manufacturer's item (e.g., lettuce, vitamins, steak, etc.) field, a total number of rebates authorized for retailer's item field (e.g., limit discount to 5 purchases of heads of lettuce per customer, limit discount to 2 purchases of bottles per customer, limit discount to 5 purchases of pounds of steak per customer, etc.), and a retailer's item rebate volume-of-usage counter field; however, it is to be understood that such fields are merely exemplary and that other rebate-oriented fields may be included in spirit of the present invention.

While FIG. 2 has only shown coupons associated with the first manufacturer, and in-store-specials associated with the first retailer, it is to be understood that in-store-specials can be associated with any manufacturer and that coupons can be associated with any retailer. In addition, although the illustrations and accompanying text of FIG. 2 only discuss coupons and in-store-special lists for the first manufacturer and first retailer, respectively, it is to be understood that any manufacturer and any retailer can have either or both a coupon list and an in-store-special list.

3. Near Real-Time Rebate Control

As has been noted, it is not uncommon for conditions upon which rebate calculations were originally made to change. Insofar as outstanding rebates can represent huge liabilities for rebate issuers, it is desirable that rebate issuers be able to change the amount or number of such rebates more or less in real time. Furthermore, as has also been discussed, it is not uncommon for the advisability of rebates to be calculated based on certain expected numbers of redemption. If the number of redemptions differ markedly from expectations, it is also desirable to allow adjustment of the number and amounts of such rebates substantially in real time. The foregoing described volume-of-usage counters will allow rebate issuers to track redemptions of rebates against expected redemptions. The following describes how rebates can be changed substantially in real time and in such a way that, in one embodiment, the redemption value of even previously issued coupons can be changed such that rebates can be made in such a way that best reflect real-time market conditions.

Figure 4:
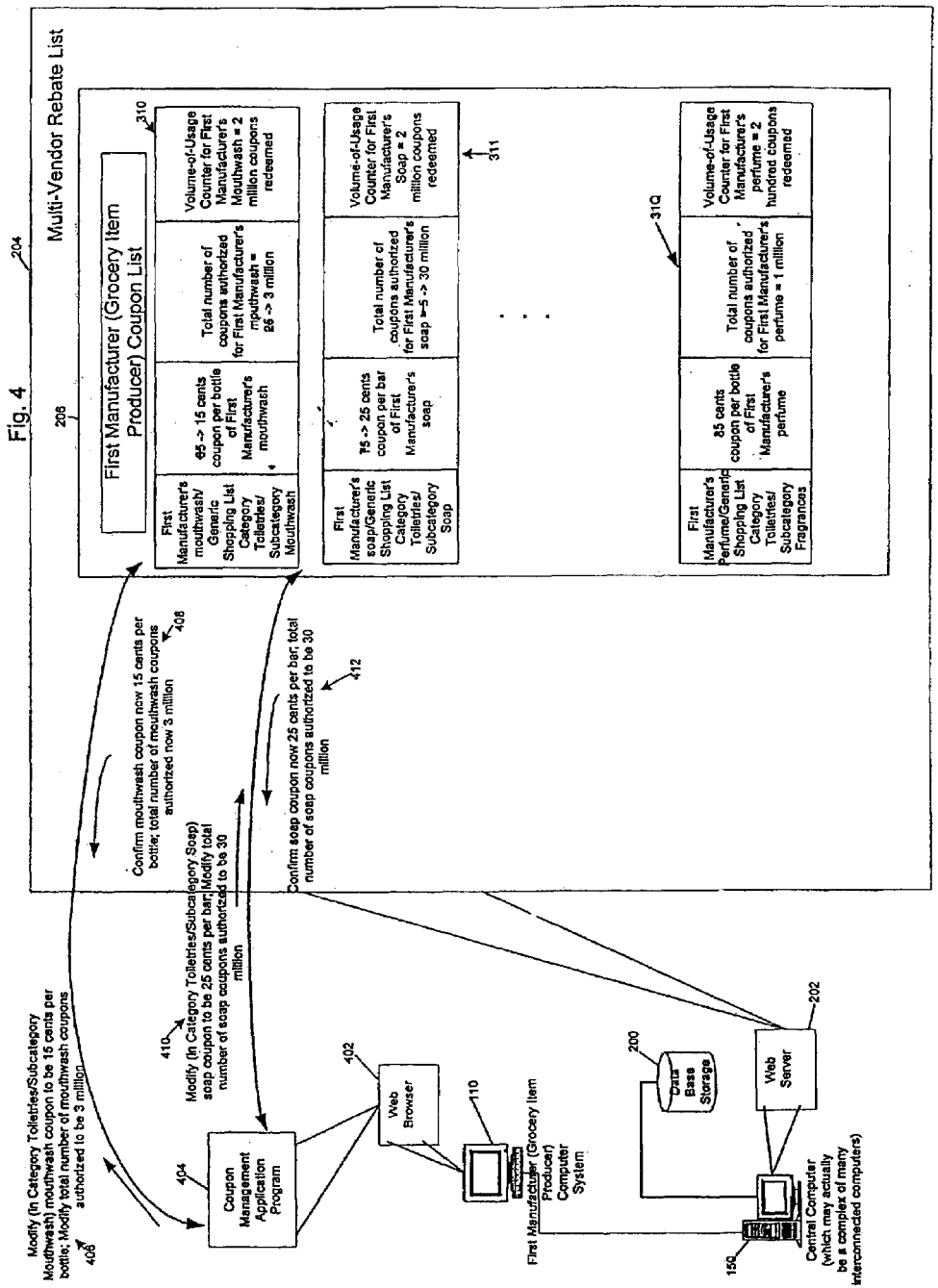
FIG. 4 depicts first manufacturer computer system 110 having resident within it coupon management application program 404 which communicates with Web server software 202 on central computer system 150 by and/or through Web browser software 402, which is also resident within first manufacturer computer system 110.

Referring now to FIG. 4, shown is first manufacturer computer system 110 having resident within it coupon management application program 404 which communicates with Web server software 202 on central computer system 150 by and/or through Web browser software 402, which is also resident within first manufacturer computer system 110. Depicted is that coupon management application program 404 causes Web browser software 402 to communicate with Web server software 202, via secure processes identifying first manufacturer computer system 110 (or owner of first manufacture computers system 110) well-known in the art, such that various aspects of rebates contained within multi-vendor rebate list 204 are modified. Illustrated in the context of the first manufacturer coupon list embodiment of first manufacturer rebate list 206 are instances showing aspects of rebates contained within multi-vendor rebate list 204 being changed.

Shown via messaging 406 is that coupon management application program 404, by and/or through Web browser software 402, requests that, with respect to first manufacturer's mouthwash rebate 310—located in generic shopping list subcategory mouthwash of generic shopping list category toiletries—the amount of the rebate (e.g., 65 cents) be changed from 65 cents to 15 cents, and that the total number of rebates authorized for the first manufacturer's mouthwash (e.g., 25 million) be changed from 25 million to 3 million. Depicted is that, in response to the requests to modify contained within messaging 406, the amount of the rebate has been changed from 65 cents to 15 cents (illustrated pictographically by showing a line through 65 cents followed by an arrow pointing to 15 cents) and that the total number of coupons authorized for the first manufacture's mouthwash has been changed from 25 million to 3 million (illustrated pictographically by showing a line through 25 million followed by an arrow pointing to 3 million). Illustrated is that in response to messaging 406, Web server software 202 causes a return message 408 to coupon management application program 404 confirming the requested mouthwash rebate changes.

Shown via messaging 410 is that coupon management application program 404, by and/or through Web browser software 402, requests that with respect to first manufacturer's soap rebate 311—located in generic shopping list subcategory soap of generic shopping list category toiletries—the amount of the rebate (e.g., 75 cents) be changed from 75 cents to 25 cents, and that the total number of rebates authorized for the first manufacturer's soap field (e.g., 5 million) be changed from 5 million to 30 million. Depicted is that, in response to the requests to modify contained within messaging 410, the amount of the rebate has been changed from 75 cents to 25 cents (illustrated pictographically by showing a line through 75 cents followed by an arrow pointing to 25 cents) and that the total number of coupons authorized for the first manufacturer's mouthwash has been changed from 5 million to 30 million (illustrated pictographically by showing a line through 5 million followed by an arrow pointing to 30 million). Illustrated is that in response to messaging 410, Web server software 202 causes a return message 412 to coupon management application program 404 confirming the requested soap coupon changes.

Figure 5:
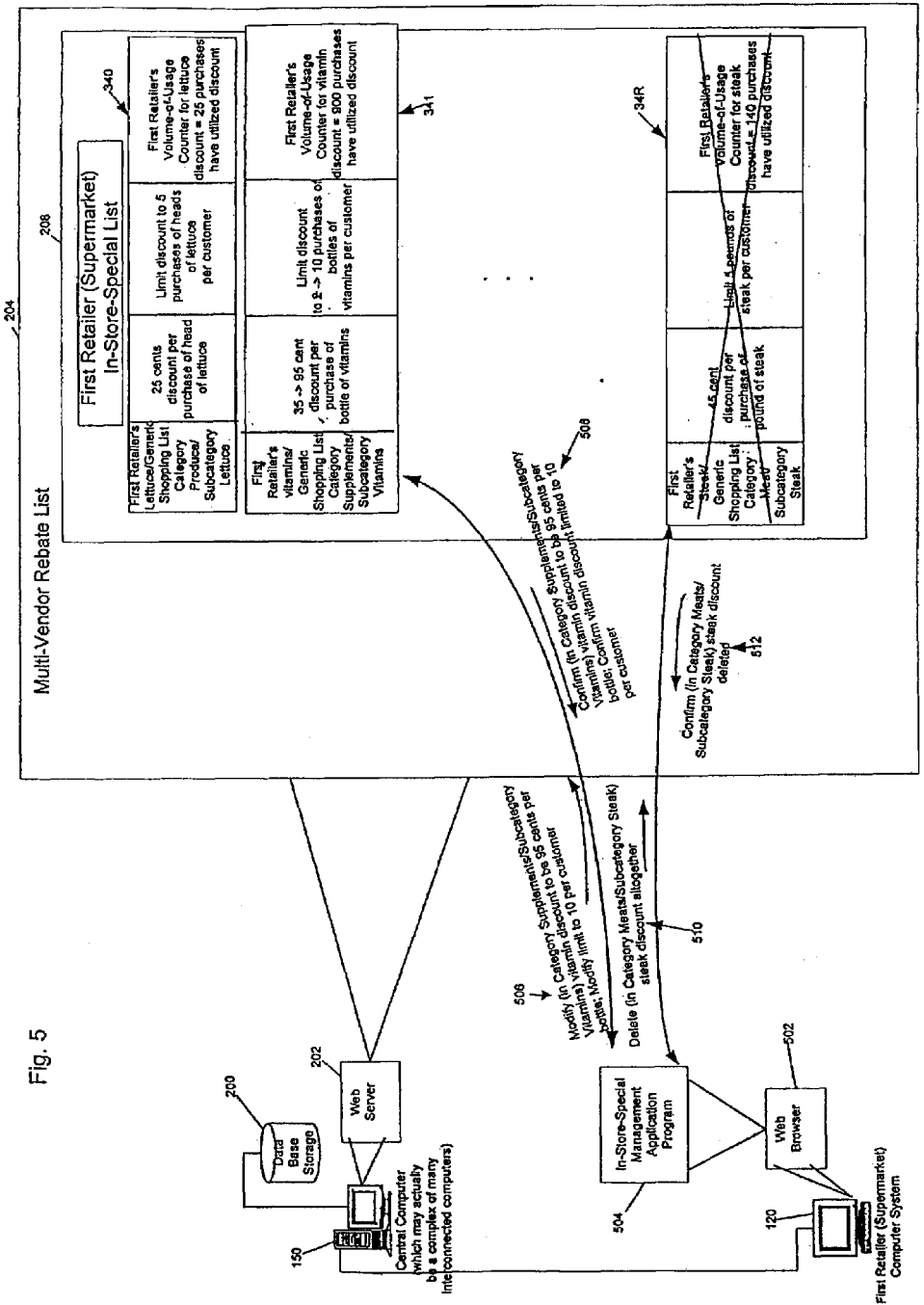
FIG. 5 illustrates first retailer computer system 120 having resident within it in-store-special management application program 504 which communicates with Web server software 202 on central computer system 150 by and/or through Web browser software 502, which is also resident within first retailer computer system 120.

With reference now to FIG. 5, shown is first retailer computer system 120 having resident within it in-store-special management application program 504 which communicates with Web server software 202 on central computer system 150 by and/or through Web browser software 502, which is also resident within first retailer computer system 120. Depicted is that in-store-special management application program 504 causes Web browser software 502 to communicate with Web server software 202, via secure processes identifying first manufacturer computer system 120 (or owner of first manufacturer computer system 120), such that various aspects of rebates contained within multi-vendor rebate list 204 are modified. Illustrated in the context of the first retailer in-store-special list embodiment of first retailer rebate list 208 are instances showing aspects of rebates contained within multi-vendor rebate list 204 being changed.

Shown via messaging 506 is that in-store-special management application program 504, by and/or through Web browser software 502, requests that with respect to first retailer's vitamin rebate 341—located in generic shopping list subcategory vitamins of generic shopping list category supplements—the amount of the rebate (e.g., 35 cents) be changed from 35 cents to 95 cents, and that the total number of rebates authorized for the first retailer's vitamins (e.g., 2 purchases of bottles per customer) be changed from 2 purchases of bottles per customer to 10 purchases of bottles per customer. Depicted is that, in response to the requests to modify contained within messaging 506, the amount of the rebate has been changed from 35 cents to 95 cents (illustrated pictographically by showing a line through 35 cents followed by an arrow pointing to 95 cents) and that the total number of rebates authorized for the first retailer's vitamins has been changed from 2 purchases of bottles per customer to 10 purchases of bottles per customer (illustrated pictographically by showing a line through 2 followed by an arrow pointing to 10). Illustrated is that in response to messaging 506, Web server software 202 causes a return message 508 to in-store-special management application program 504 confirming the requested vitamin rebate changes.

Shown via messaging 510 is that in-store-special management application program 504, by and/or through Web browser software 502, requests that with respect to first retailer's steak rebate 34R—located in generic shopping list subcategory steak of generic shopping list shopping list category meat—the rebate be totally deleted. Depicted is that, in response to the request to strike contained within messaging 510, the steak rebate has been deleted from the first retailer in-store-special list (illustrated pictographically by showing a large X through all the fields of the first retailer's steak rebate). Illustrated is that in response to messaging 510, Web server software 202 causes a return message 512 to in-store-special management application program 504 confirming the requested deletion of the steak rebate.

Although FIGS. 4 and 5 have shown near real-time modification of embodiments of first manufacturer rebate list 206 and first retailer rebate list 208, it is to be understood that the illustrations and supporting text of FIGS. 4 and 5 are meant to illustrate that various different embodiments of aspects of the present invention allow near real-time modification of substantially any rebate for substantially any manufacturer and/or substantially any retailer.

Notice that in the foregoing described embodiments, insofar as access to enter changes to each specific vendor's rebate list is secure and only granted to the specific vendor to whom the rebate list belongs, the rebate data associated with each particular vendor enjoys enhanced security and reliability, since it is typically only the vendor who can change such rebate data.

Figure 6:
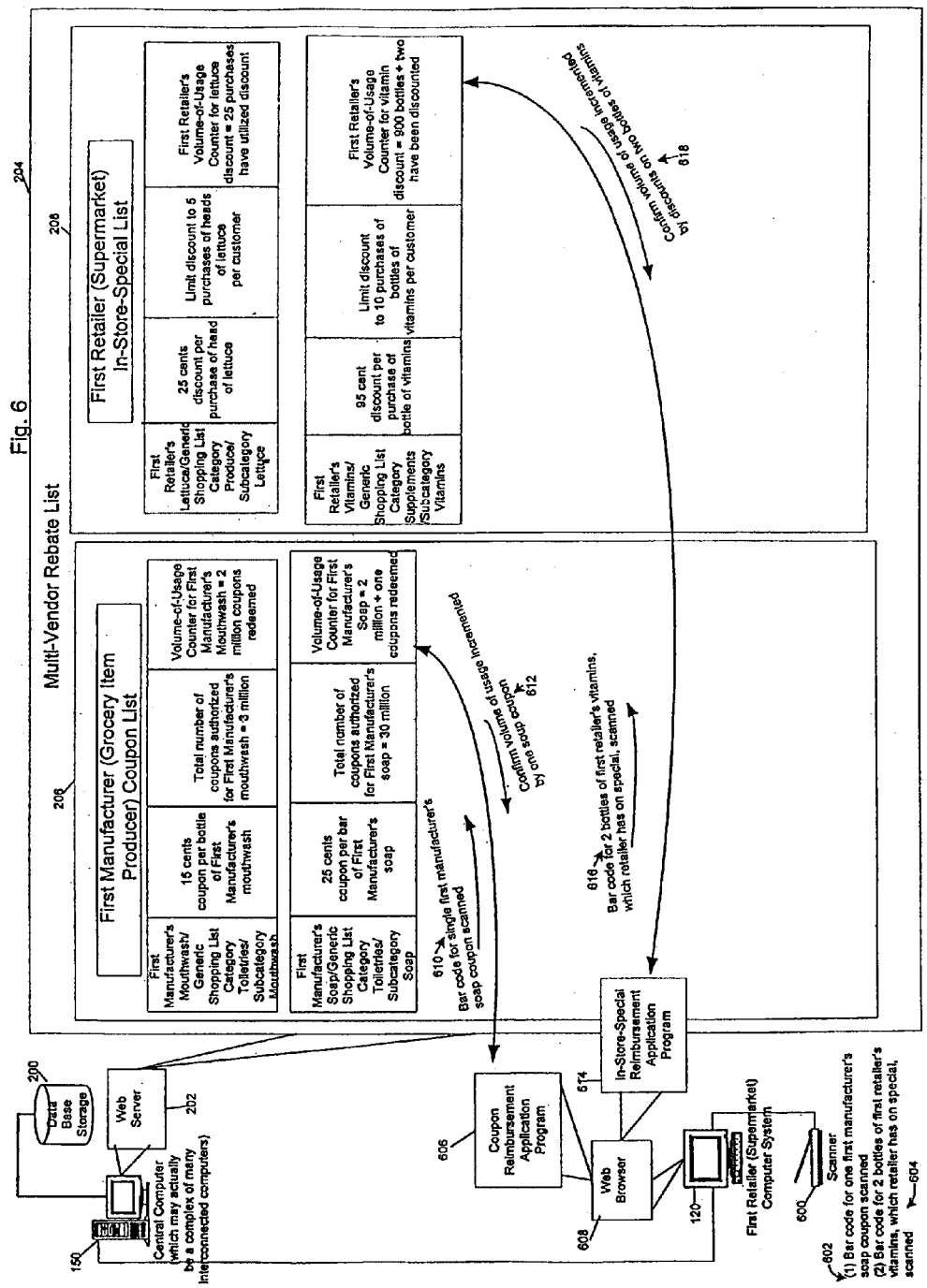
FIG. 6 illustrates scanner 600 interconnected with first retailer computer system 120, such as is typically seen at a supermarket checkout stand.

4. Multi-Vendor Transactions Based on Near-Immediate Rebate Detection and User-Sensitive Rebating Referring now to FIG. 6, illustrated is scanner 600 interconnected with first retailer computer system 120, such as is typically seen at a supermarket checkout stand. Shown is event 602 wherein one bar code for the first manufacturer's soap coupon is scanned on scanner 600 (in one embodiment of the present invention the scanned bar code is one downloaded from Web server software 202 resident on central computer system 150 and printed on a user's personal computer). Depicted is event 604 wherein bar codes for two bottles of the first retailer's vitamins, which the first retailer has on special, is scanned on scanner 600. In one embodiment, the rebate amounts for the soap coupons and vitamin specials are contained within the scanned bar codes and are respectively deducted from the purchase price of the soap and vitamins at the point of sale. However, in another embodiment, the rebate amounts are obtained from Web server software 202 in the fashion described below. Illustrated is that in response to event 602, coupon reimbursement application program 606, by and/or though Web browser software 608, resident within and running on first retailer computer system 120, via messaging 610, informs Web server software 202 that a bar code for one of the first manufacture's soap coupons has been scanned. Shown is that, in response to messaging 610, Web server software 202 causes the volume-of-usage counter for the first manufacturer's soap coupon to be incremented by one. Thereafter, depicted is that Web server software 202, via messaging 612, informs coupon reimbursement application program 606 that the volume-of-usage counter for the first manufacture's soap coupon has been incremented by one soap coupon.

Shown is that in response to event 604, in-store-special reimbursement application program 614, by and/or through Web browser software 608, resident within and running on first retailer computer system 120, via messaging 616, informs Web server software 202 that bar codes for two of the first retailer's vitamins have been scanned. Shown is that, in response to messaging 616, Web server software causes the volume-of-usage counter for the first retailer's vitamin discount to be incremented by two. Thereafter, depicted is that Web server software 202, via messaging 618, informs in-store-special reimbursement application program 614 and that the volume-of-usage counter for the first retailer's vitamin discount has been incremented by two discounts.

As is illustrated, various embodiments of the present invention allow near real-time control and updating of rebate information. Insofar as it is envisioned that rebate information can and probably will change rapidly over time, the possibility for confusion exists with respect to what various parties are owed in light of such rapidly changing rebate information. One advantage of various embodiments of the present invention is that such embodiments allow accurate accounting with respect to amounts owed arising from various rebate transactions.

Figure 7:
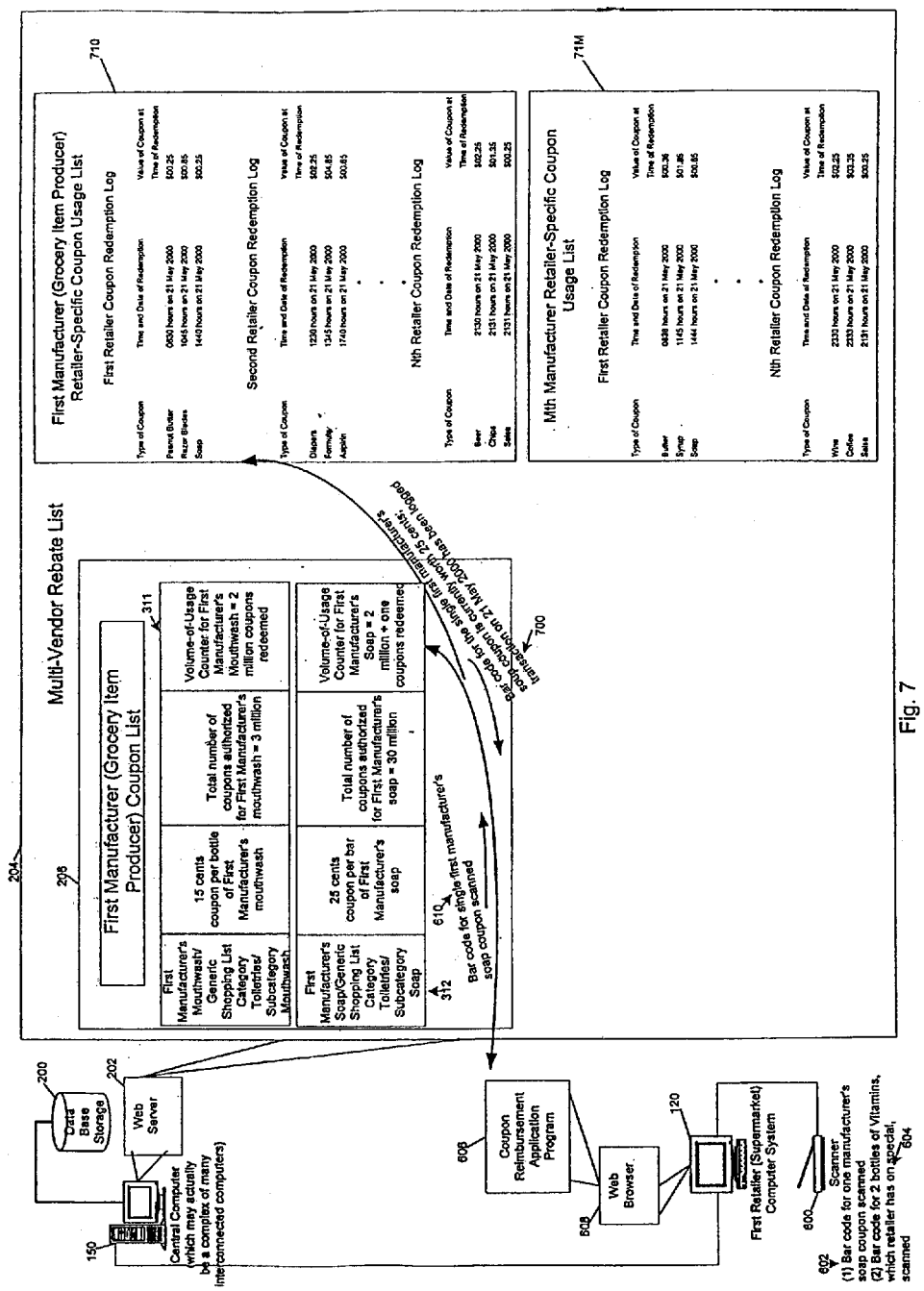
FIG. 7 illustrates that in one embodiment of the present invention multi-vendor rebate list 204 includes First-Mth first manufacturer: retailer-specific coupon usage lists 710-71M (where M is some integer greater than zero).

With reference now to FIG. 7, shown is that in one embodiment of the present invention, multi-vendor rebate list 204 includes First-Mth manufacturer: retailer-specific coupon usage lists 710-71M (where M is some integer greater than zero). Depicted is that in one embodiment of the present invention, each of the First-Mth manufacturer: retailer-specific coupon usage lists 710-71M includes retailer coupon redemption logs for each retailer with access to Web server software 202 residing in and running on central computer system 150 (e.g. shown resident within each of the First-Mth manufacturer: retailer-specific coupon usage lists 710-71M are first retailer coupon redemption log, second retailer coupon redemption log, . . . , and Nth retailer coupon redemption log, which are meant to convey that each retailer computer system 120-12N has a corresponding coupon redemption log within each First-Mth manufacturer: retailer-specific rebate usage list 710-71M contained within multi-vendor rebate list 204). Illustrated is that in one embodiment of the present invention, multi-vendor rebate list 204 includes at least one retailer-specific coupon usage list for each manufacturer with access to Web server software 202 residing in and running one central computer system 150 (e.g., shown are first manufacturer: retailer-specific rebate usage list 710, . . . , and Mth manufacturer: retailer-specific coupon usage list, which are meant convey that each manufacturer computer system 110-11M has a corresponding manufacturer: retailer-specific rebate usage list in multi-vendor rebate list 204).

The occurrences shown in FIG. 7 substantially track the occurrences described in relation to FIG. 6, up to and including messaging 610. However, shown in FIG. 7 is that in addition to the occurrences described in relation to FIG. 6, in response to messaging 610, Web server software 202, residing on and running in central computer system 150: (a) recalls the value of a single first manufacturer's soap coupon from the first manufacturer coupon list; (b) logs the type of coupon, time and date of redemption of the coupon (e.g., 1440 hours on 21 May 2000, and value of the coupon (25 cents) at the time and date of redemption; and (c) thereafter, via messaging 700 informs coupon reimbursement application program 606 of the value of the first manufacturer's soap coupon at the time and date of redemption and that the redemption transaction has been logged. Thereafter, coupon reimbursement application program 606 passes the value of the coupon to software to first retailer computer system 120 which thereafter applies the coupon against the manufacturer's soap purchased by a user in a fashion well-known to those having ordinary skill in the art. With respect to the value of the rebate, in one embodiment, the value is that contained on the bar code itself, while in another embodiment, the value is obtained from the first manufacturer coupon list (as shown in FIG. 7) in near real time. There are various ways in which the requisite information could be encoded, but in one embodiment, the barcode contains fields (a) identifying the barcode as originating from Web server software 202 (or the owner thereof), (b) defining the generic shopping list category and subcategory associated with the item, (c) identifying the vendor offering the rebated item, (d) identifying the specific vendor's item upon which the rebate is being offered, and (e) defining a default rebate value for use in case Web server software 202 is for some reason inaccessible. In addition, when the vendor scanning the barcode interacts with multi-vendor rebate list 204, such vendor also typically sends a code with its query identifying itself so that Web server software 202 can determine who has scanned in the rebate vehicle. However, those skilled in the art will recognize that the foregoing techniques of identification are merely exemplary and that many, like techniques exist in the art for doing such product/vendor/retailer identification. For example, in one embodiment, the Universal Product Code (UPC) manufacturer field is utilized to identify that the bar code scanned is associated with the owner/operator of Web server software 202, and the remaining product code fields, plus the supplemental codes, are used together with a coding scheme to encode the foregoing described information using techniques familiar to those within the art. In addition, in the event that the UPC is again extended beyond the current supplemental codes, it is envisioned that such codes can also be used within the spirit of the present invention. However, that being said, there is no reason why the embodiments described herein absolutely must use the UPC scheme, and other bar-coded schemes could thus be utilized.

The information contained within the various First-Mth manufacturer retailer-specific coupon usage lists 710-71M can be utilized to give substantially real-time accounting of monies owed by various parties (e.g., manufacturers) to various other parties (e.g., retailers) during various periods of time. Such substantially real-time accounting is illustrated in FIGS. 8 and 9, following.

Figure 8:
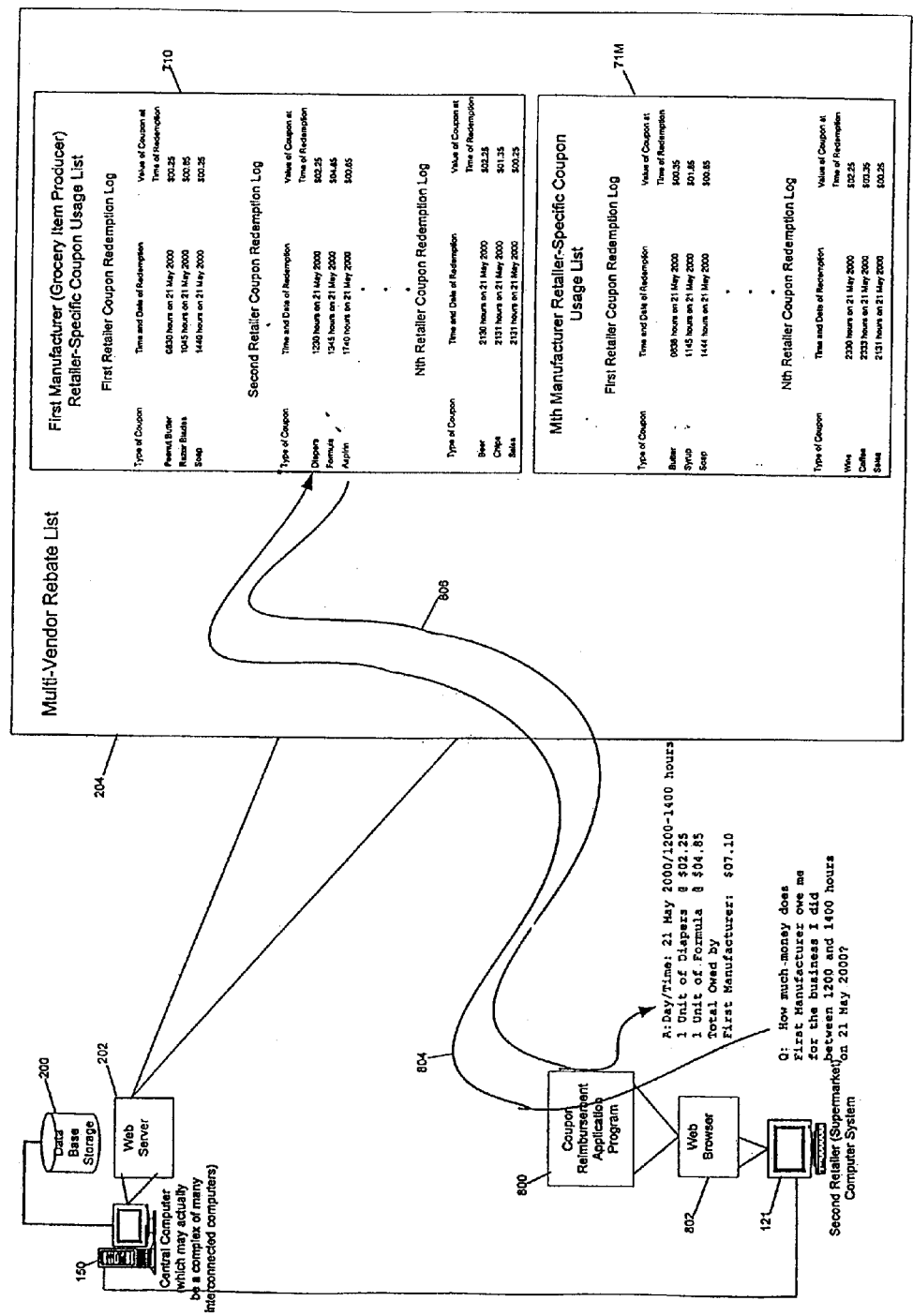
FIG. 8 shows the event of coupon reimbursement application program 800 querying, by and/or through Web browser software 802 resident on second retailer computer system 121, Web server software 202 as to how much money the first manufacturer owes the second retailer for the second retailer's business transactions between 1200 and 1400 on 21 May 2000.

Referring now to FIG. 8, shown is the event of coupon reimbursement application program 800 querying, by and/or through Web browser software 802 resident on second retailer computer system 121, Web server software 202 as to how much money the first manufacturer owes the second retailer for the second retailer's business transactions between 1200 and 1400 on 21 May 2000. Depicted is that such querying takes place via messaging 804 which is achieved via a variety of techniques notorious within the art. Illustrated is that in response to the querying contained within messaging 804 is that, Web server software 202, via messaging 806, returns information sufficient to show that for the time period in question, the first manufacturer owes the second retailer $7.10. As shown, the money owed is calculated based on entries within the second retailer coupon redemption log resident within first manufacturer retailer-specific coupon usage list 710. In one embodiment, the entries within the second retailer coupon redemption log are summarized by software within Web server software 202, and thereafter information sufficient to answer the query is sent to coupon reimbursement application program 800. In another embodiment, the entries within the second retailer coupon redemption log for the time period in question are sent to coupon reimbursement application program 800 and software resident therein calculates the summary of monies owed based on such raw-data entries.

Figure 9:
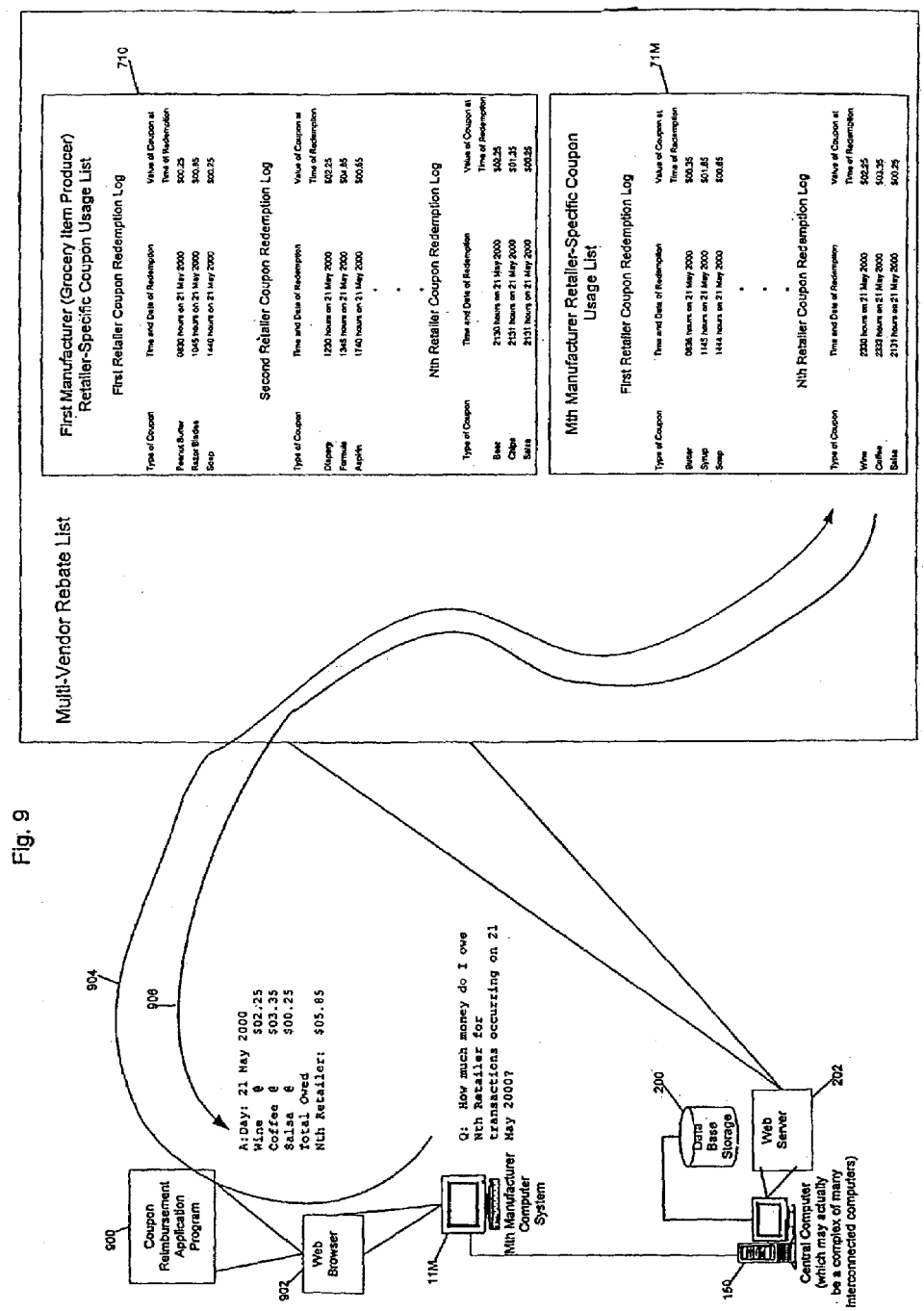
FIG. 9 depicts the event of coupon reimbursement application program 900 querying, by and/or through Web browser software 902 resident on Mth manufacturer computer system 11M, Web server software 202 as to how much money the Mth manufacturer owes the Nth retailer for the Nth retailer's business transactions on 21 May 2000.

With reference now to FIG. 9, depicted is the event of coupon reimbursement application program 900 querying, by and/or through Web browser software 902 resident on Mth manufacturer computer system 11M, Web server software 202 as to how much money the Mth manufacturer owes the Nth retailer for the Nth retailer's business transactions on 21 May 2000. Depicted is that such querying takes place via messaging 904 which is achieved via a variety of techniques notorious within the art. Illustrated is that in response to the querying contained within messaging 904, Web server software, via messaging 906, returns information sufficient to show that for the time period in question (the day of 21 May 2000), the Mth manufacturer owes the Nth retailer $5.85. As shown, the money owed is calculated based on entries within the Nth retailer coupon redemption log resident within Mth manufacturer: retailer-specific coupon usage list 71M. In one embodiment, the entries within the Nth retailer coupon redemption log are summarized by software within Web server software 202, and thereafter information sufficient to answer the query is sent to coupon reimbursement application program 900. In another embodiment, the entries within the Nth retailer coupon redemption log for the time period in question is sent to coupon reimbursement application program 900 and software resident therein calculates the summary of monies owed based on such raw-data entries.

Figure 10:
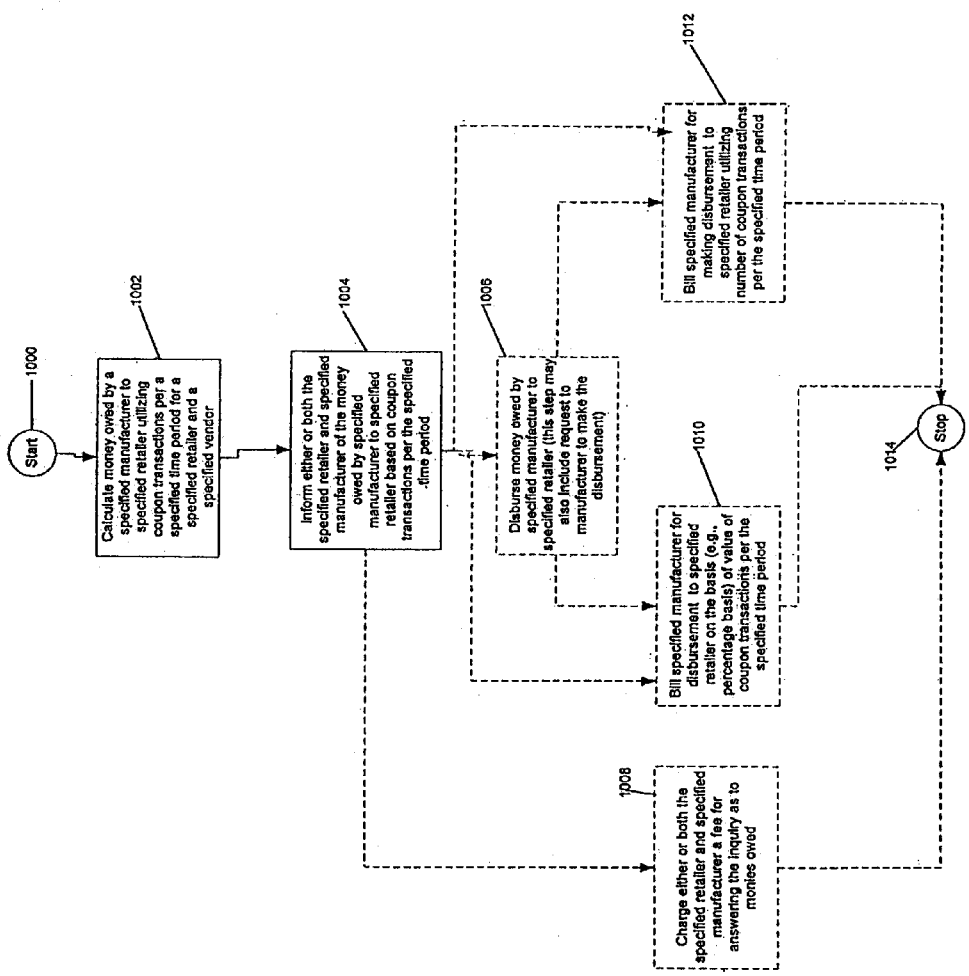
FIG. 10 depicts a high-level logic flowchart having several embodiments of the present invention in which the above-described coupon usage lists can be utilized to generate revenue for the owner/operator of Web server software 202.

Referring now to FIG. 10, shown is a high-level logic flowchart having several embodiments of the present invention in which the above-described coupon usage lists can be utilized to generate revenue for the owner/operator of Web server software 202. Method step 1000 shows the start of the process. Method step 1002 depicts that money owed by a specified manufacturer to a specified retailer is calculated utilizing the rebate transaction records appropriate to the specified manufacturer and specified retailer (e.g., as shown and described above in relation to FIGS. 8 and 9). Method step 1004 illustrates the informing of either or both the specified retailer and specified manufacturer of the money owed by the specified manufacturer to the specified retailer based on coupon transactions per the specified time period. Subsequent to method step 1004, shown is that the process can proceed either to method step 1008 or to method step 1006.

Method step 1006 depicts the optional step (i.e., the process can proceed directly to either method step 1008, 1010, or 1012 completely bypassing method step 1006) of the owner/operator of Web server software 202 disbursing money owed by the specified manufacturer to the specified retailer (as noted, this step (1006) may also include a further optional specific request to the manufacturer either to make the disbursement or for permission for the requestor to make the disbursement, in order to give the manufacturer more control over the disbursement process). Subsequent to method step 1004, shown is that the process can proceed either to method step 1010 or to method step 1012.

Method step 1010 illustrates the owner/operator of Web server software 202 billing the specified manufacturer for disbursement to the specified retailer on the basis of the value of coupon transactions per the specified time period (e.g., the fee charged the manufacturer would be on a percentage based on the value of the coupons). Thereafter, shown is that the process proceeds to method step 1014 and stops.

Method step 1012 depicts the owner/operator of Web server software 202 billing the specified manufacturer for making disbursement to the specified retailer utilizing the number of coupon transactions per the specified time period (e.g., if payout was made on the basis of 50 coupons, the charge would be the 50 coupons times some price per coupon). Thereafter, shown is that the process proceeds to method step 1014 and stops.

Method step 1008 illustrates the owner/operator of Web server software 202 charging either or both the specified retailer and specified manufacturer a fee for answering the inquiry as to monies owed (e.g., a fee of thirty cents per inquiry answered). Thereafter, shown is that the process proceeds to method step 1014 and stops.

Figure 11:
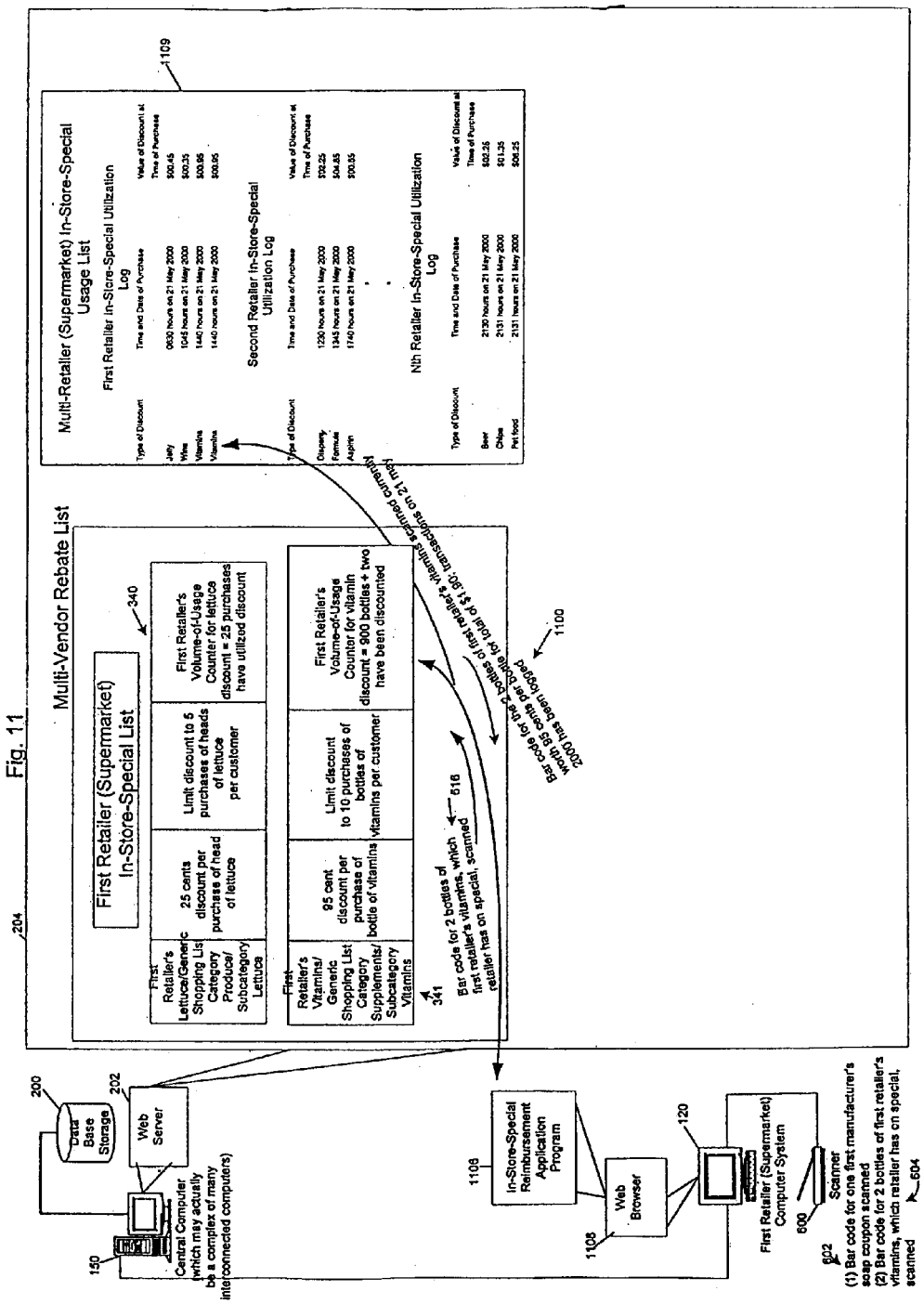
FIG. 11 illustrates that one embodiment of the present invention multi-vendor rebate list 204 includes multi-retailer in-store-special usage list 1109.

With reference now to FIG. 11, shown is that one embodiment of the present invention multi-vendor rebate list 204 includes multi-retailer in-store-special usage list 1109. Depicted is that in one embodiment of the present invention, multi-retailer in-store-special usage list 1109 includes retailer-specific in-store-special utilization logs for each retailer with access to Web server software 202 (e.g., logs for first, second, . . . , Nth retailers) residing in and running on central computer system 150 (e.g. shown are first retailer in-store-special utilization log, second retailer in-store-special utilization log, . . . , Nth retailer in-store-special utilization log, which is to convey that each retailer computer system 120-12N has a corresponding in-store-special utilization log).

The occurrences shown in FIG. 11 substantially track the occurrences described in relation to FIG. 6 up to and including messaging 616. However, shown in FIG. 11 is that in addition to the occurrences described in relation to FIG. 6, in response to messaging 616, Web server software 202, residing on and running in central computer system 150: (a) recalls the value of first retailer's discount per bottle of vitamins from the first retailer in-store-special list; (b) logs the type of discount, time and date of utilization of the discounts (e.g., a first discount utilization on 1440 hours on 21 May 2000 and a second discount utilization on 21 May 2000), and the value of the discounts (95 cents) at the time and date of redemption; and (c) thereafter, via messaging 1100 informs in-store-special reimbursement application program 1106 of the value of the first retailer's in-store-special on the bottle of vitamins at the time and date of redemption and that the discount transaction has been logged. Thereafter, in-store-special reimbursement application program 1106 passes the value of the coupon to software on first retailer computer system 120 which thereafter applies the discount against the first retailer's vitamins purchased by the user in a fashion well-known to those having ordinary skill in the art. With respect to the value of the rebate, in one embodiment, the value is that contained on the bar code itself, while in another embodiment, the value is obtained from the First Retailer's In-Store-Special List (as shown in FIG. 11) in near-real time.

The information contained within the various retailer in-store-special utilization logs can be utilized to give substantially real-time accounting of monies owed the owner/operator of Web server software 202. Such substantially real-time accounting is illustrated in the high level logic flowchart of FIG. 12.

Figure 12:
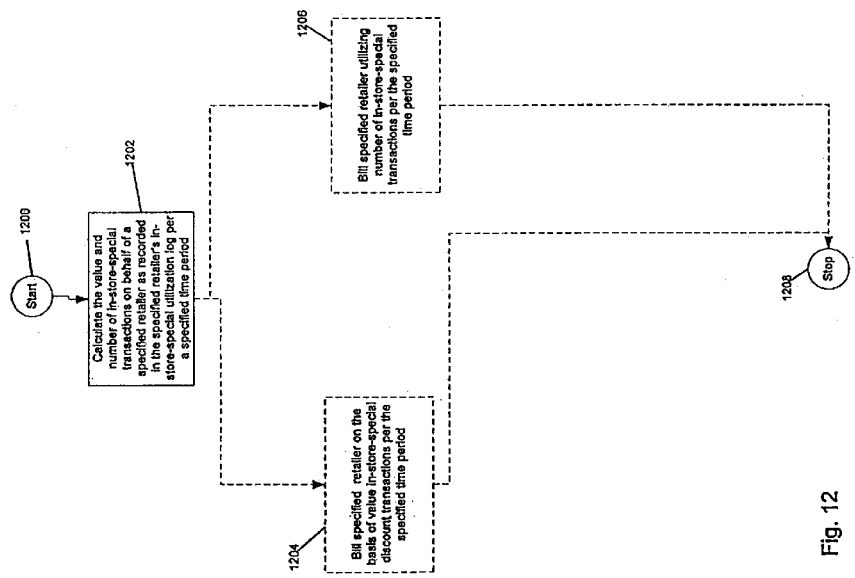
FIG. 12 illustrates a high-level logic flowchart having various embodiments of the present invention in which the above-described in-store-special utilization logs can be utilized to generate revenue for the owner/operator of Web server software 202.

Referring now to FIG. 12, illustrated is a high-level logic flowchart having various embodiments of the present invention in which the above-described in-store-special utilization logs can be utilized to generate revenue for the owner/operator of Web server software 202. Method step 1200 shows the start of the process. Method step 1202 depicts calculating the value and number of in-store-special transactions on behalf of a specified retailer as recorded in the specified retailer's in-store-special utilization log per a specified time period. Subsequent to method step 1202 are shown two alternate paths: one through method step 1204 and the other through method step 1206.

Method step 1204 illustrates the owner/operator of Web server software 202 billing the specified retailer on the basis of the value in-store-special discount transactions per the specified time period (e.g., as a percentage of the total dollar amount of discounts handled). Thereafter, shown is that the process proceeds to method step 1208 and stops.

Method step 1206 depicts the owner/operator of Web server software 202 billing the specified retailer utilizing the number of in-store-special transactions per the specified time period (e.g., if 40 discounts logged, bill the retailer based on some cost per logged discount). Thereafter, shown is that the process proceeds to method step 1208 and stops.

The discussion thus far has described various rebates having the forms of coupons (e.g., manufacturer or retailer coupons) and discounts (e.g., manufacturer or retailer in-store-special discounts), but has yet to describe how such coupons can be generated and how revenues can be created by such generation. The following discussion addresses this issue.

Figure 13A:
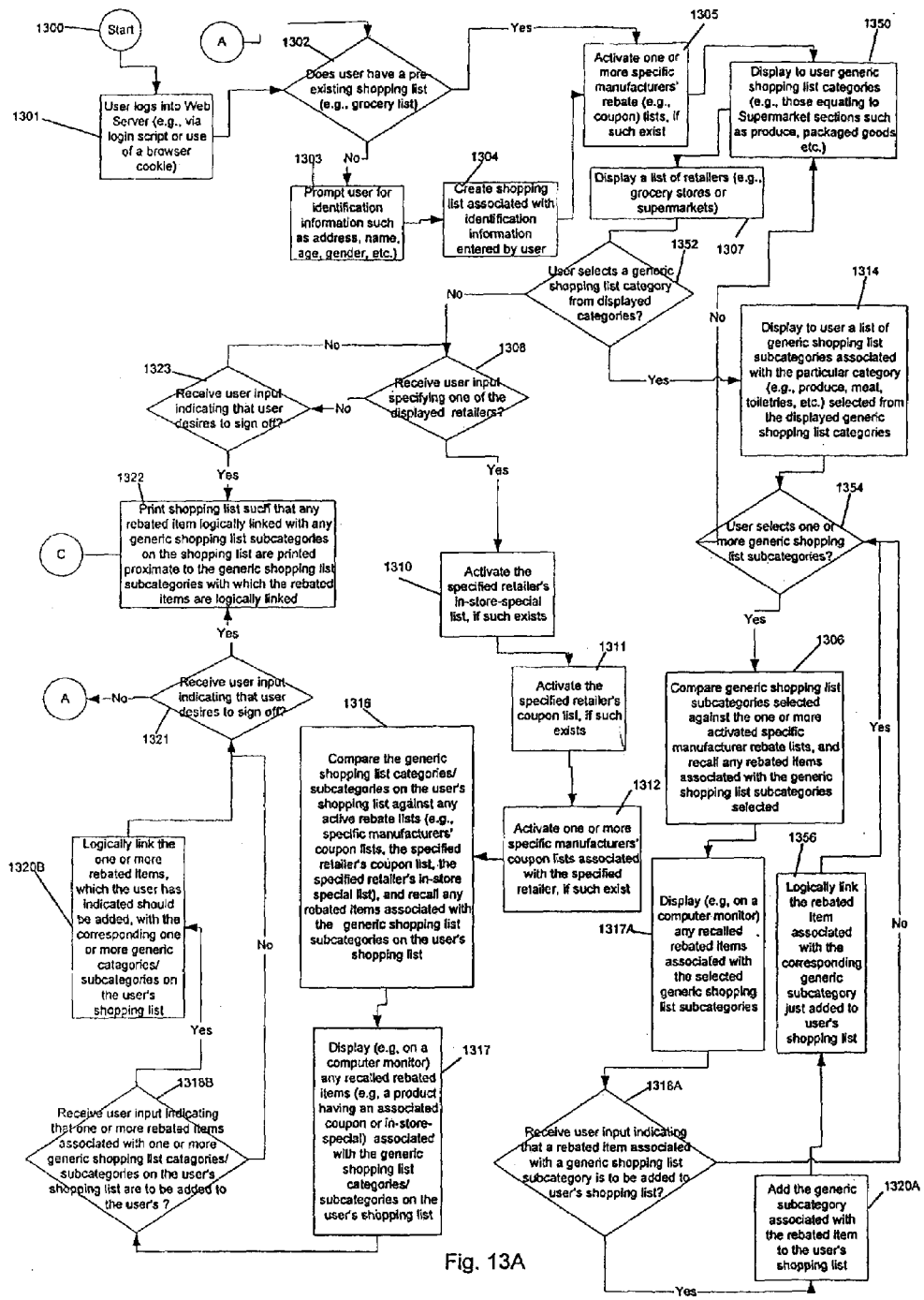
FIGS. 13A and 13B depict a high-level logic flowchart showing embodiments of the present invention whereby rebates (in various forms) can be generated and revenues created from such generation.
Figure 13B:
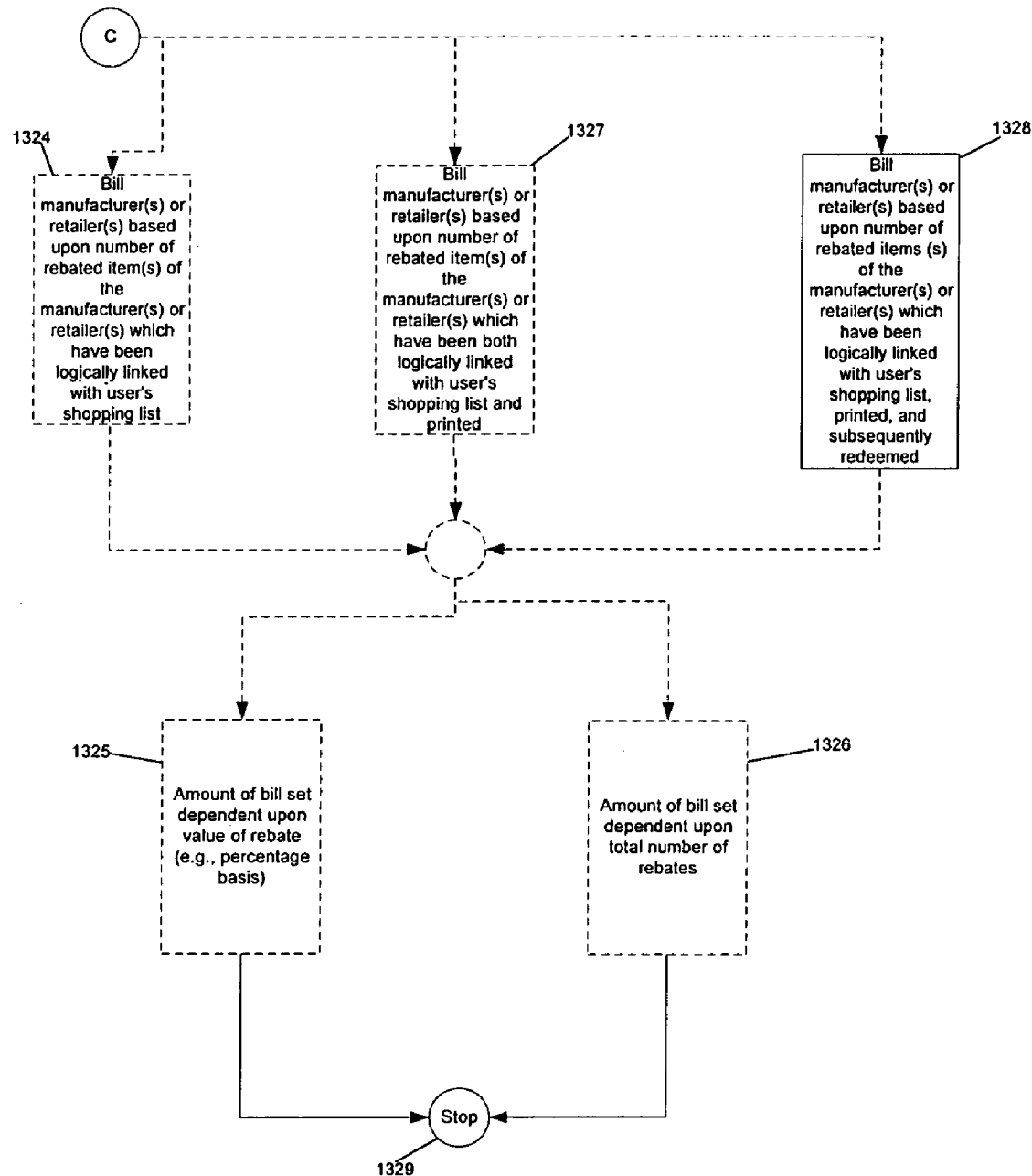

With reference now to FIGS. 13A and 13B, shown is a high-level logic flowchart showing embodiments of the present invention whereby rebates (in various forms) can be generated and revenues created from such generation.

Method step 1300 depicts the start of the process. Method step 1301 illustrates a user logging into a Web Server (e.g., logging into the above described Web server 202 via a login script or use of a browser cookie), which is generally achieved by use of a Web browser.

Method step 1302 shows the inquiry "does the logged-in user have a pre-existing shopping list (e.g., grocery list)?" In the event that the inquiry shown in method step 1302 is answered in the negative, the process proceeds to method step 1303 which depicts the operation of prompting user for identification information such as address, name, age, gender, etc., which is generally achieved by the display of a Web page form in the user's Web browser. Thereafter, method step 1304 illustrates creating a shopping list associated with identification information entered by the user; that is, a shopping list is created for the user. Thereafter, the process proceeds to method step 1305.

In the event that the inquiry shown in method step 1302 is answered in the affirmative, the process proceeds to method step 1305. Method step 1305 shows the activation of one or more specific manufacturers' rebate (e.g., coupon) lists, if such exist; that is, the fact that the user is logged into the Web server and now has a shopping list triggers the activation of any and all manufacturers' rebate lists.

Method step 1350 depicts the operation of displaying a number of selectable generic shopping list categories to the user (e.g., via Web page 1800 which shows generic shopping list categories which equate to the goods sections normally found in a physical grocery store). Method step 1307 illustrates displaying a list of retailers (e.g., causing a listing of links associated with grocery stores or supermarkets to appear on the user's Web browser such as FIGS. 15 and 18). Method step 1352 illustrates an inquiry as to whether the user has selected one of the displayed generic shopping list categories.

In the event that the inquiry depicted in method step 1352 yields a determination that the user has selected a shopping list category from the displayed categories, shown is that the process proceeds to method step 1314. Method step 1314 shows the operation of displaying to the user a list of generic shopping list subcategories (e.g., Cooking Oil, Salt, Cheese) associated with the particular generic shopping list categories (e.g., Produce, Meat, Toiletries, etc.) which the user selected from the displayed list of generic shopping list categories (e.g., via use of Web pages described in FIGS. 20-25). Thereafter, method step 1354 depicts the inquiry as to whether the user has selected one or more subcategories from the displayed generic shopping list subcategories.

In the event that the inquiry shown in method step 1354 is answered in the affirmative, depicted is that the process proceeds to method step 1306 wherein is illustrated the comparison of the selected generic shopping list subcategories against the one or more activated specific manufacturer rebate lists (i.e., those activated in method step 1305), and recalling from the activated rebate lists any rebated items associated with the generic shopping list category/subcategory selected by the user (where the selection of the category was illustrated in method step 1352 and the selection of the subcategory or subcategories were illustrated in method step 1354); recall that the rebate lists are organized, or keyed, to the generic categories and subcategories as shown in FIGS. 2-7, so such searching and recall can be done in a relatively straightforward fashion. Thereafter, method step 1317A shows displaying (e.g., on the user's Web browser displayed on the monitor of the user's home computer) any recalled rebated item(s) (e.g., an item having an associated coupon or in-store-special) which are associated with the user specified generic shopping lists category/subcategories, where such displaying is in such a way that the human user can discern those rebates which have been logically linked with the specified product; for example, via text of proximity placement of the linked rebates (e.g., "the product you have selected has a 15 cent rebate associated with it" such as shown via the mushroom icon in FIG. 20).

Method step 1318A depicts the inquiry of whether receipt has been made of user input indicating that a rebated item associated with a generic subcategory is to be added to the user's shopping list (e.g., receipt by the Web server software subsequent to the user entering the input into his Web browser selecting a particular product or a category of products to buy) such as by a user activating save-on-shopping-list hyperlink 1609 in FIG. 20 In the event that the inquiry of method step 1318A is answered in the negative, the process proceeds to method step 1354 and proceeds from that point. In the event that the inquiry shown in method step 1318A is answered in the affirmative, the process proceeds to method step 1320A.

Method step 1320A shows adding the generic subcategory associated with the rebated item to be added the user's shopping list (i.e., that rebated item indicated in method step 1318A) to the user's shopping list (it should be noted that such adding can be on a permanent or temporary basis, as described in relation to various embodiments, below). Thereafter, the method step 1356 depicts logically linking the rebated item to the generic subcategory just added to the user's shopping list; that is, since the system described herein typically keys off the generic shopping list categories and subcategories, the way rebated items are ultimately printed (as demonstrated below), is to first add the generic subcategory associated with a particular rebated item to a user's shopping list (assuming such generic subcategory is not already represented on the user's shopping list), and thereafter logically linking the rebated item with the generic subcategory, such logical linking ultimately being used to print rebates associated with various generic subcategories on the user's shopping list. Thereafter, shown is that the process proceeds to method step 1354 and continues from that point.

Returning now to method step 1354, in the event that the inquiry shown in method step 1354 is answered in the negative, depicted is that the process proceeds to method step 1350 and proceeds from that point.

Returning now to method step 1352, shown is that if the inquiry shown in method step is answered in the negative, the process proceeds to method step 1308.

Method step 1308 shows the inquiry "has user entered input into his Web browser (in one embodiment, such input being ultimately transmitted to the Web server) specifying one of the displayed retailers?" In the event that the inquiry of method step 1308 is answered in the affirmative, the process proceeds to method step 1310.

Method step 1310 illustrates activating the specified retailer's in-store-special list, if such exists; method step 1311 shows activating the specified retailer's coupon list, if such exists; method step 1312 depicts activating one or more specific manufacturers' coupon lists specifically identified with the specified retailer, if such exist (for example, if a supermarket chain has reached a special arrangement with a certain manufacturer, such special deals would appear in this type of list—the non-retailer specific manufacturers' rebates were previously shown as being activated in method step 1305, above).

Method step 1316 illustrates comparing the generic shopping list subcategories on the user's shopping (e.g., subcategory Eggs shown in FIG. 27) against any active rebate lists (e.g., specific manufacturers' coupon lists, the specified retailer's coupon list, the specified retailer's in-store special list, etc.), and recalling any rebated items associated with the generic shopping list subcategories from such active rebate lists. Thereafter, method step 1317 shows displaying (e.g., on the user's Web browser displayed on the monitor of the user's home computer) any recalled rebated item(s) (e.g., products having associated coupons or in-store-specials) associated with the generic shopping list subcategories on the user's shopping list, where such displaying is in such a way that the human user can discern that rebates which have been logically linked with the specified product; for example, via text of proximity placement of the linked rebates (e.g., "the product you have selected has a 15 cent rebate associated with it" such as shown via the mushroom icon in FIG. 20).

Thereafter, method step 1318B depicts the inquiry of whether receipt has been made of user input indicating that one or more rebated items associated with one or more generic shopping list categories/subcategories (e.g., such as the generic shopping list categories and subcategories shown in FIG. 27) are to be added to the user's shopping list (e.g., receipt by the Web server software subsequent to the user entering the input into his Web browser selecting a particular product or a category of products to buy) such as by a user activating save-on-shopping-list hyperlink 1609 in FIG. 20. In the event that the inquiry of method step 1318B is answered in the negative, the process proceeds to method step 1321 and proceeds from that point. In the event that the inquiry shown in method step 1318B is answered in the affirmative, the process proceeds to method step 1320B.

Method step 1320B shows logically linking the one ore more rebated items, which the user has indicated should be added, with the corresponding one or more generic categories/subcategories on the user's shopping list (e.g., such as are illustrated in FIG. 27), which is done in response to the user indicating that the rebated item is to be added (either permanently or temporarily in various embodiments) to the user's shopping list, as referenced in relation to method step 1318B. Thereafter, the process proceeds to method step 1321 which depicts the inquiry as to whether receipt has been made of user input indicating that the user desires to sign off (e.g., receipt by the Web server subsequent to the user indicating that the user desires to sign off by activating a sign-off command button within a Web page displayed in the user's Web browser).

In the event that the inquiry of method step 1321 is answered in the negative, the process proceeds to method step 1302 and proceeds from that point (this essentially restarts the process). In the event that the inquiry of method step 1321 is answered in the affirmative, the process proceeds to method step 1322 which illustrates the printing of the user's shopping list on the user's printer (e.g., on his home computer) where the printing is such that any rebates logically linked with any items on the shopping list are printed proximate to the items with which the rebates are logically linked (such as shown in FIG. 27). Thus, as can be seen, the logical linking, described above, eventually is used to print rebated items in relatively close proximity to their respective generic shopping list categories/subcategories. In one embodiment of the present invention, it is these coupons that are used and redeemed in the above described embodiments related to rebate control, redemption, and payments related thereto.

Subsequent to method step 1322, the process can take any one of the alternate paths through method steps 1324, 1327, or 1328 which show alternate routes by which the Web server owner/operator can create revenues based on providing the above-described rebate-oriented services to retailers and manufacturers. Method step 1324 depicts the Web server owner/operator billing manufacturer(s) or retailer(s) based upon number of rebated item(s) of the manufacturer(s) or retailer(s) which have been logically linked to an item (e.g., even if a user never purchases a related item, just the fact that a logical link was formed, such as links formed with pre-existing generic shopping list subcategories on a user's shopping list or links formed with user specification of generic shopping list subcategories as described above in relation to method steps 1306 and 1316). Subsequent to method step 1324, depicted is that the process can take any one of the alternate routes through method steps 1325 or 1326.

Method step 1325 illustrates the owner/operator of Web server software 202 setting the amount of billing dependent upon the value of rebated items, which typically means a percentage basis of the rebates involved. Thereafter, the process proceeds to method step 1329 and stops.

Method step 1326 shows the owner/operator of Web server software 202 setting the amount of billing dependent upon the total number of rebates, which typically means a flat fee per rebate. In one embodiment, an additional feature is present in that any coupons over a preset number of rebate are essentially free in that no charge is made for them (e.g., any rebates over 20 are not used in the billing calculation). Thereafter, the process proceeds to method step 1329 and stops.

Method step 1327 depicts the owner/operator of Web server software 202 billing manufacturer(s) or retailer(s) based upon the number of rebated items(s) of the manufacturer(s) or retailer(s) which have been both logically linked to generic shopping list subcategories of the user's shopping list and subsequently printed. Thereafter, the process may take any of the two routes through method steps 1325 and 1326 as previously described.

Method step 1328 illustrates the owner/operator of Web server software 202 billing manufacturer(s) or retailer(s) based upon the number of rebated item(s) of the manufacturer(s) or retailer(s) which have logically linked to generic shopping list subcategory or subcategories of the user's shopping list, printed, and subsequently redeemed. Thereafter, the process may take any of the two routes through method steps 1324 and 1326 as previously described.

Returning now to the negative branch of the inquiry of method step 1308, in the event that the inquiry of method step 1308 is answered in the negative, the process proceeds to method step 1323. Method step 1323 shows the inquiry as to whether receipt has been made of user input indicating that user desires to sign off (e.g., receipt by the Web server subsequent to the user entering input into his Web browser indicating that the user desires to sign off). If the inquiry shown in method step 1323 is answered in the negative, depicted is that the process proceeds to method step 1308 and proceeds in the manner previously described. In the inquiry shown in method step 1323 is answered in the affirmative, depicted is that the process proceeds to method step 1322 and thereafter proceeds in the manner previously described.

Notice that in the foregoing discussion, in certain embodiments the amount of rebates are gleaned from rebate lists resident within Web server software 202 in near-real time, and that such gleaning results in a recordation of the vendor wherein the rebate was utilized, the time at which the rebate was utilized, and the amount of the rebate. Consequently, insofar as the amount of the rebate is determined from a secure rebate list uniquely accessible and controllable by the rebate issuer, embodiments of the present invention provide increased security and decreased risk of fraud, since the amount of rebate is gleaned from the secure rebate list, and does not rely on an amount printed on the rebate form. In addition, the fact that the vendor at which the rebate was utilized is also recorded likewise decreases the risk of fraud since accountability of redeeming entities is maintained.

With reference now to FIGS. 14-27, and 31-32, shown are illustrations which demonstrate the user experience of the process described in relation to FIGS. 13A-B.

Figure 14:
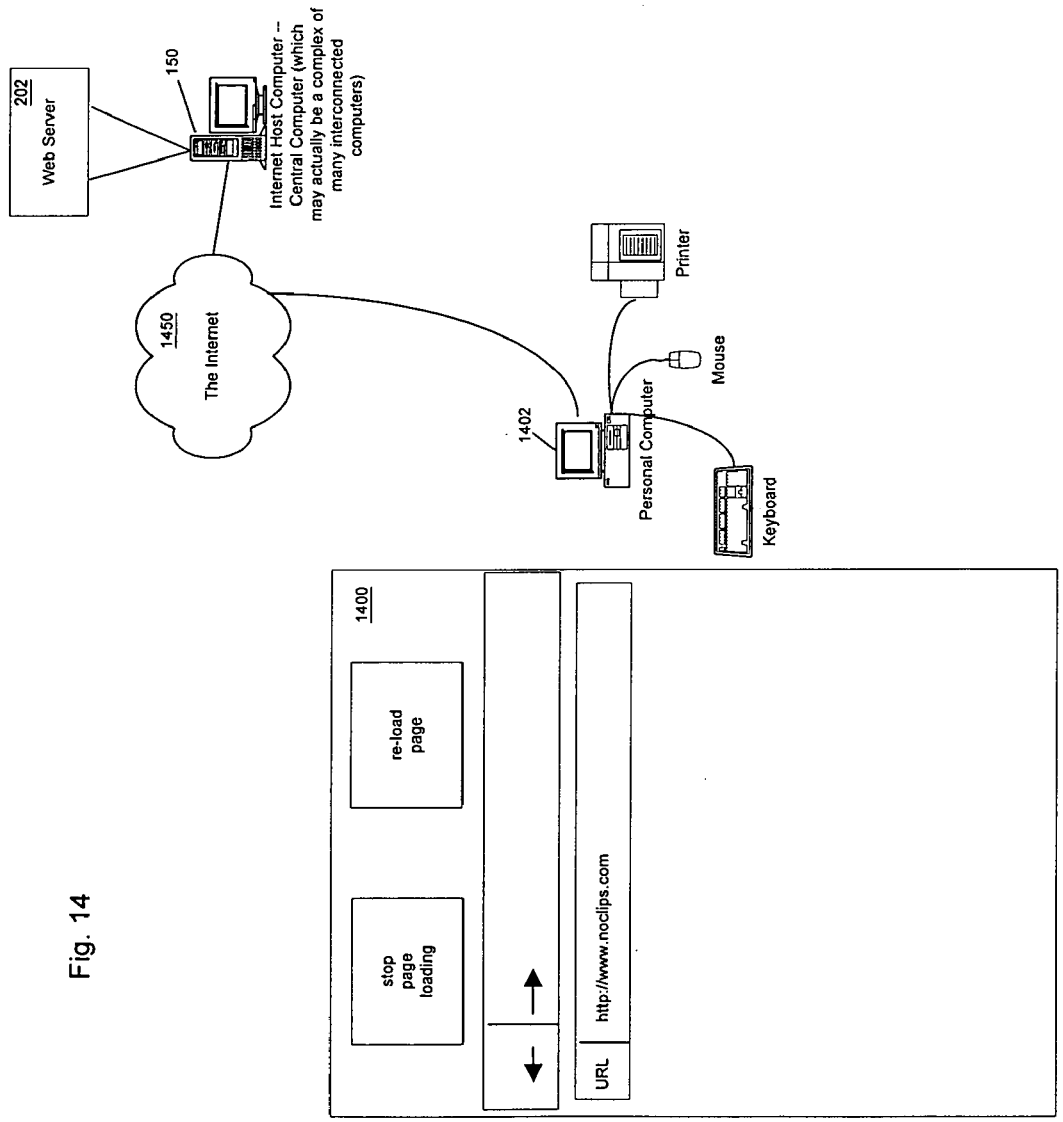
FIG. 14 depicts an environment in which embodiments of the present invention may be practiced.

Referring now to FIG. 14, depicted is an environment in which embodiments of the present invention may be practiced. Shown are computer system 150 and Web server software 202 as have been discussed above. Depicted is personal computer 1402 on which is resident and running Web browser 1400 (e.g., Netscape or Microsoft Web browsers). Illustrated is that personal computer 1402 and Web server browser 1400 communicate over Internet 1450 with Web server software 202. Further shown is that personal computer 1402 has a monitor, keyboard, mouse, and printer. Personal computer 1402 is merely illustrative and can be implemented with virtually any personal computer, such as notebook, desktop, palm held or other computing platforms. In addition, although the discussion herein describes display to users and interaction by users with Web browser software running on personal computers, it is meant to be understood that the embodiments described herein can also be equally well implemented using other platforms such as palm computing platforms and operating systems appropriate to such palm computing platforms.

With reference now to FIGS. 15-27, and 31-32, depicted are illustrations of Web pages showing various embodiments of the present invention, which can be practiced in the context of an environment such as that described in relation to FIG. 14.

Figure 15:
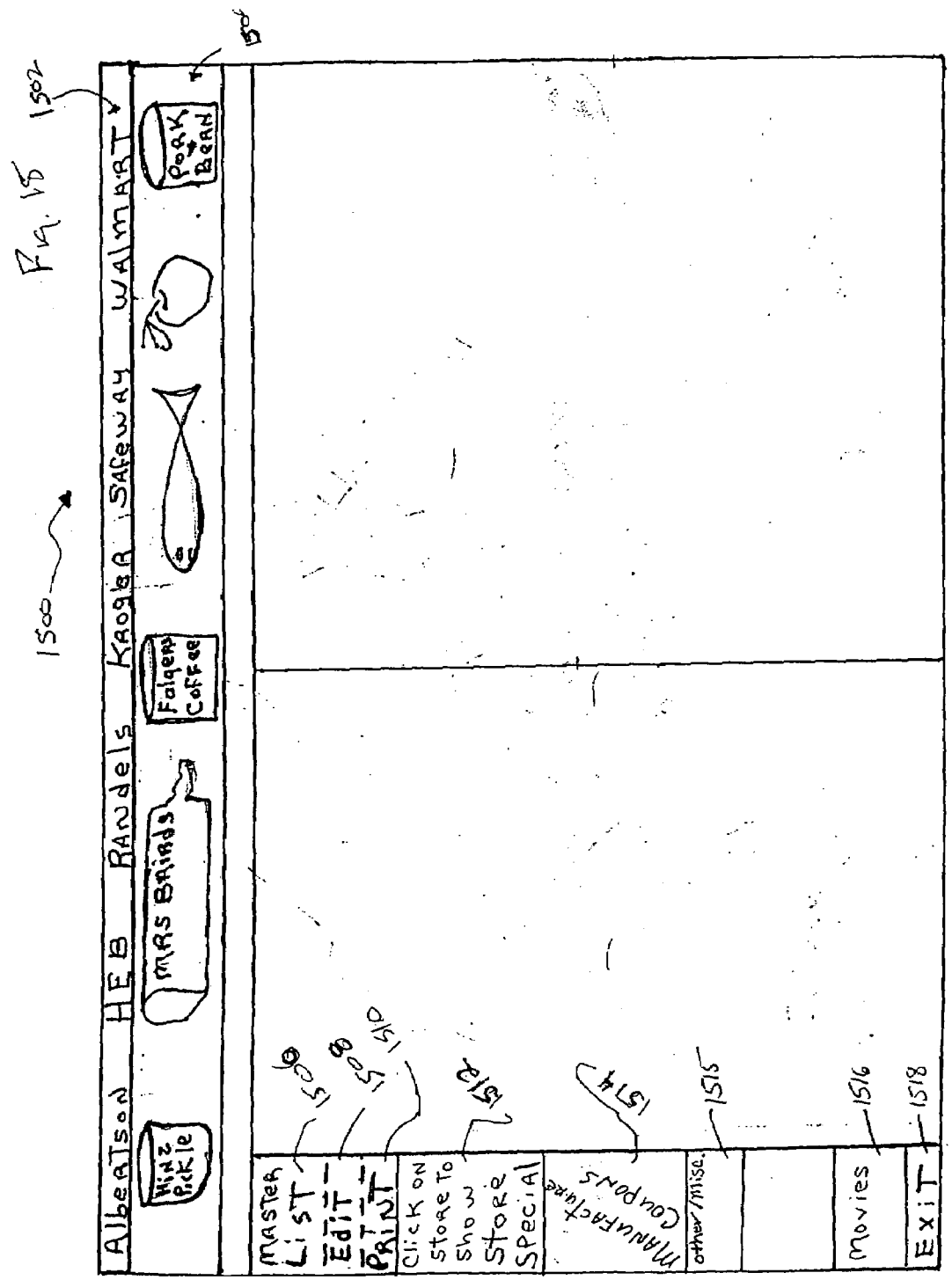
FIG. 15 illustrates Web page 1500, which in one embodiment, is what user sees on Web browser 1400 after he or she has logged into Web server software 202.

Referring now to FIG. 15, illustrated is Web page 1500, which in one embodiment, is what a user sees on Web browser 1400 after he or she has logged into Web server software 202. Shown are retailer-logo bit-mapped hyperlinks 1502, which in one embodiment of the present invention indicate the business names of various grocery stores, supermarkets, and/or other retailers. Also shown are manufacturer-logo bit-mapped hyperlinks 1504, which in one embodiment of the present invention indicate manufacturers and/or wholesalers (as used herein, the term "manufacturers" is intended to also be representative of wholesalers, although both terms are utilized herein in various contexts). Further shown is that Web page 1500 has display-master-shopping-list bit-mapped hyperlink 1506, edit-master-shopping-list bit-mapped hyperlink 1508, print-master-shopping-list bit-mapped hyperlink 1510, show-store-special bit-mapped hyperlink 1512, show-manufacturer-coupons hyperlink 1514, show-proximity-movies hyperlink 1516, and exit-system hyperlink 1518. Further shown is other/miscellaneous bit-mapped hyperlink 1515, which is meant to illustrate that other embodiments of the present invention are envisioned which are not strictly grocery oriented; for example, the present invention can be utilized by almost any vendor who offers rebates, such as auto parts stores, sporting goods stores, drug stores, etc.

As referenced above in relation to FIGS. 13A-B, a user will typically be required to create a shopping list having generic shopping list categories and subcategories when he logs onto Web server 202, at which time the user will typically be prompted for his address, shopping preference location, age, name, and other like data. Utilizing such information, in one embodiment of the present invention the shopping list will be maintained across visits to Web server 202 in recognition of the fact that many people don't change their grocery list substantially from week to week. It will be shown below how in one embodiment, a user can create such a shopping list. However, assume for sake of illustration during the following discussion of FIGS. 16 and 17 that a user accessing Web page 1500 has already logged into Web server 202 and already has a pre-existing shopping list (e.g., created on a user's previous visit to Web server 202) with at least several generic subcategory items. In one embodiment this shopping list is not associated with a particular retailer, but in other embodiments it is.

Activation of print-master-shopping-list bit-mapped hyperlink 1510 results in automatically printing all coupons or specials linked with items or products on the user's shopping list (e.g., the shopping list shown as having generic shopping list subcategories wherein are shown the quantity of subcategory items and wherein are printed in proximity product icons (which in one embodiment show the item's size and appearance) and bar codes representing rebates on those product icons such as that shown in FIG. 27). Accordingly, in one embodiment where the shopping list is associated with a particular retailer, activation of print-master-shopping-list bit-mapped hyperlink 1510 results in comparison of the generic shopping list categories and/or subcategories on the user's shopping list with rebated item(s) for the particular retailer as well as for manufacturers. In another embodiment where the shopping list is not pre-associated with a particular retailer, activation of print-master-shopping-list bit-mapped hyperlink 1510 results in the software prompting the user for selection of a particular retailer; thereafter, subsequent to the user selecting a retailer in response to such prompting, comparison of the generic shopping list categories and/or subcategories on the user's shopping list with rebated item(s) for the particular retailer as well as for manufacturers. In yet another embodiment, the shopping list is not associated with a particular retailer, and thus activation of print-master-shopping-list bit-mapped hyperlink 1510 merely results in comparison of the generic shopping list categories and/or subcategories on the user's shopping list with manufacturer rebated item(s). If the foregoing referenced comparison(s) reveal rebated item(s) corresponding to the generic categor(ies) and/or subcategories on the user's shopping list, in one embodiment these rebated items are linked with the generic shopping list categories and/or subcategories and thereafter subsequently printed when the user's shopping list is printed. Continuing to refer to FIG. 15, in one embodiment, assuming that a shopping list already exists, the shopping list is associated with a particular vendor by the user pointing and clicking (e.g., via use of a mouse in conjunction with a graphical user interface) on one of the vendors in retailer-logo bit-mapped hyperlinks 1502. That is, recalling that the shopping list is generic, the retailer logo bit-mapped hyperlinks 1502 provide a mechanism whereby the generic list can be associated with a specific retailer, a benefit of which is that the user can rapidly cycle amongst various retailers, seeing what they have to offer in the way of rebates in relation to the generic subcategories on the user's shopping list. Thereafter, with the generic shopping list so associated with a particular vendor, activation of show-store-special bit-mapped hyperlink 1512 will cause all specials for the vendor associated with the shopping list (e.g., a retailer such as a supermarket) to be displayed; in another embodiment activation of show-store-special bit-mapped hyperlink 1512, followed by activation of one of the retailer-logo bit-mapped hyperlinks 1502, will cause all specials for the retailer (e.g., a supermarket) to be displayed (i.e., the order of activation of the hyperlinks can be reversed).

In one embodiment specials for the retailer are displayed via sequential display of at least one Web page, where each Web page in the sequence is clearly associated with the particular retailer whose hyperlink was just previously activated, and where each Web page shows the current rebated items for the retailer associated with the generic shopping list subcategories either already on the user's shopping list; for example, "this week, Safeway offers a 2 for 1 special on pork and beans," if the pork and beans generic subcategory is on the user's shopping list. In another embodiment (not shown), the user is allowed to request that Web pages show all specials of the store irrespective of what is on the user's shopping list.

Figure 16:
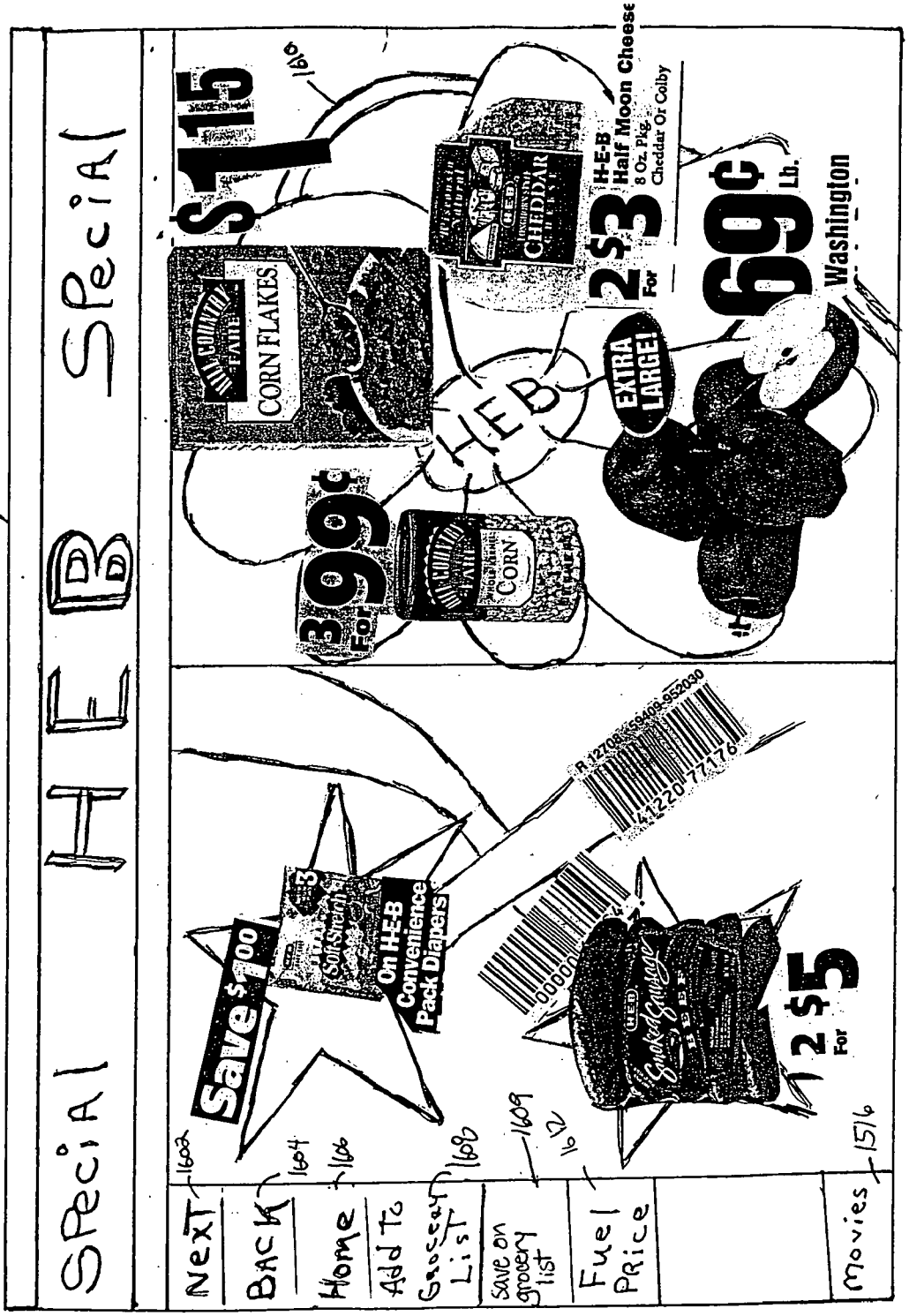
FIG. 16 depicts rebates which generally are deducted from a purchaser's bill at check-out.
Figure 21:
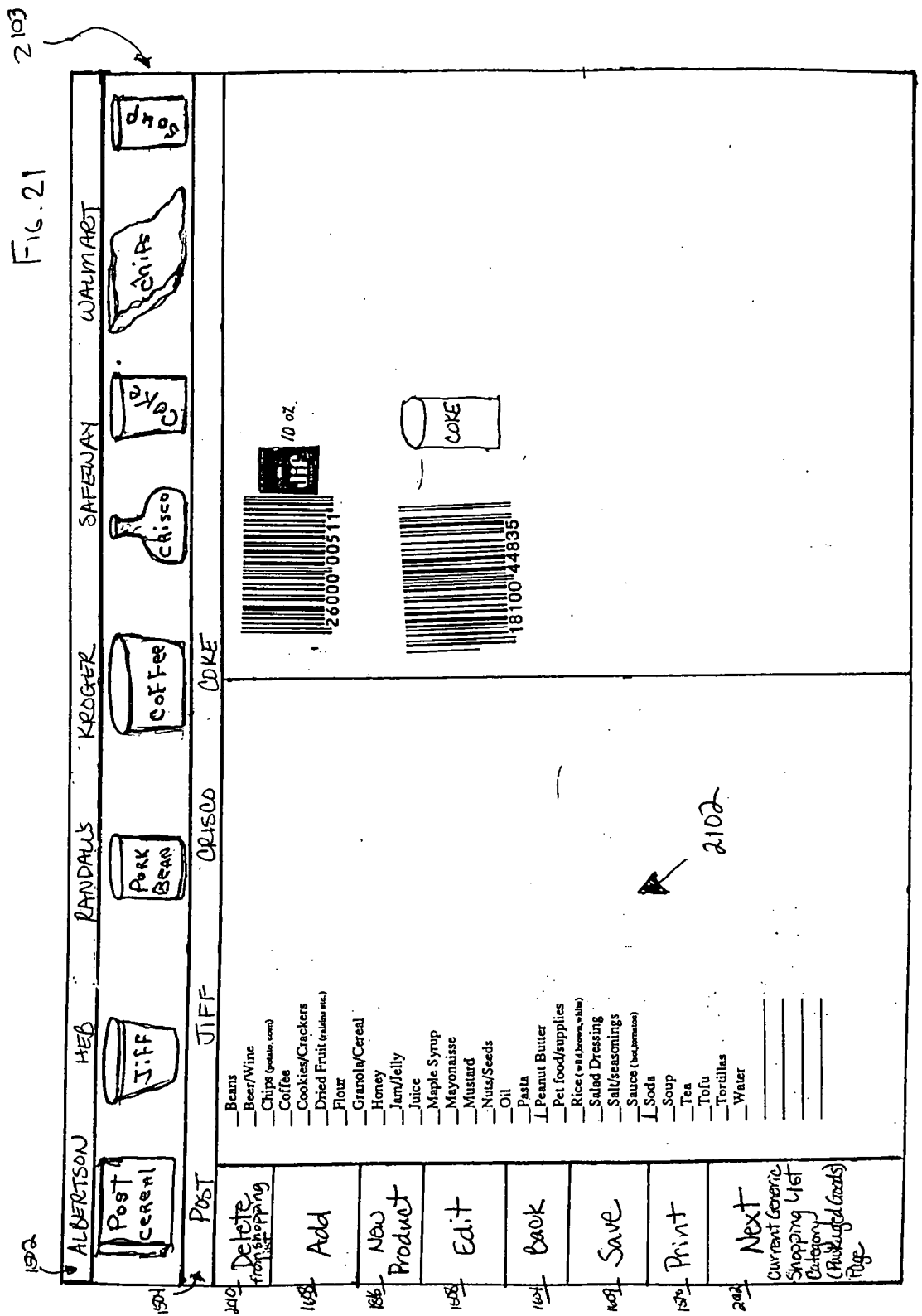
FIG. 21 depicts a packaged-goods food section-specific Web page.
Figure 22:
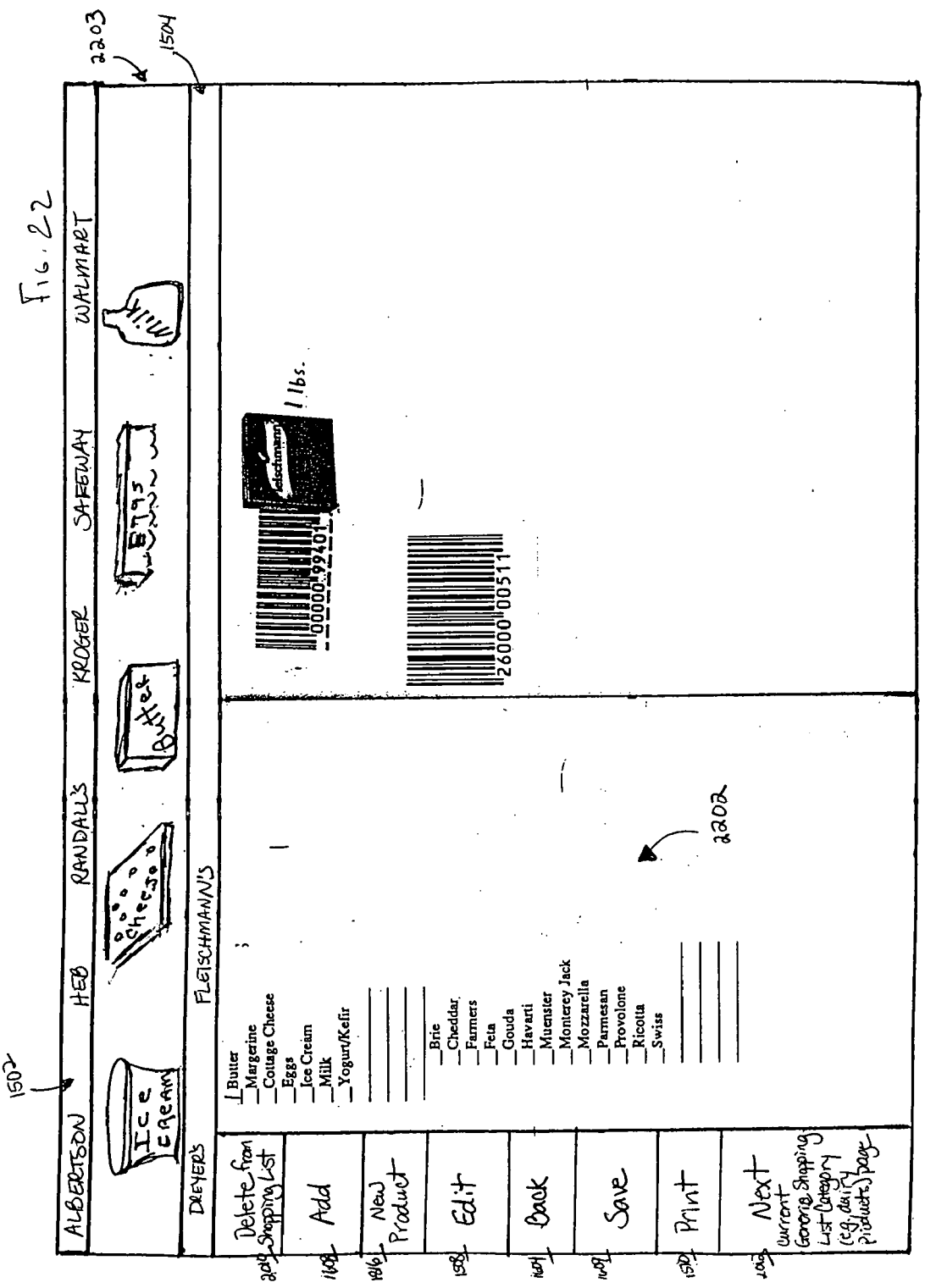
FIG. 22 depicts a dairy-section-specific Web page 22 having dairy-section bit-mapped hyperlink logos 2202.

One embodiment of a Web page showing current rebated items associated with generic shopping list subcategories for a particular retailer is shown in FIG. 16, wherein are depicted rebates (depicted on the left hand side of web page 1600 are HEB-specific coupons and depicted on the right hand side are in-store-specials for HEB supermarkets, which generally are just deducted from a purchaser's bill at checkout). Further depicted is graphical-image 1610, which is illustrated as a flower, which in one embodiment indicates what in-store-specials have been selected in that clicking or activation of iconic hyperlinks associated with the products on special (e.g., Hill Country Cornflakes) will result in the icon (e.g., Hill Country Cornflakes) shrinking and becoming associated with a bar code on a petal of the flower—which thereafter provides the user with an easy and quick way to visually check what rebated items the user has selected. Further shown in FIG. 16 are next-special-page hyperlink 1602, back-up-one-page hyperlink 1604, return-to-home-page hyperlink 1606, add-to-grocery-list hyperlink 1608 (which permanently adds the generic shopping list subcategories of the rebated items selected from Web page 1600 to the user's grocery list (e.g., selection of Hill Country Cornflakes would result in the generic shopping list category of packaged goods and the generic subcategory of "cereal" (e.g., as shown in FIG. 21) being permanently added to the user's shopping list—where "permanently" means that the generic subcategory "Cereal" will appear on the user's shopping list the next time the user logs in to the Web server software and will remain on the list until the user deletes them), save-on-shopping-list hyperlink 1609 (which temporarily adds the generic shopping list subcategories of the rebated items selected from Web page 1600 to the user's grocery list (e.g., selection of Hill Country Cornflakes would result in the generic shopping list category of Packaged Goods and the generic subcategory of "Cereal" (e.g., as shown in FIG. 21) being temporarily added to the user's shopping list—where "temporarily" means that the generic category "Cereal" will not appear on the user's shopping list the next time the user logs in to the Web server software), fuel-price hyperlink 1612 (which gives current gasoline prices at HEB), and show-proximity-movies hyperlink 1516 which functions in the fashion described for FIG. 26, below.

Figure 31:
FIG. 31 depicts one embodiment of a Web page wherein is shown, on the left-hand portion of the page, manufacturer-specific-rebate hyperlinks 3102 and wherein is further shown, on the right-hand portion of the page, goods-categorized rebate bit-mapped hyperlinks 3104.

Referring now to FIG. 15, activation of show-manufacturer-coupons hyperlink 1514, in one embodiment, causes the display of at least one web page wherein are displayed manufacturers. One embodiment of such a displayed Web page is shown in FIG. 31 wherein is shown, on the left-hand portion of the page, manufacturer-specific-rebate bit-mapped hyperlinks 3102, and wherein is further shown, on the right-hand portion of the page, goods-categorized rebate bit-mapped hyperlinks 3104. In one embodiment, activation of a particular goods-categorized-rebate hyperlink will result in a list of manufacturer-goods-categorized-rebate hyperlinks for a particular category of goods. Activation of such hyperlinks will cause display of a Web page showing manufacturer rebated item(s) for the category of goods selected, whose associated subcategories (and thus accompanying rebated item(s)) may be thereafter added to the user's shopping list on either a temporary or permanent basis.

Figure 17:
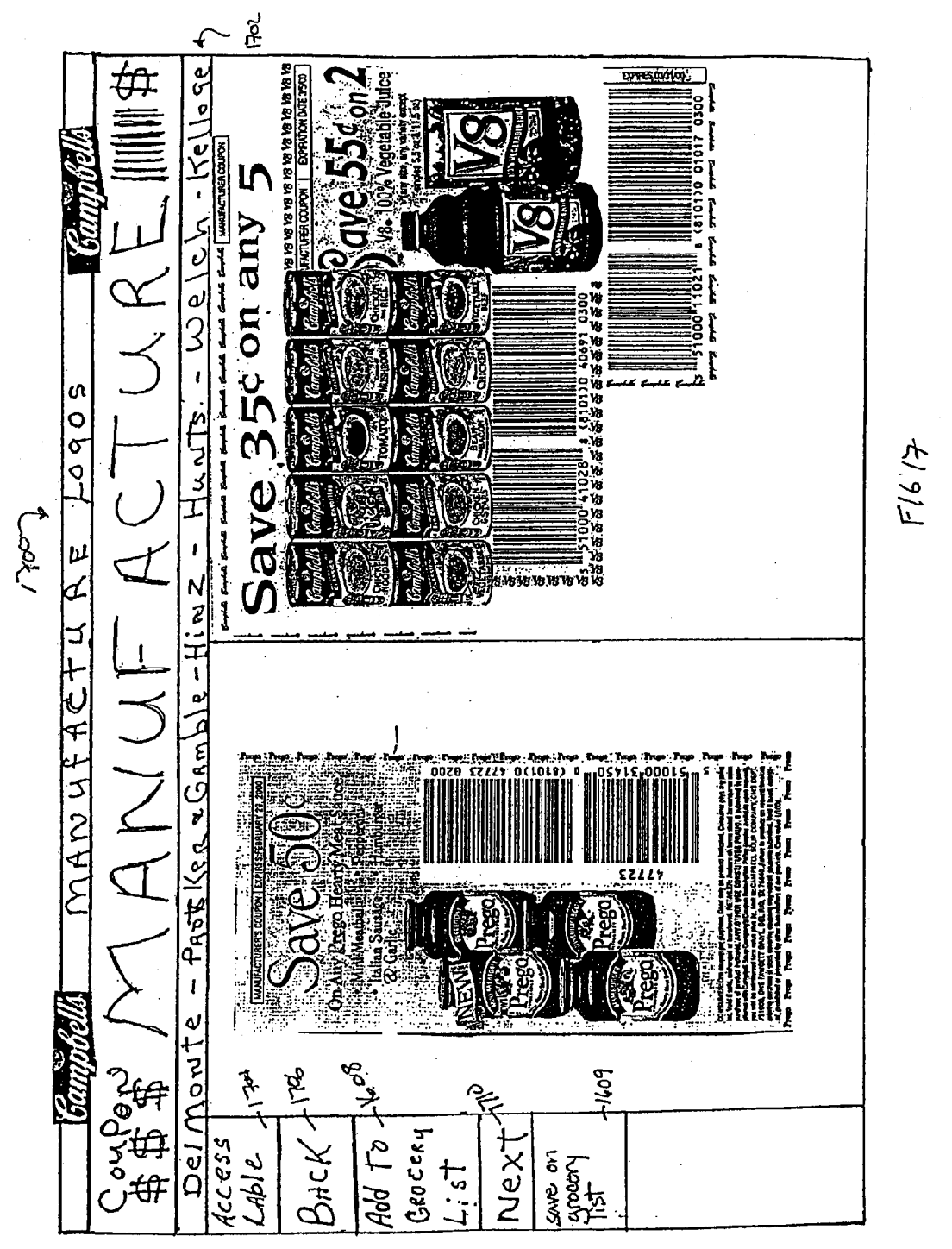

In one embodiment, activation of a particular one of manufacturer-specific-rebate bit-mapped hyperlinks 3102, will cause all specials for the selected manufacturer (e.g., Del Monte) associated with the particular manufacturer-specific-rebate bit-mapped hyperlinks 3102 selected to be displayed. In one embodiment this is achieved by display of at least one web page, where the Web page is clearly associated with a particular manufacturer, and where the Web page shows the current coupons (or other forms of rebates) for the manufacturer. One embodiment of such Web pages is shown in FIG. 17, wherein are depicted, near the top of Web page 1700, multi-manufacturer-logos bit mapped hyperlinks 1702. In one embodiment, activation of other individual manufacture logos (e.g., "Kellogg's") drawn from multi-manufacturer-logos bit mapped hyperlinks 1702 pulls up Web pages similar to Web page 1700, but with rebates unique to the newly-selected individual manufacturer. Shown are access label bit-mapped hyperlink 1704 (which in one embodiment is used to "freeze" movement of an animated version of multi-manufacturer-logos bit mapped hyperlinks 1702, so that one of the logos can thereafter be selected), go-back-one-page hyperlink 1706, add-to-grocery-list hyperlink 1608, save-on-shopping-list hyperlink 1609, and go-to-next-manufacturer page hyperlink 1710 (which will allow the user to view multiple pages for the manufacturer, if the manufacturer has more than one page).

Figure 18:
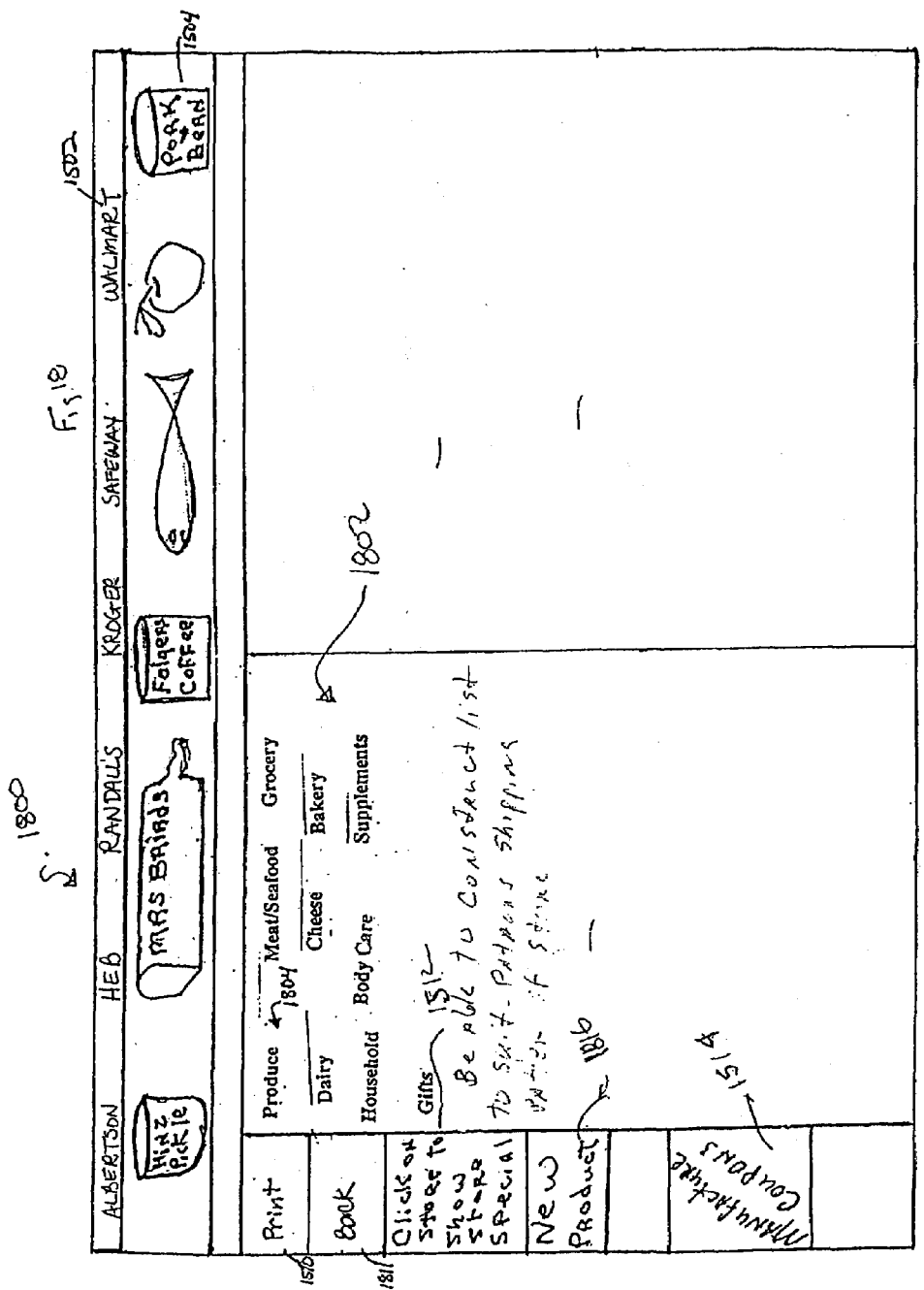
FIG. 18 depicts Web page which allows a user to construct/edit the user's shopping list, and which is set up so that the user can "virtually" shop on the Web page as he would in a physical store.

Referring now again to FIG. 15, activation of edit-master-shopping-list bit-mapped hyperlink 1508 results in a display of a Web page which allows the user to construct/edit the user's generic shopping list via use of generic shopping list categories and subcategories. One embodiment of such a Web page is shown in FIG. 18, wherein is depicted Web page 1800 having a collection of supermarket-section hyperlinks 1802, which are set up so that the user can "virtually" shop the supermarket as he would the physical store. That is, many people prefer to grocery shop sections of their (physical) supermarket in a particular order; for example, one person might prefer that he or she shop the dairy section first, the bakery section second, and the meat section of his or her supermarket last, while another person might prefer to start shopping in the supplements section and end shopping in the produce section of his or her supermarket. (Notice also that the "sections" of the supermarket-section hyperlinks 1802 substantially exactly track the generic shopping list categories (e.g., those used to categorize items in multi-vendor rebate list 204), described above.) Supermarket-section hyperlinks 1802 provide the ability for the user to maintain his preferred order of shopping in his physical grocery store while shopping virtually via his Web browser. Also shown are print-master-shopping-list bit-mapped hyperlink 1510, go-back-one-page bit-mapped hyperlink 1811, show-store-special bit-mapped hyperlink 1512, show-manufacturer-coupons hyperlink 1514, and show-new-product(s) bit-mapped hyperlink 1816, and show-manufacturer-coupons hyperlink 1514.

Continuing to refer to FIG. 18, activation of show-new-product(s) bit-mapped hyperlink 1816 results in display of a Web page which shows the user new products. Activation of show-new-product(s) bit-mapped hyperlink 1816, in one embodiment, causes the display of at least one web page wherein are displayed manufacturers. One embodiment of such a displayed Web page is shown in FIG. 32 wherein is shown, on the left-hand portion of the page, manufacturer-specific-new product rebates hyperlinks 3202, and wherein is further shown, on the right-hand portion of the page, generic shopping list-categorized-new-product rebates bit-mapped hyperlinks 3204. In one embodiment, activation of a particular generic shopping list-categorized-new-product rebate hyperlink will result in a list of manufacturer-categorized-new-product rebates hyperlinks for the particular category of goods. Activation of one such hyperlink associated with a particular manufacturer will cause display of a Web page showing new-product rebates associated with the particular manufacturer for the category of goods selected, such that the associated generic shopping list subcategories (and thus accompanying rebated item(s)) may be thereafter added to the user's shopping list on either a temporary or permanent basis.

Figure 19:
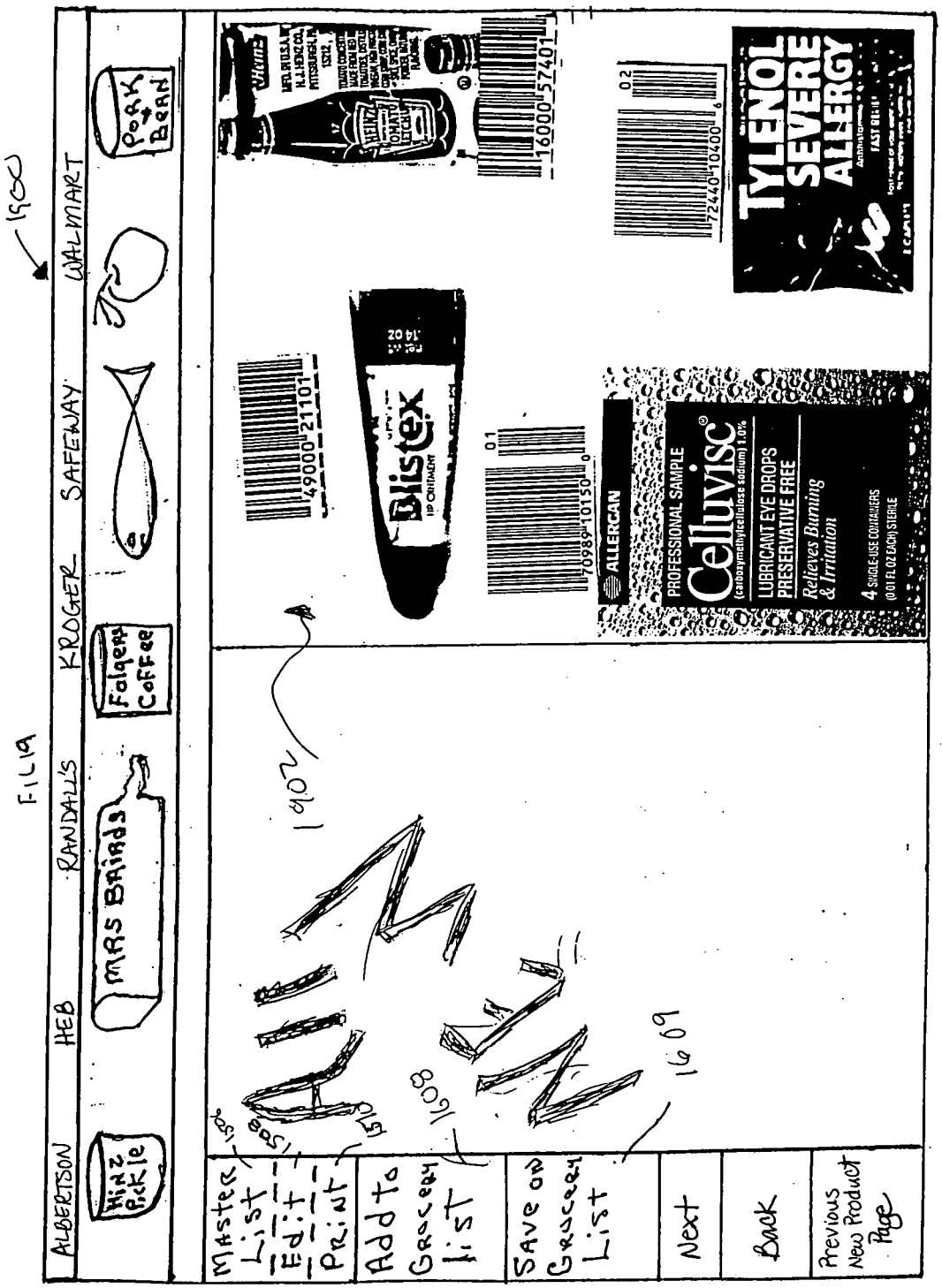
FIG. 19 depicts a Web page which shows a user new products.

In one embodiment, activation of a particular one of manufacturer-specific-new-product rebate bit-mapped hyperlinks 3202, will cause all new product specials for the selected manufacturer (e.g., Del Monte) associated with the particular manufacturer-specific-rebate bit-mapped hyperlinks 3202 selected to be displayed. In one embodiment this is achieved by display of at least one web page, where the Web page is clearly associated with a particular manufacturer, and where the Web page shows the current coupons (or other forms of rebates) for the new products of manufacturer. One embodiment of such Web pages is shown in FIG. 19, wherein is depicted Web page 1900 having a collection of product-plus-bar-code hyperlinks 1902, which are set up so that the user can activate the hyperlink to get information as to how much rebate is being offered in association with the particular new product associated with the hyperlink. For example, activation of the Blistex hyperlink, in one embodiment of the present invention, results in display of a window showing the currently offered rebate (e.g., 35 cents off purchase of Blistex). Also shown in FIG. 19 are display-master-shopping-list bit-mapped hyperlink 1506, edit-master-shopping list bit-mapped hyperlink 1508, print-master-shopping-list bit-mapped hyperlink 1510; add-to-grocery-list bit-mapped hyperlink 1608, and save-on-shopping-list bit-mapped hyperlink 1609 (which allows for temporary, one-time-only saving on the shopping list, such as when a user just wants to try out a product once, but does not necessarily want to add it to his or her permanent shopping list).

Assume that subsequent to the user finishing with Web page 1900, the user returns to Web page 18, which in one embodiment is achieved by activating the user's "back" button on Web browser 1400. Thereafter, assume that the user activates produce-section (i.e., generic shopping list category "Produce") hyperlink 1804. In one embodiment, activation of produce-section hyperlink 1804 results in display of a Web page which allows the user to be able to select whatever generic shopping list subcategories of category produce which the owner/operator of Web server software 202 has specified. One embodiment of such a Web page is shown in FIG. 20, wherein is depicted produce-section (or generic shopping list category "produce") Web page 2000 having a collection of produce-type subcategories 2002, each equating to a generic shopping list subcategory of category "produce," which are set up so that the user can "virtually" shop the produce section as he would a physical store. Note that in the embodiment shown in FIG. 20, produce-specific bit-mapped logos 2003 are shown across the top of Web page 2000. In one embodiment, produce-specific bit-mapped logos 2003 are animated (the same is generally true for all bitmapped logos described herein). Selection of one of the Produce-type subcategories 2002 (such selection typically done by specifying a quantity associated with a number in the subcategories) allows the user to permanently add the generic shopping list subcategory associated with the selected subcategory to the user's shopping list (e.g., via add-to-grocery-list hyperlink 1608), temporarily add the generic shopping list subcategory associated with the selected subcategory (e.g., via save-on-shopping-list hyperlink 1609), delete the selected subcategory from the user's shopping list (e.g., via delete-from-shopping list hyperlink 2010). In addition, shown is next current generic shopping list category "Produce" page hyperlink 2012 which will allow the user to advance to subsequent "Produce" section Web pages, if such exist.

Activation of one of the retailer hyperlinks from within retailer-logo bit-mapped hyperlinks 1502 causes rebated items associated with a selected one of Produce-type subcategories 2002 (such selection typically done by specifying a quantity associated with a number in the subcategories) to be displayed on the right hand side of produce-section Web page 2000.

The rebates displayed are typically in the form of a product icon (which can show the size and appearance of a rebated item) associated with a bar code. The rebate can be any of the type described in relation to FIGS. 13A and 13B (e.g., retailer or manufacturer or retailer-manufacturer specific).

Thus, as noted, Web page 2000 allows the user to view various retailer's and/or manufacturer's rebated offerings for various generic shopping list subcategories selected by the user. Consequently, Web page 2000 allows the user to build a shopping list having items from more than one retailer. Alternatively, or in addition to the foregoing, Web page 2000 allows the user to add/delete/save generic shopping list subcategories to the user's shopping list, after which the user can return to Web page 1800 and check his generic shopping list against specific retailers en mass.

As an example of the foregoing, activation of mushroom hyperlink 2008 results in the display of mushroom icon 2006 paired with barcode 2004, with the additional indication that the selected retailer is HEB. This barcode, once printed by the user the user, can be scanned in at the retailer (e.g., supermarket) and read at the retailer to give the user a rebate associated with the purchase of one or more mushrooms.

In one embodiment of the present invention, at least one Web page functioning substantially in the fashion described for Produce-section Web page 2000 exists for each generic shopping list category, from which the user can select generic shopping list subcategories which can be thereafter utilized to discover rebated items offered on such selected subcategories by vendors (e.g., retailers and/or manufacturers). Embodiments of such Web pages are shown in FIGS. 21-25 which respectively show Packaged-Goods section Web page 2100 having packaged-goods type bit-mapped hyperlinks 2102, each equating to a generic shopping list subcategory of category "Packaged Goods"; Dairy-section Web page 2200 having dairy products type bit-mapped hyperlinks 2202, each equating to a generic shopping list subcategory of category "Dairy Products"; Toiletries-section Web page 2300 having toiletry-section bit-mapped hyperlinks 2302, each equating to a generic shopping list subcategory of category "Toiletries"; Supplements-section Web page 2400 having supplements-section bit-mapped hyperlinks 2402, each equating to a generic shopping list subcategory of category "Supplements"; household-goods section Web page 2500 having household-goods bit-mapped hyperlinks 2502, each equating to a generic shopping list subcategory of category "household goods". The foregoing Web pages are merely exemplary, and many other such pages are envisioned, such as meat-section and drink-section Web pages.

The present inventor has realized that income can be generated for the Web server owner/operator by allowing display of section-specific vendor's logos on each section-specific Web page. Various embodiments of section-specific Web pages having such displaying are illustrated in FIGS. 21-25, which respectively show Web page 21 having packaged-goods bit-mapped hyperlink logos 2103, dairy-products goods section Web page 22 having dairy products-section bit-mapped hyperlink logos 2203 (which although shown generically could also be vendor-specific (e.g., retailer or manufacturer specific), Toiletries-section Web page 23 having Toiletries-section bit-mapped hyperlink logos 2303 (which although shown as vendor-specific (e.g., retailer, or manufacturer specific) could also be shown generically), supplements-section Web page 24 having supplements-section bit-mapped hyperlink logos 2403 (which are shown in both generic and vendor-specific forms), household-goods section Web page 25 having paper-goods bit-mapped hyperlink logos 2503 (which are shown in both generic and vendor-specific forms). The foregoing hyperlink logos are merely exemplary, and other such hyperlink logos are contemplated, such as for meat and drink type goods.

Returning now to consideration of Web page 1500, it has been realized by the inventor named herein that many shoppers will view movies on the same day as their shopping. Accordingly, shown on Web page 1500 is show-proximity movies bit-mapped hyperlink 1516. As has been discussed above, when a user creates a shopping list he is prompted for information about himself, which in one embodiment relates to the user's location and/or preferred shopping location. In one embodiment of the present invention, the user's preferred shopping location is used, subsequent to activation of show-proximity movies bit-mapped hyperlink 1516, to pull up a list of theaters and movies in proximity to either the user's dwelling or the user's preferred shopping district (embodiments vary, but in one embodiment a user is allowed to specify which of these operations the user prefers). One embodiment of such a Web page is Web page 2600, which in one embodiment has bit-mapped hyperlink logos 2602 which when activated will show rebate information associated with the movies shown.

With reference now to FIG. 27, shown is shopping list 2700 which, in one embodiment, results from activation of print-master-shopping-list bit-mapped hyperlink 1510, which is typically activated upon completion of shopping. Depicted is that associated with items on the user's shopping list are icons and bar codes associated with discounts relevant to the categories of the user's shopping list, which in one embodiment coordinate with store sections. Further depicted is that product icons or graphics associated with the bar-codes are printed substantially proximate to the bar-codes so that the user can assure that the product he is getting at the retailer is product on which the rebate is being offered. In another embodiment, each product icon-bar code combination has associated with it a particular vendor.

When the user subsequently visits a vendor (e.g., a supermarket) and purchases items on his shopping list, he presents his shopping list at checkout. The bar codes on the shopping list are then scanned in on the supermarket scanner along with the groceries, and the discounts applied as has been discussed above. In one embodiment, in order to ensure that a bar-code scanner at a retailer is not confused, the various bar codes and their associated icons are printed far enough apart from each other so that the scanner can read any bar codes present independent of each other without confusion (e.g., on multiple pages). In another embodiment, the bar codes and associated icons are printed closer together, and the user is instructed to fold the paper between bar code-icon pairs such that each bar code can be individually scanned by a scanner. In yet another embodiment, a cardboard or stiff-paper sleeve is used whereby the shopping list of FIG. 27 is folded in half and maneuvered through the sleeve; the sleeve is such that only one bar code is visible at any one time (e.g., the sleeve is opaque, and a hole is cut in the sleeve such that only one bar code at a time may be visible through the hole). This too allows the user to isolate individual bar codes such that a scanner is not confused.

While in one embodiment, the substantially complete generic shopping list of FIG. 27 is printed, in other embodiments, a generic shopping list can be printed directly from Web pages associated with generic shopping list subcategories. For example, a shopping list associated with Web pages 21-25 can be printed directly from those pages. Such generic-shopping-list-specific-category printed shopping lists would look substantially similar to that depicted in FIG. 27, except that the generic shopping list categories would be printed in isolation. For example, one generic-shopping-list-specific-category shopping list might only contain the produce category shown and its associated subcategories, icons, and barcodes as shown in FIG. 27, while another might contain only the packaged-goods category shown its associated subcategories, icons, and barcodes as shown in FIG. 27, while another might contain only the dairy-products category shown its associated subcategories, icons, and barcodes as shown in FIG. 27, etc.

In addition to the foregoing, notice that even though a generic shopping list, such as the one illustrated in FIG. 27, may have been printed having rebates unique to a particular retailer, such does not mean that the manufacturer coupons are necessarily unique to that particular retailer. That is, it is to be understood that unless manufacturer coupons are specifically tied to a specific retailer, such manufacturer coupons can generally be redeemed at participating retailers other than that retailer with which the shopping list was associated when it was printed; however, in such a situation in-store specials and/or other rebates uniquely tied to the retailer associated with the generic shopping list when printed would typically not be usable at a retailer other than that associated with the generic shopping list when the generic shopping list was printed, which in and of itself would create an incentive for the shopper to frequent the retailer associated with the generic shopping list when printed in order to obtain near maximum rebate benefit. It should be noted that in certain embodiments above, it is expected that a time period will be clearly associated with all rebates (e.g., this rebate only valid for the next two days, after which it may change), in which case the user will be given the current-listed rebate in a rebate list (e.g., multi-vendor rebate list 204) when the user presents a shopping list with items having associated bar-codes past its validity date. That is, in one embodiment, the vendor will honor an amount and quantity of a rebate for a certain rebated item for a certain defined period, after which the purchaser will be given a rebate as currently indicated in multi-vendor rebate list 204. In such instances, in one embodiment the vendor will not change the rebate associated with the certain rebated item in multi-vendor rebate list 204 until the guaranteed time has expired; in another embodiment for highly volatile markets and prices, the vendor will keep time-stamped rebates in multi-vendor rebate list 204, and the time of printing will be indicated on the printed barcode, which will thereafter be used as an additional factor in determining the rebate appropriate to the item with which the barcode is associated, where the use of such additional factor can be relatively easily accomplished by programming techniques well known to those within the art.

5. Brand-Name Recognition

The foregoing figures and Web page depictions have described use of a print shopping list command associated with a user entering input indicating that the user wishes to sign off. Various embodiments of the present invention utilize the print shopping list command, in association with the sign-off command, to assess the relative market strength of differing trade and service marks. Various embodiments of the present invention also utilize an incentive associated with the sign-off command to entice users to click the sign-off command. In one embodiment, this is a "giveaway" that is done more or less continuously when calculations reveal the price of the giveaway is less than some preset multiple of net profit.

Figure 28:
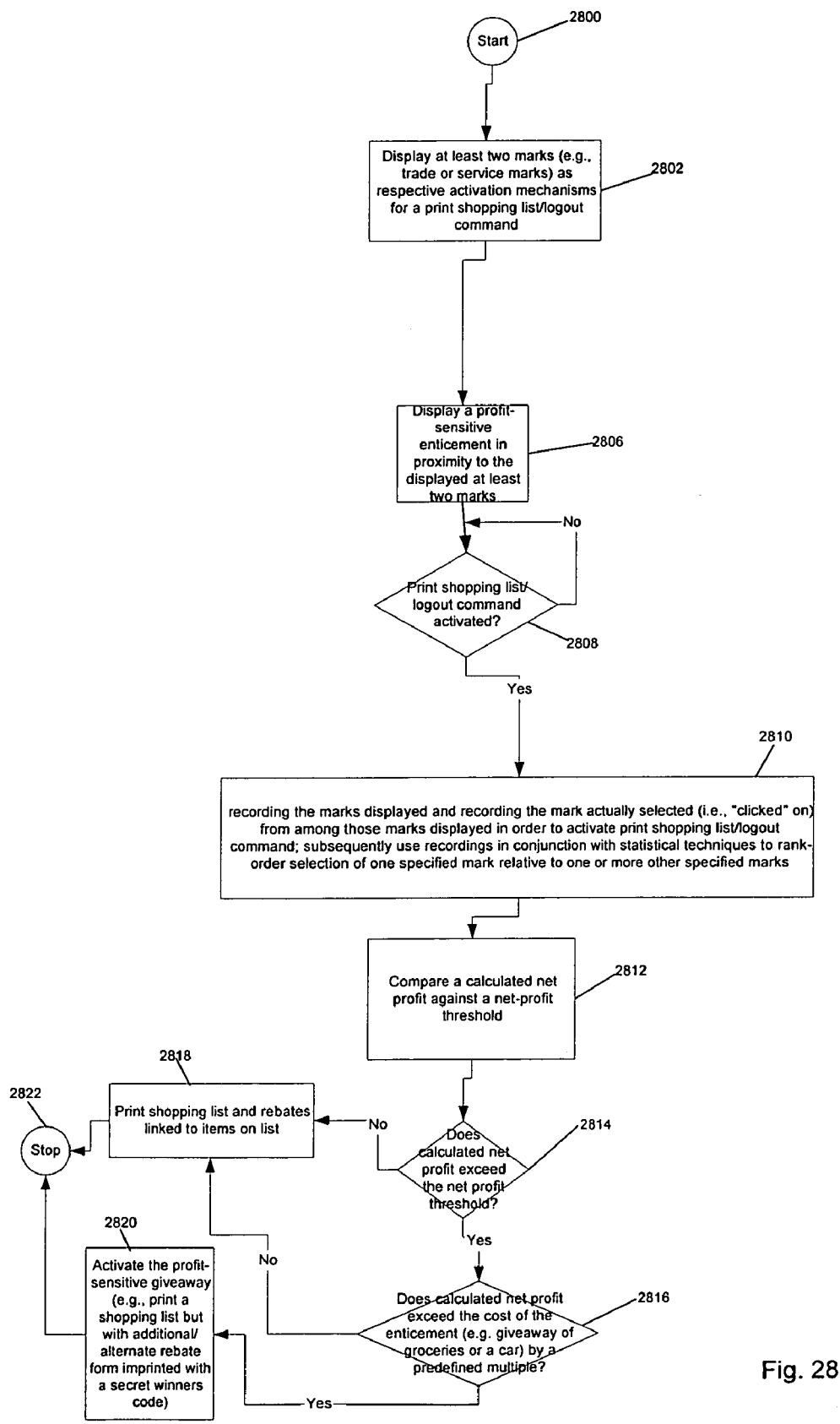
FIG. 28 is a high-level logic flowchart depicting various embodiments of the present invention wherein, among other things, relative market strength of marks are assessed.

With reference now to FIG. 28, shown is a high-level logic flowchart depicting various embodiments of the present invention wherein, among other things, relative market strength of marks are assessed.

Method step 2800 depicts the start of the process. Method step 2802 illustrates displaying (generally on a Web page of a user's Web browser) at least two marks (e.g., trade or service marks) as respective activation mechanisms for a print shopping list/logout command (e.g., for example, two or more different trademarks, each belonging to competing brands of dairy products), which in one embodiment is achieved by hyperlinking the displayed marks to executable routines which effect sign-off and printing of the user's shopping list. In one embodiment the at least two marks are actually those product icons associated with bar codes as shown in FIG. 27, and the user is instructed that he is to print by clicking on one of the product icon-bar code pairs. For example, in one embodiment the user is actually presented with his or her shopping list such as that shown in FIG. 27, and is instructed to click one of the product icon-barcode pairs in order to active the sign-off mechanism which causes the printing of the shopping list.

Method step 2806 depicts displaying a profit-sensitive enticement in proximity to the displayed at least two marks; for example, displaying a notation that clicking either of the two marks results in a giveaway of a new automobile, and that currently one automobile is being given away every 28 days. In another embodiment, the enticement involves a further notice that the giveaway will occur by a certain date, and in yet another embodiment, the enticement will have information about the last such giveaway, including various information related to the last giveaway, such as the winner's name, the amount of the giveaway, the vendor where the giveaway occurred, etc.

Method step 2808 illustrates the inquiry as to whether the print shopping list/logout command has been activated by user input. In the event that the inquiry of method step 2808 is answered in the negative, the process loops back to method step 2808. In the event that the inquiry of method step 2808 is answered in the affirmative, the process proceeds to method step 2810.

Insofar as the print shopping list/logout command can only be activated by clicking proximate to one of the displayed at least two marks (e.g., at least two product icon-bar code pairs), method step 2810 shows recording the marks displayed and recording the mark actually selected from among those marks displayed (i.e., "clicked" on) to activate the print shopping list/logout command. In various embodiments, such recordings are used with a variety of statistical techniques to assess consumer awareness of the marks relative to each; for example, in one embodiment a user can specify (e.g., via a graphical user interface or other input devices) a series of marks, and such recordings are used to tell the user how often the specified marks have been displayed together, and gives a rank ordering of the order of selection of the marks relative to each other, while in other embodiments such recordings are used to produce graphical statistical distributions. Those skilled in the art will recognize that many other statistical and/or probabilistic techniques can also be used to provide the frequency of mark selection relative to each other. Such statistical techniques can be found in many probability and/or statistics handbooks such as The Probability Tutoring Book, by Carol Ash (IEEE Press 1993), and/or Statistics for Engineering Problem Solving, by Stephen Vardeman (IEEE Press 1994).

Thereafter, with the reference counters so incremented, method step 2812 depicts comparing a calculated net profit against a net-profit threshold.

Method step 2814 illustrates the inquiry of whether the calculated net profit exceeds the net profit threshold. In the event that the inquiry depicted in method step 2814 is answered in the affirmative, the process proceeds to method step 2816. Method step 2816 shows the inquiry of whether the calculated net profit exceeds the cost of the enticement (e.g. giveaway of groceries or a car) by a predefined multiple; for example, is the net profit at least twenty-five times the cost of the giveaway? In the event that the inquiry of method step 2816 is answered in the negative, the process proceeds to method step 2818. Method step 2818 depicts printing shopping list and rebates linked to items on the user's shopping list without activating the giveaway. Thereafter, the process proceeds to method step 2822 and stops.

In the event that the inquiry of method step 2816 is answered in the affirmative, the process proceeds to method step 2820. Method step 2820 depicts printing shopping list and rebates linked to items on the user's shopping list along with activating the giveaway; in one embodiment the giveaway is activated by printing a shopping list but with an additional/alternate rebate vehicle imprinted with a secret "winner's code," while in another embodiment, where the user prints by clicking a product icon-bar code pairing such as those shown on FIG. 27, the bar code associated with the product is replaced by the secret winner's code. Thereafter, the process proceeds to method step 2822 and stops.

Figure 29:
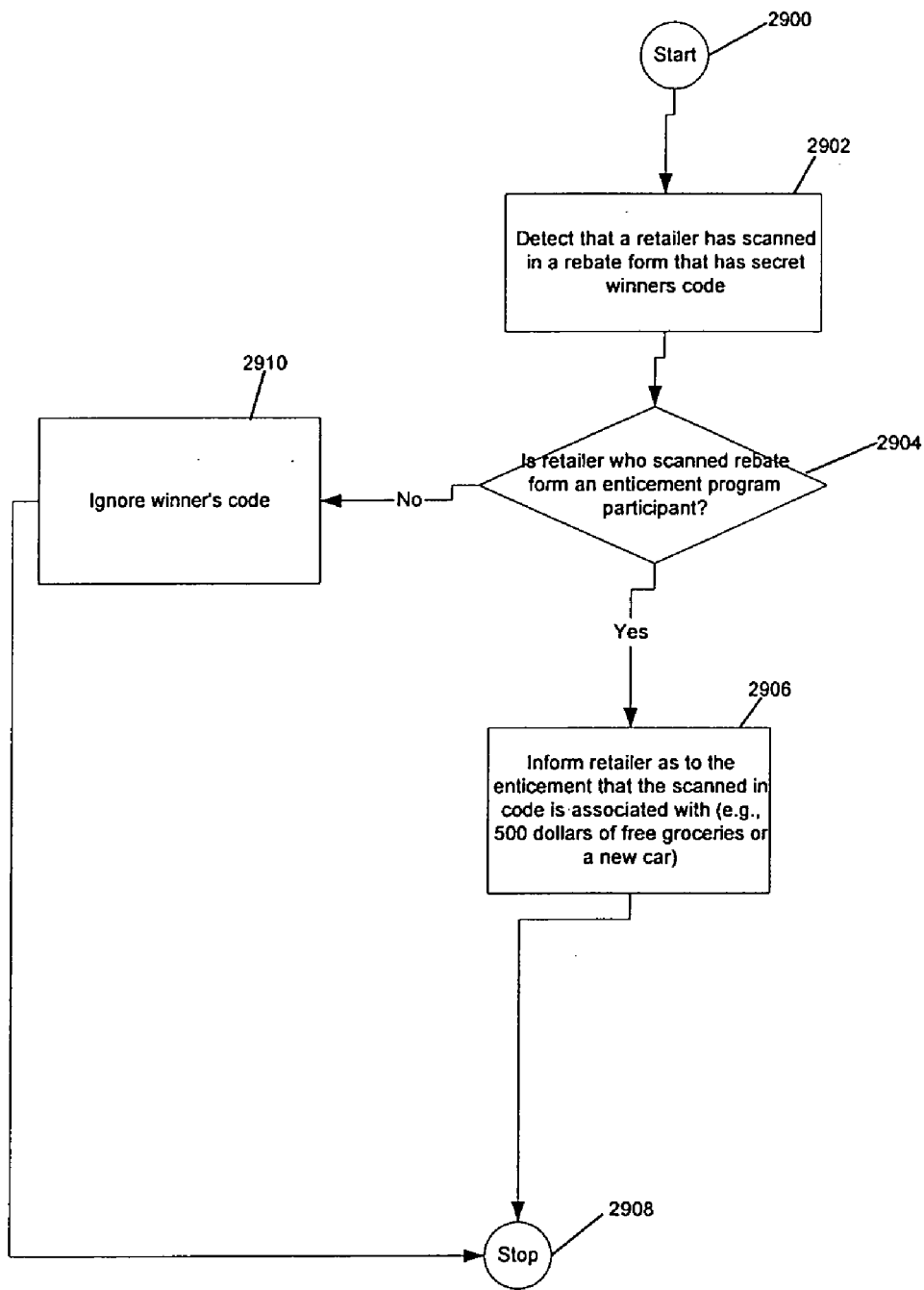

In some embodiments, once the user (or supermarket employee) scans the rebate vehicle (e.g., a bar code) on the supermarket scanner in the fashion such as was described in relation to FIG. 6, the giveaway will occur at the retailer. However, there may be instances where the retailer does not want to participate in the giveaway scheme. FIG. 29 illustrates a process whereby the giveaway scheme can be maintained but in such a way that non-participants can be identified and dealt with.

With reference now to FIG. 29, shown is a high-level logic flowchart of a process which maintains the giveaway scheme, but in such a way that non-participants can be identified and dealt with. Method step 2900 depicts the start of the process. Method step 2902 illustrates that Web server software has detected that a retailer has scanned in a rebate vehicle that has the secret winner's code (e.g., when Web server software 202 is responding to messaging that bar codes have been scanned in (as described and illustrated above), the Web server software detects that the bar code contains a secret winner's code).

Method step 2904 shows the inquiry "is the retailer who scanned the rebate vehicle (e.g., having a bar code) an enticement program participant?" In the event that the inquiry of method step 2904 is answered in the affirmative, the process proceeds to method step 2906 which depicts that the scanning retailer is informed as to the enticement that the scanned in code is associated with (e.g., 500 dollars of free groceries or a new car). Thereafter, in one embodiment the grocer serves as a conduit for the payout on the enticement on behalf of the Web server owner/operator; in another embodiment, the retailer just passes the word of the winning to the customer who thereafter contacts the Web server owner/operator directly. Subsequently the process proceeds to method step 2908 and stops.

In the event that the inquiry of method step 2904 is answered in the negative, the process proceeds to method step 2910 which depicts that the winner's code is ignored. Subsequently, the process proceeds to method step 2908 and stops.

Figure 30:
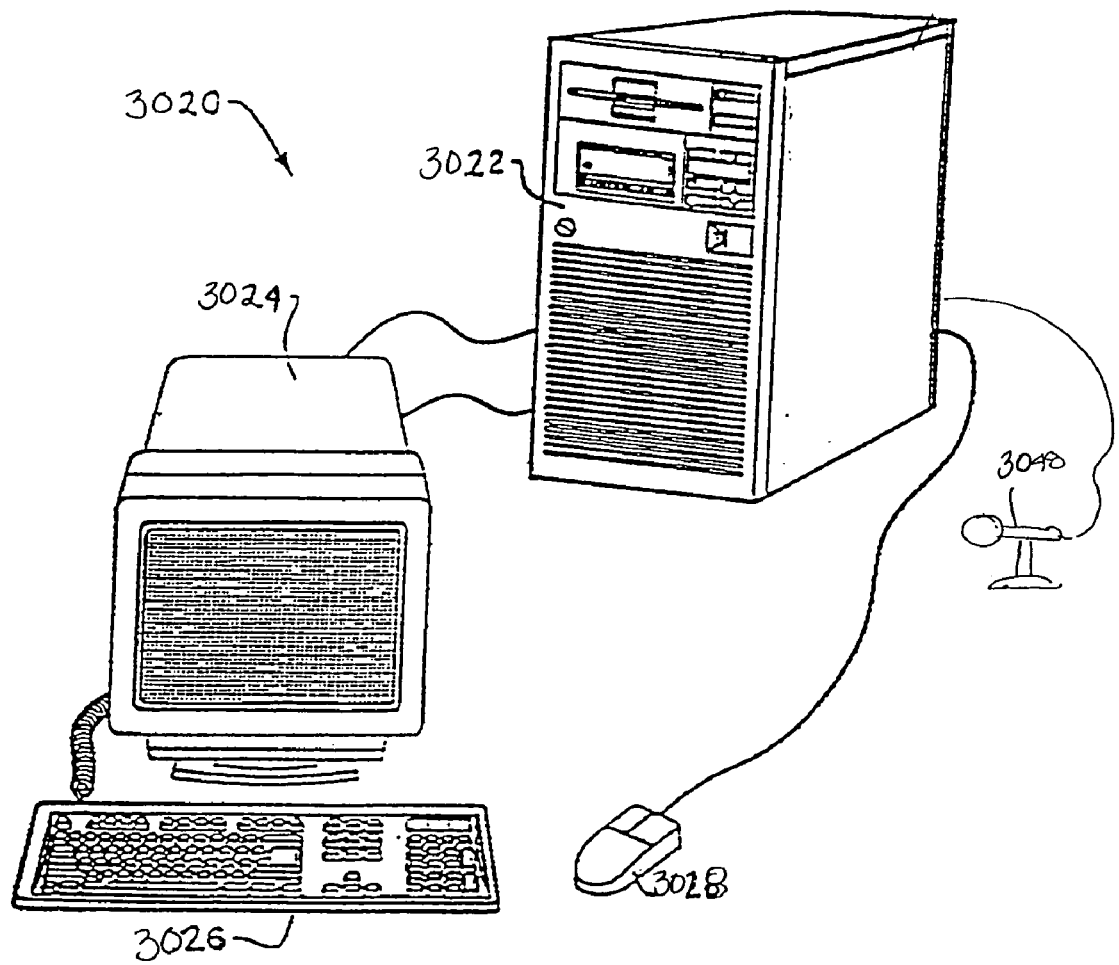
FIG. 30 depicts a pictorial representation of a conventional data processing system which can be utilized in accordance with an illustrative embodiment of the processes and devices described herein.

With reference now to FIG. 30, depicted is a pictorial representation of a conventional data processing system which can be utilized in accordance with an illustrative embodiment of the processes and devices described herein. It should be noted that a graphical user interface systems (e.g., Microsoft Windows 98 or Microsoft Windows NT operating systems) and methods can be utilized with the data processing system depicted in FIG. 30. Data processing system 3020 is depicted which includes system unit housing 3022, video display device 3024, keyboard 3026, mouse 3028, and microphone 3048. In addition, in other embodiments, data processing system 3020 may include a printer such as shown in FIG. 14. Data processing system 3020 may be implemented utilizing any suitable computer (e.g., a computer having sufficient power and speed to function as a workstation, or a computer having sufficient power and speed to function as an Internet host) such as those sold by Dell Computer Corporation, located in Round Rock, Tex. (Dell is a trademark of Dell Computer Corporation), or International Business Machines Corporation (IBM), located in Armonk, N.Y. (IBM is a trademark of International Business Machines Corporation).

The World Wide Web is a constantly evolving technology. Accordingly, reference herein to the World Wide Web is meant to include equivalents and successors to the World Wide Web; reference herein to specific protocols is meant to include future developed protocols and/or other protocols used with the Word Wide Web; furthermore, reference herein to URLs is meant to include any mechanism utilized to locate World Wide Web entities or resources. The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

As is apparent above, unless context clearly requires otherwise, those having ordinary skill in the art will appreciate that the embodiments described herein function with related-art rebate vehicles, such as FSIs, as well as with other rebate vehicles described herein. For example, Sections 1-3 refer to rebate vehicles (e.g., coupons and in-store specials) in general. As another example, Section 4 states that one embodiment uses a rebate vehicle downloaded from Web server software 202, and also states that in one embodiment the rebate amounts for the rebate vehicles are contained within the scanned bar codes, which clearly encompasses related-art FSIs. In addition, the figures, in general, do not limit their descriptions to coupons and in-store specials downloaded and printed from a Web server, and hence encompass related-art FSIs. Thus, those having ordinary skill in the art will appreciate that unless context requires otherwise, the embodiments described herein will function with FSIs.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method in a computer system for assessing brand recognition of trade marks and service marks, comprising:
    displaying a shopping list;
    concurrently displaying at least two brand-related trade or service marks as alternate activation mechanisms to print the displayed shopping list;
    receiving an indication that at least one of the two marks has been used to activate printing the displayed shopping list;
    tracking and storing in a memory of the computer system a number of times each of the at least two marks has been selected to activate printing the shopping list;
    comparing the stored number of times each of the at least two marks has been selected relative to each other; and
    outputting an indication of the comparison.

2. The method of claim 1 wherein the determining of consumer awareness of the at least two marks relative to each other further comprises:
    determining a frequency of selection of a first mark relative to a frequency of selection of a second mark.

3. The method of claim 1 wherein the determining of consumer awareness of the at least two marks relative to each other further comprises:
    storing an indication of the at least two marks that are displayed;
    receiving an indication of a selected mark; and
    storing a designation of which of the at least two marks was selected.

4. The method of claim 1 wherein the displaying the at least two trade or service marks as alternate activation mechanisms further comprises:
    displaying a generic shopping list that presents at least one product icon.

5. The method of claim 1 wherein the determining consumer awareness of the at least two marks relative to each other further comprises:
    associating with the at least two marks an enticement to select a mark.

6. The method of claim 5 wherein the associating the enticement to select the mark further comprises:
    associating a profit-sensitive giveaway with at least one of the at least two marks.

7. The method of claim 6 wherein the associating the profit-sensitive giveaway with the at least one of the at least two marks further comprises:
    comparing a cost of the giveaway against a net profit when the net-profit exceeds a net-profit threshold; and
    activating the profit-sensitive giveaway when the comparison shows that the net profit exceeds the cost of the giveaway by a predefined multiple.

8. The method of claim 7 wherein the comparing the cost of the giveaway against the net profit further comprises:
    comparing a cost of an average grocery purchase against the net profit.

9. The method of claim 7 wherein the comparing the cost of the giveaway against the net profit further comprises:
    comparing a cost of new automobile against the net profit.

10. The method of claim 7 wherein the activating the profit-sensitive giveaway further comprises:
    receiving from a retailer an indication that a rebate vehicle associated with the profit-sensitive giveaway has been redeemed;
    comparing an identity of the retailer against a list of giveaway participants; and
    deactivating the profit sensitive giveaway when the retailer is not a giveaway participant on the list.

11. The method of claim 10 wherein the receiving of the indication that the rebate vehicle associated with the profit-sensitive giveaway has been redeemed further comprises:
    determining that a secret bar code is encoded in the rebate vehicle; and
    comparing the determined secret bar code with a list of secret bar codes associated with at least one giveaway participant.

12. The method of claim 7 wherein the activating of the profit-sensitive giveaway further comprises:
    transmitting data to cause printing of a rebate vehicle which, when redeemed, causes the giveaway to be activated.

13. The method of claim 12 wherein the transmitting data to cause printing of the rebate vehicle further comprises:
transmitting data to cause printing of a bar code which, when scanned, causes the giveaway to be activated.

14. A method in a computer system for determining consumer awareness of at least two brand-related trade or service marks relative to each other, comprising:
receiving electronically an indication of at least two concurrently displayed brand-related trade or service marks for printing a shopping list or to execute a logout command and an indication of a selected one of the at least two concurrently displayed marks; and
retrieving an electronically stored accounting of past activations of the at least two marks as used to print the shopping list or to execute the logout command; and
based upon the accounting of past activations, determining a frequency of selection of one of the at least two marks relative to another one of the at least two marks, outputting the result of the determining step, thereby measuring consumer awareness of the at least two marks.

15. The method of claim 14 wherein the receiving of the indication of the selected one of at least two marks further comprises:
receiving the indication of the selection via a graphical user interface.

16. The method of claim 14 wherein the retrieving an accounting of past activations of the at least two marks further comprises:
determining the frequency of selection of one of the at least two marks relative to another one of the at least two marks using statistical methods.

17. A system for evaluating brand recognition of trade marks and service marks, comprising:
means for displaying a shopping list;
means for concurrently displaying at least two brand-related trade or service marks as alternate activation mechanisms to print the displayed shopping list;
means for receiving an indication that at least one of the two marks has been used to activate printing the displayed shopping list;
means for tracking and storing in a memory of the computer system a number of times each of the at least two marks has been selected to activate printing the shopping list;
means for comparing the stored number of times each of the at least two marks has been selected relative to each other; and
means for outputting an indication of the comparison.

18. The system of claim 17 wherein the means for determining consumer awareness of the at least two marks relative to each other further comprises:
means for determining a frequency of selection of a first mark relative to a frequency of selection of a second mark.

19. The system of claim 17 wherein the means for determining consumer awareness of the at least two marks relative to each other further comprises:
means for storing an indication of the at least two marks that are displayed;
means for receiving an indication of a selected mark; and
means for storing a designation of which of the at least two marks was selected.

20. The system of claim 17 wherein the means for displaying the at least two trade or service marks as alternate activation mechanisms further comprises:
means for displaying a generic shopping list that presents at least one product icon.

21. The system of claim 17 wherein the means for determining consumer awareness of the at least two marks relative to each other further comprises:
means for associating with the at least two marks an enticement to select a mark.

22. The system of claim 21 wherein the means for associating the enticement to select a mark further comprises:
means for associating a profit-sensitive giveaway with at least one of the at least two marks.

23. The system of claim 22 wherein the means for associating a profit-sensitive giveaway with the at least one of the at least two marks further comprises:
means for comparing a cost of the giveaway against a net profit when the net-profit exceeds a net-profit threshold; and
means for activating the profit-sensitive giveaway when the comparison shows that the net profit exceeds the cost of the giveaway by a predefined multiple.

24. The system of claim 23 wherein the means for comparing the cost of the giveaway against the net profit further comprises:
means for comparing a cost of an average grocery purchase against the net profit.

25. The system of claim 23 wherein the means for comparing the cost of the giveaway against the net profit further comprises:
means for comparing a cost of new automobile against the net profit.

26. The system of claim 23 wherein the means for activating the profit-sensitive giveaway further comprises:
means for receiving from a retailer an indication that a rebate vehicle associated with the profit-sensitive giveaway has been redeemed;
means for comparing an identity of the retailer against a list of giveaway participants; and
means for deactivating the profit sensitive giveaway when the retailer is not a giveaway participant on the list.

27. The system of claim 26 wherein the means for receiving the indication that the rebate vehicle associated with the profit-sensitive giveaway has been redeemed further comprises:
means for determining that a secret bar code is encoded in the rebate vehicle; and
means for comparing the determined secret bar code with a list having of secret bar codes associated with at least one giveaway participant.

28. The system of claim 23 wherein the means for activating the profit-sensitive giveaway further comprises:
means for transmitting data to cause printing of a rebate vehicle which, when redeemed, causes the giveaway to be activated.

29. The system of claim 28 wherein the means for transmitting data to cause printing of the rebate vehicle further comprises:
means for transmitting data to cause printing of a bar code which, when scanned, causes the giveaway to be activated.

30. A system for determining consumer awareness of at least two brand-related trade or service marks relative to each other, comprising:
means for receiving an indication of at least two concurrently displayed brand-related trade or service marks for printing a shopping list or to execute a logout command and an indication of a selected one of the at least two concurrently displayed marks; and means for retrieving an accounting of past activations of the at least two marks as used to print the shopping list or to execute the logout command to determine frequency of selection of one of the at least two marks relative to another one of the at least two marks, means for outputting the result of the determination, thereby measuring consumer awareness of the at least two marks.

31. The system of claim 30 wherein the means for receiving the indication of the selected one of the at least two marks further comprises:

means for accepting input that indicates the selection via a graphical user interface.

32. The system of claim 30 wherein the means for retrieving an accounting of past activations of the at least two marks further comprises:

means for determining the frequency of selection of one of the at least two marks relative to another one of the at least two marks using statistical methods.

33. The system of claim 30 wherein the means for determining the frequency of selection of one of the at least two marks further comprises:

means for electronically transmitting data to indicate the frequency of selection of the one of the at least two marks relative to the another.

34. The system of claim 30 wherein the means for retrieving the accounting of past activations of the at least two marks to determine frequency of selection further comprises:

means for transmitting data to indicate the frequency of selection of the one of the at least two marks relative to the another.

35. A method in a computer system comprising:

concurrently displaying on a display device of the computer system at least two brand-related trade or service marks as alternate activation mechanisms to print a shopping list displayed on the display device;

receiving an indication of a selected one of the concurrently displayed at least two marks; and in response to receiving the indication of the selected one of the displayed at least two marks, transmitting data that indicates the selected mark; and causing the computer system to print the shopping list.

36. The method of claim 35 wherein the displaying the at least two trade or service marks as alternate activation mechanisms further comprises:

displaying a generic shopping list having at least one product icon that is one of the at least two trade or service marks.

37. The method of claim 35 wherein the displaying of the at least two trade or service marks as alternate activation mechanisms further comprises:

displaying in proximity to the at least two marks an enticement to activate a mark.

38. The method of claim 37 wherein the displaying the enticement to activate the mark further comprises:

displaying a notice that activating at least one of the at least two marks might result in a giveaway.

39. A system comprising:

means for concurrently displaying on a display device at least two brand-related trade or service marks as alternate activation mechanisms for printing a shopping list displayed on the display device;

means for receiving an indication of a selected one of the concurrently displayed at least two marks; and means for transmitting data that indicates the selected mark and causing the system to print the shopping list in response to receiving the indication of the selected mark.

40. The system of claim 39 wherein the means for displaying the at least two trade or service marks as alternate activation mechanisms further comprises:

means for displaying a generic shopping list having at least one product icon that is one of the at least two trade or service marks.

41. The system of claim 39 wherein the means for displaying the at least two trade or service marks as alternate activation mechanisms further comprises:

means for displaying in proximity to the at least two marks an enticement to activate a mark.

42. The system of claim 41 wherein the means for displaying the enticement to activate the mark further comprises:

means for displaying a notice that activating at least one of the at least two marks might result in a giveaway.

43. A method in a computer system for measuring brand recognition through selection of brand-specific trade or service marks, comprising; concurrently displaying on a display device a plurality of brand-specific trade or service marks, which, when selected, activate an application-specific command to print a shopping list or to initiate sign-off from the application;

receiving an indication that one of the plurality of brand-specific trade or service marks is selected;

causing activation of the application-specific command; and measuring brand recognition by tracking the number of times each of the plurality of trade or service marks has been selected to activate the application-specific command, outputting on the computer system the result of the tracking step.

44. The method of claim 43 wherein the measuring brand recognition by tracking the frequency of each of the plurality of trade or service marks further comprises:

tracking the frequency of selection of each of the plurality of trade or service marks based upon the ordering of presentation of the marks.

45. The method of claim 44, further comprising:

ordering a later presentation of the plurality of marks based upon the tracked frequency of selection that is associated with a tracked ordering.

46. The method of claim 45 wherein the ordering the later presentation of the plurality of marks further comprises:

presenting the plurality of marks with the most selected marks presented first.

47. A system for measuring brand recognition through selection of brand-specific trade or service marks, comprising;

display mechanism that causes concurrent display of a plurality of brand-specific trade or service marks, which, when selected, activate an application-specific command to print a shopping list or to initiate sign-off from the application;

activation mechanism that, upon receiving an indication that one of the plurality of brand-specific trade or service marks is selected, activates the application-specific command; and tacking mechanism that is structured to measure brand recognition by tracking the number of times each of the plurality of trade or service marks is selected to activate the application-specific command, outputting on the computer system the result of the tracking step.

48. The system of claim 47 wherein the tracking mechanism is further structured to track the frequency of selection of each of the plurality of trade or service marks based upon the ordering of presentation of the marks.

49. The system of claim 48 wherein the tracking mechanism is further structured to order a later presentation of the plurality of marks based upon the tracked frequency of selection that is associated with a tracked ordering.

50. The system of claim 49 wherein the tracking mechanism orders the later presentation of the plurality of marks by presenting the plurality of marks with the most selected marks presented first.

51. A computer-readable memory medium containing instructions for controlling a computer processor to measure brand recognition through selection of brand-specific trade or service marks, by;
concurrently displaying a plurality of brand-specific trade or service marks, which, when selected, activate an application-specific command to print a shopping list or to initiate sign-off from the application;
receiving an indication that one of the plurality of brand-specific trade or service marks is selected;
causing activation of the application-specific command;
measuring brand recognition by tracking the number of times each of the plurality of trade or service marks has been selected to activate the application-specific command,
outputting on the computer system the result of the tracking step.

52. The memory medium of claim 51, comprising further instructions that control the computer processor by:
tracking the frequency of selection of each of the plurality of trade or service marks based upon the ordering of presentation of the marks.

53. A computer-readable memory medium containing instructions for controlling a computer processor to assess brand recognition, by:
displaying a shopping list;
concurrently displaying at least two brand-related trade or service marks as alternate activation mechanisms to print the displayed shopping list;
receiving an indication that at least one of the two marks has been used to activate printing the displayed shopping list;
tracking and storing in a memory of the computer system a number of times each of the at least two marks has been selected to activate printing the shopping list;
comparing the stored number of times each of the at least two marks has been selected relative to each other; and
outputting an indication of the comparison.

54. A computer-readable memory medium containing instructions for controlling a computer processor to determine consumer awareness of at least two brand-related trade or service marks relative to each other, by:
receiving an indication of at least two concurrently displayed brand-related trade or service marks for printing a shopping list or to execute a logout command and an indication of a selected one of the at least two concurrently displayed marks; and
retrieving an accounting of past activations of the at least two marks as used to print the shopping list or to execute the logout command; and
based upon the accounting of past activations, determining a frequency of selection of one of the at least two marks relative to another one of the at least two marks, thereby measuring consumer awareness of the at least two marks.

55. A computer-readable memory medium containing instructions for controlling a computer processor by:
displaying a shopping list;
concurrently displaying at least two brand-related trade or service marks as alternate activation mechanisms to print the shopping list;
receiving an indication of a selected one of the displayed at least two marks;
in response to receiving the indication of the selected mark, transmitting data that indicates the selected mark and causing the shopping list to be printed.

* * * * *